(12) United States Patent
DeWeese et al.

(10) Patent No.: US 10,692,386 B2
(45) Date of Patent: Jun. 23, 2020

(54) HOLDING PATTERN DETERMINATION

(71) Applicant: Aviation Mobile Apps, LLC, Cape Canaveral, FL (US)

(72) Inventors: William DeWeese, Winter Park, FL (US); Leslie Glatt, Woodland Hills, CA (US)

(73) Assignee: Aviation Mobile Apps, LLC, Cape Canaveral, FL (US)

( * ) Notice: Subject to any disclaimer, the term of this patent is extended or adjusted under 35 U.S.C. 154(b) by 0 days.

(21) Appl. No.: 16/585,853

(22) Filed: Sep. 27, 2019

(65) Prior Publication Data

US 2020/0105148 A1    Apr. 2, 2020

Related U.S. Application Data

(60) Provisional application No. 62/738,865, filed on Sep. 28, 2018.

(51) Int. Cl.
*G08G 5/00* (2006.01)
*G05D 1/10* (2006.01)
(Continued)

(52) U.S. Cl.
CPC ........... *G08G 5/0034* (2013.01); *G05D 1/106* (2019.05); *B64B 1/10* (2013.01); *B64B 1/16* (2013.01);
(Continued)

(58) Field of Classification Search
CPC ........ F03D 3/068; F03D 7/0276; F03D 7/022; F03D 7/0224; F03D 7/046; F03D 17/00; F03D 5/00; F03D 5/04; F03D 13/20; F03D 9/11; F03D 9/32; F03D 9/28; F03D 9/255; F03D 7/06; F03D 9/25; B64B 1/54; B64B 1/10; B64B 1/16; B64B 1/20; B64B 1/50; G08G 1/09626; G08G 5/0034; G08G 1/167; G01P 5/26; G01P 5/00; G06N 7/005; B01D 61/10; G05D 1/106; G05D 1/0088; G01W 1/10; G06Q 10/06; G06Q 50/06; G05B 19/402; B60W 10/22; B60W 10/20; B60W 40/02; B60W 30/12; B60R 21/0136; B60R 21/36; B62D 15/025; G07C 5/00;
(Continued)

(56) References Cited

U.S. PATENT DOCUMENTS

2005/0207881 A1* 9/2005 Tocher ............... F03D 1/04
   415/4.1
2008/0061559 A1* 3/2008 Hirshberg ........... F03D 3/0454
   290/55
(Continued)

*Primary Examiner* — Behrang Badii
(74) *Attorney, Agent, or Firm* — Brient IP Law, LLC

(57) ABSTRACT

A holding pattern determination system and method assists a pilot with visualizing, entering, and flying a holding pattern. An exact solution to the holding pattern problem simplifies the entry to and flight of a holding pattern with minimal circuits, regardless of the wind direction and speed. Utilizing a windspeed ratio and relative wind direction, at least an inbound wind correction angle, an outbound heading, and an outbound time that begins at the outbound heading independent from an abeam point is provided. An entry pattern graphic and a holding pattern graphic may be provided with turn by turn heading and timing instruction to ensure precise entry and holding pattern flight.

20 Claims, 34 Drawing Sheets

(51) Int. Cl.
    *H04L 29/06*     (2006.01)
    *F03D 7/06*     (2006.01)
    *F03D 3/06*     (2006.01)
    *B64B 1/10*     (2006.01)
    *B64B 1/54*     (2006.01)
    *B64B 1/16*     (2006.01)
    *B64C 37/02*     (2006.01)
    *F03B 13/26*     (2006.01)
    *F03D 5/02*     (2006.01)

(52) U.S. Cl.
    CPC ............... *B64B 1/54* (2013.01); *B64C 37/02* (2013.01); *F03B 13/264* (2013.01); *F03D 3/068* (2013.01); *F03D 5/02* (2013.01); *F03D 7/06* (2013.01); *H04L 65/105* (2013.01); *H04L 65/1053* (2013.01)

(58) Field of Classification Search
    CPC .... B60G 17/0165; B60K 16/00; B63B 35/00; B63B 35/44; B63B 39/06; B63B 43/06; B63B 1/107; B63G 1/00; B63G 8/30; B63H 9/10; B63H 19/02; B63J 3/00; B64C 31/04; B64C 31/06; B64C 37/02; E02B 3/062; F03B 13/182; F24F 1/0007; G01S 17/58; G01S 7/4813; G01S 7/483; G01S 17/95; G01S 17/18

See application file for complete search history.

(56) References Cited

U.S. PATENT DOCUMENTS

| | | | |
|---|---|---|---|
| 2008/0148723 A1* | 6/2008 | Birkestrand | E02B 9/00 60/327 |
| 2009/0127861 A1* | 5/2009 | Sankrithi | F03B 13/264 290/54 |
| 2011/0084492 A1* | 4/2011 | Durham | F03D 3/068 290/55 |
| 2011/0101692 A1* | 5/2011 | Bilaniuk | B64B 1/10 290/44 |
| 2012/0301296 A1* | 11/2012 | Greenblatt | H04L 65/1053 416/1 |
| 2013/0037650 A1* | 2/2013 | Heppe | B64B 1/54 244/2 |

* cited by examiner

HOLDING PATTERN DETERMINATION

CROSS-REFERENCE TO RELATED APPLICATIONS

This application claims the benefit of U.S. Provisional Patent Application No. 62/738,865, filed on Sep. 28, 2018, and entitled "HOLDING PATTERN DETERMINATION SYSTEMS AND METHODS," the contents of which are hereby incorporated by reference herein.

BACKGROUND

A holding pattern is traditionally a racetrack-shaped pattern that is flown by an aircraft at a designated location and according to very precise timing while awaiting landing authorization at an airport. Air traffic controllers often utilize holding patterns to properly space and queue aircraft. As part of the Airman Certification Standards (ACS) requirements for an instrument rating, pilots must demonstrate an understanding and the required proficiency to fly a holding pattern.

There are many training methods to provide a pilot with the knowledge of how to visualize the holding pattern and enter the holding pattern. The required skills are provided by the Federal Aviation Administration (FAA). The FAA publishes an Aeronautical Information Manual (AIM), which provides the fundamental flight information and air traffic control procedures required for every pilot to be able to fly in airspace system of the United States. Similarly, the FAA publishes the Instrument Rating Airman Certification Standards to provide the standards for the instrument rating in the airplane category.

To be proficient in the instrument rating, one of the required skills is defined in IR.III.B.S5, which states, "Uses proper wind correction procedures to maintain the desired holding pattern, and to arrive at the holding fix as close as possible to a specified time." The AIM provides some guidelines for estimating the outbound wind correction angle (OWCA), but there are no guidelines as under what conditions this rule-of-thumb should apply. In addition, there are no guidelines in the AIM for estimating the outbound time other than to fly a one-minute or one-minute and 30 second outbound leg for the initial circuit. The technique utilized to converge to the holding pattern solution is based on a bracketing technique, or "Bracketing Method," which in reality is a trial and error method. Using the technique, the pilot flies a specified outbound OWCA and outbound time and based on the inbound time and whether the aircraft has undershot/overshot the centerline of the inbound course, the pilot will fly the next circuit with an updated outbound time and OWCA. The process continues until the pilot converges to the correct holding pattern solution. Depending on the initial guess for the outbound time and OWCA, the pilot may require a significant number of circuits before converging to the correct holding pattern. This process of converging to the proper holding pattern can impose a considerable load on the pilot, especially when attempting to troubleshoot a problem, or while reviewing the approach plate prior to executing the approach.

SUMMARY

It should be appreciated that this Summary is provided to introduce a selection of concepts in a simplified form that are further described below in the Detailed Description. This Summary is not intended to be used to limit the scope of the claimed subject matter.

A computer-implemented method is provided for determining a holding pattern solution for an aircraft. According to various embodiments, the method includes determining a windspeed ratio and a direction of relative wind. The windspeed ratio and the direction of relative wind are used to determine the holding pattern solution, which includes an inbound wind correction angle, an outbound heading or an outbound wind correction angle, and an outbound time that is independent from a position of the aircraft in relation to an abeam point. The holding pattern solution is provided to a user for flying the holding pattern with the aircraft.

A holding pattern computer having a display and at least one processor is provided. According to various embodiments, the holding pattern computer determines a windspeed ratio and a direction of relative wind. The windspeed ratio and the direction of relative wind are used to determine an inbound wind correction angle, an outbound heading, an outbound time measured from a point in time at which the aircraft has completed its turn to the outbound heading, and a total time to complete a holding pattern circuit. The holding pattern solution is displayed to a user. A holding pattern determination system for providing a holding pattern solution, the system comprising:

A computer-implemented method is provided for determining a holding pattern solution for an aircraft. According to various embodiments, the method includes determining a windspeed ratio and a direction of relative wind. The windspeed ratio and the direction of relative wind are used to calculate an analytic solution to the holding pattern solution. The holding pattern solution includes an inbound wind correction angle, an outbound heading or an outbound wind correction angle, an outbound time that begins at the outbound heading independent from an abeam point, and a total time to complete a holding pattern circuit. The holding pattern solution further includes an entry procedure, an entry pattern graphic, a holding procedure, and a holding pattern graphic. The entry procedure has turn instructions, an inbound and an outbound course, an inbound and an outbound heading, and an outbound leg duration. The entry pattern graphic visually depicts an entry pattern to intercept the inbound leg of the holding pattern. The holding procedure has turn instructions, an inbound and an outbound course, an inbound and an outbound heading, and an outbound leg duration. The holding pattern graphic visually depicts a first representation of a holding pattern with zero wind, and a second representation of a holding pattern with one or more wind characteristics applied.

BRIEF DESCRIPTION OF THE DRAWINGS

Various embodiments of the invention will be described below. In the course of the description, reference will be made to the accompanying drawings, which are not necessarily drawn to scale, and wherein.

DETAILED DESCRIPTION OF VARIOUS EMBODIMENTS

Figure 1:
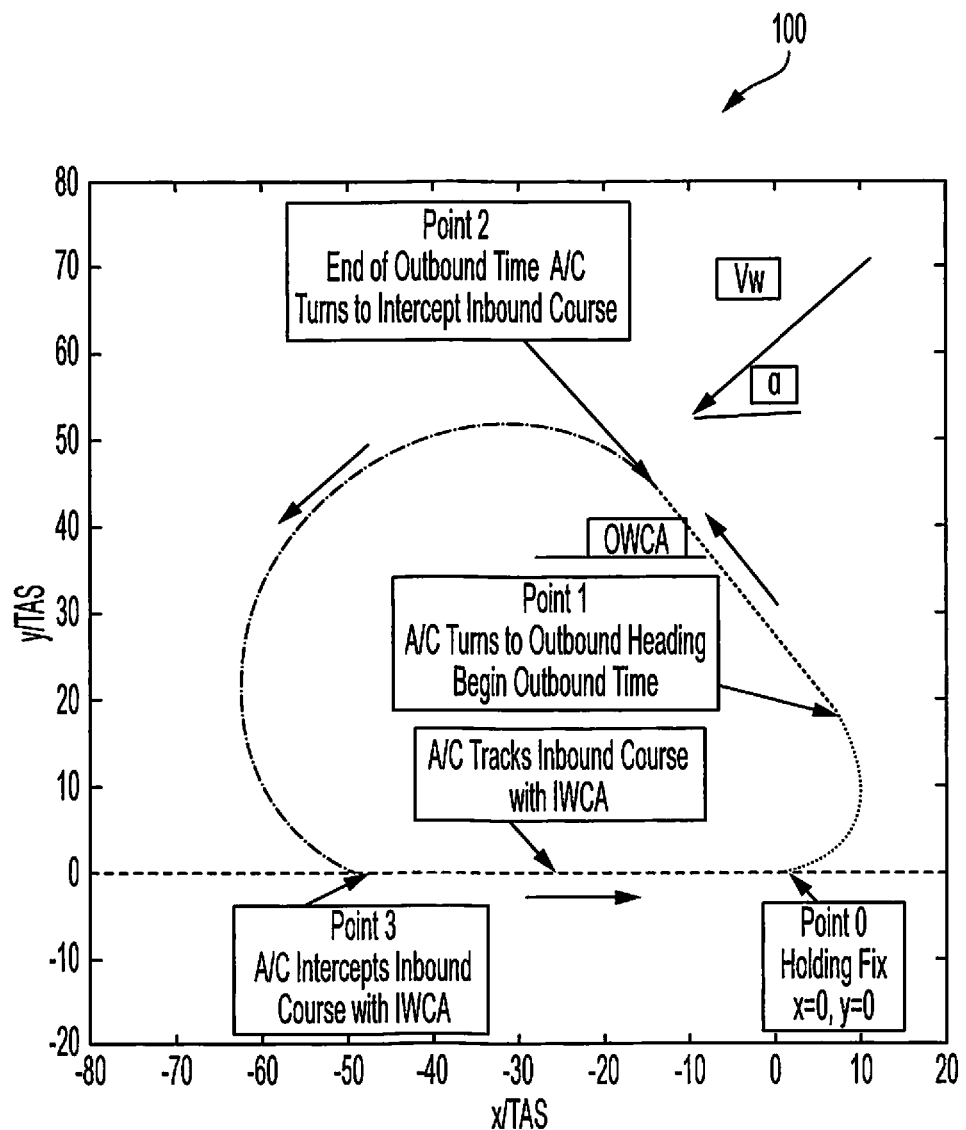
FIG. 1 is a top view of a non-standard holding pattern showing a ground track of an aircraft according to various embodiments described below.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In order to correct existing problems that pilots face with respect to timing and wind correction in a holding pattern, the various embodiments described herein provides the exact solution of the holding pattern problem. This solution is completely analytic and does not use graphical techniques to solve the problem, as utilized in many of the conventional holding pattern calculators previously developed. The exact solution described herein provides the following information to the IFR pilot: (a) Inbound wind correction angle (IWCA), (b) Outbound heading or outbound wind correction angle (OWCA), and (c) outbound time. The solution of the holding pattern problem is shown to be a function of the following parameters:

(a) Windspeed ratio, $\nabla_W$, i.e. the ratio of the windspeed to the aircraft TAS ($V_{TAS}$)

(b) Wind angle, α (degrees) relative to the inbound course to the holding fix (c) Aircraft rate of turn, ω (radians/sec)

(d) Required inbound time to the fix (i.e. one-minute or one-minute and 30 seconds)

Note, although the shape of the holding pattern is a function of the above four parameters, the extent of the holding pattern (i.e. what the Radar Controller observes on the radar scope) is also a function of the parameter $$\frac{V_{TAS}}{\omega},$$

since the x-y coordinates of the holding pattern are proportional to this parameter.

The exact solution of the holding pattern problem allows the pilot to not only have a better understanding of how to correct both the outbound heading and outbound time, but to be able to converge to the holding pattern solution in a minimum number of circuits. In addition, the exact solution provides a number of properties about the holding pattern that are not conventionally known or practiced. Consequently, the holding pattern solution provided herein can affect the way IFR pilots train in the future.

There are at least two advantages of starting the outbound time when the aircraft has turned to the outbound heading according to the discussion herein, rather than the abeam point, as is conventionally practiced. The first is that the pilot does not need to locate the abeam point, and the second is that the outbound time measured from the time the aircraft reaches the outbound heading will be the same, regardless of whether the wind is blowing from either ±α, i.e. from the holding side or the non-holding side. In contrast, if the pilot starts the time at the abeam point per conventional practice, the outbound time will be different, depending on whether the wind is coming from the holding or non-holding side.

A completely different type of holding pattern occurs when holding on a strong headwind component. In this type of holding pattern, it is impossible to achieve the one-minute or one-minute and 30 second inbound time unless the aircraft turns less than 90 degrees outbound from the inbound course. This holding pattern is defined herein as a Type-2 holding pattern, as compared to the normal Type-1 holding pattern observed in conventional IFR training manuals. The exact solution provided herein derives the boundary of this type of holding pattern in windspeed-wind angle space (i.e. $\overline{V}_W$–α space). The boundary line is shown to be a function of the turn rate and the required inbound time to the holding fix. In the case of the one-minute inbound time, the Type-2 holding pattern will occur whenever the windspeed ratio becomes greater than ⅓ while holding on a direct headwind. The value of $\overline{V}_W$ increase to 0.38 at α=45, and 0.44 at α=60 degrees. The behavior is similar for the one-minute and 30 second inbound time, except at α=0, the value of $$\overline{V}_W = \frac{3}{7}$$

and increases with α in a similar fashion as the one-minute inbound leg case. The Type-2 holding pattern can be extremely difficult to converge to the correct inbound time due to the required outbound turn being less than 90 degrees to the inbound course. In fact, when the outbound turn is between 45 and 90 degrees from the inbound course, the inbound the time is controlled by the outbound heading, whereas, the overshoot/undershoot of the inbound course is controlled by the outbound time. This phenomenom is exactly opposite to the bracketing method used for Type-1 holding patterns. Thus, by flying the holding pattern with a windspeed ratio less than ⅓, the IFR pilot can always avoid having to hold with a Type-2 holding pattern. In fact, it is recommended to fly the holding pattern with a value of $\overline{V}_W$≤0.25, in order to have a sufficient amount of outbound time before having to turn to re-intercept the inbound course.

The "Coupling Effect": The conventional concept of the coupling effect states that every pilot induced change in the outbound time or OWCA causes changes in both the inbound time and the undershooting/overshooting of the inbound course to the fix. This concept applies to convergance to the correct holding pattern solution using a minimal number of circuits. Using the exact solution of the holding pattern problem described herein, a "Smart-Convergence" algorithm is used to converge to the correct holding pattern in a minimum number of circuits. This algorithm is compared to the current bracketing method and shows there are significant deficiencies in the bracketing method that requires additional circuits to converge to the correct holding pattern.

The holding pattern solution provided herein determines curves of the exact solution for the standard Type-1 holding patterns for windspeed ratios up to 0.3, which show the outbound time and the ratio of the OWCA to the IWCA (i.e. the M-Factor) as a function of windspeed ratio and relative wind angle. These solutions show that using the AIM recommended M-Factor of 3 for the OWCA holds under a limited set of conditions. These conditions are: (a) For windspeed ratios up to 0.3, the relative wind angle is limited to the range 70≤α≤95 degrees, and (b) For 0≤α≤180 degrees, when the windspeed ratio is less than 0.05. For aircraft holding at a TAS of 100 knots, this would correspond to a wind of less than 5 knots. This reality is one of the root causes of requiring additional circuits to converge to the correct holding pattern, since the initial circuit can be considerably different than the holding pattern solution. The bound on the M-Factor is given by $$\frac{(3-\overline{V}_W)}{(1-3\overline{V}_W)} \geq \frac{OWCA}{IWCA} \geq \frac{(3+\overline{V}_W)}{(1+3\overline{V}_W)}$$

which counters conventional knowledge, which claims that the M-Factor is between 2 and 3.

The disclosure herein provides techniques that can be used when flying Type-1 holding patterns, in order to converge to the holding pattern solution with a minimal number of circuits. These techniques are shown using actual tracks of the holding pattern while attempting to converge to the holding pattern solution. These curves are extremely helpful to the CFI-I when using the simulator to introduce the IFR Student to holding patterns in the presence of a wind. In addition, just eyeballing the outbound time on this chart was shown to reduce the number of required circuits by 40 percent in order to converge to the correct holding pattern.

The concepts described below include IFR training methods that will improve a pilot's technique and understanding of wind correction and timing in the holding pattern. These techniques expel many of the myths and misconceptions of timing and wind correction in the holding pattern that exist using conventional techniques.

This simple analysis for determining the outbound time and outbound heading will allow a holding pattern page to be implemented in GPS and other navigational aids which contains all the information to properly fly the holding pattern. Since the winds can have variability over a period of 5-10 minutes, the GPS will have an update each time the aircraft reaches the holding fix and will provide the IFR pilot with the outbound time and OWCA for the next circuit. With this GPS capability available, the IFR pilot load during holding can be considerably reduced.

Overview

As part of the training requirements for the airplane instrument pilot rating, the candidate must be proficient in the use of holding procedures. Holding patterns can be necessary for a number of reasons: (a) Delays at the airport of intended landing, (b) Loss of ATC communication, (c) Not prepared to execute the approach due to either equipment malfunction or under Single pilot Operation, the pilot may not be ready to execute the approach. However, whatever the need for the hold, the IFR pilot should use this time in the holding pattern to prepare the aircraft for the approach.

The latest ACS for the airplane instrument pilot rating requires both knowledge and skills in mastering the hold while flying in the presence of a wind. In particular, IR.II-I.B.S5 states "Uses proper wind correction procedures to maintain the desired pattern and to arrive over the fix as close as possible to a specified time and maintain pattern leg lengths when specified". The AIM (Par 5-3-8) provides a number of guidelines and rules-of-thumb for flying the hold in the presence of a wind. For example, in terms of the outbound heading, the AIM recommends determining the inbound wind correction angle (IWCA) and multiplying it by 3 (i.e. the M-Factor) to determine the outbound wind correction angle (OWCA). In regard to the outbound time, the AIM recommends on the first circuit, using one minute (or one minute and 30 seconds) for the outbound time measured from the abeam point of the holding fix. If the abeam point cannot be determined, then use the outbound heading as the point to initiate the outbound time. After the first circuit, correct the outbound time to achieve the specified inbound time. Note that this process of converging to the holding pattern is based on a bracketing method or trial and error. Although the AIM does not recommend any rules-of-thumb for correcting the outbound time for the next circuit, there have been numerous rules-of-thumb proposed in IFR training manuals. However, these rules-of-thumb do not come with any specific limitations.

In order to overcome the problem of converging to the correct holding pattern, holding pattern calculators were developed in an attempt to provide the IFR pilot with both the outbound heading and outbound time, given the windspeed and direction. These calculators were very complex and used graphical methods to generate the outbound time and heading. In addition, as the windspeed increased beyond approximately 0.25, these calculators were found to be inaccurate.

In order to reduce the number of circuits that the IFR pilot needs to converge to the correct holding pattern, as well as expel many of the myths and misconceptions of timing and wind correction in the holding pattern, the process described herein derives the exact solution of the holding pattern problem. This solution is both analytic and exact and thus does not contain any limitations in terms of wind direction and windspeeds up to 99.9% of true airspeed.

Using the exact solution described below, a number of interesting properties of the holding pattern are determined including a completely different type of holding pattern that arises under a strong wind with a headwind component on the inbound course to the fix. This new pattern is defined as a Type-2 holding pattern, compared to the standard conventional Type-1 holding pattern that is documented in many of the IFR training manuals. In addition, in the case of Type-1 holding patterns, simple curves are developed herein for the M-Factor, OWCA and outbound time as a function of the relative wind angle, for windspeed ratios up to 0.3. The boundary line between Type-1 and Type-2 holding patterns in windspeed ratio-wind angle space is also developed.

The exact solution is further utilized below to develop a "smart-convergence" algorithm that allows the pilot to converge to the holding pattern solution in a minimum number of circuits. The concept of the coupling effect is introduced and shown that one of the root causes of requiring a large number of circuits to converge to the conventional holding pattern solution, is due to a lack of understanding of the importance of including the coupling effect in the convergence process.

The smart-convergence algorithm will now be compared with the bracketing method to show how the bracketing method is inefficient in converging to the correct holding pattern. Preparation for the hold will be discussed, and some simple techniques to use which can reduce the number of circuits to converge to the holding pattern while using the bracketing method. Next, training techniques are developed to be included when discussing timing and wind correction in the holding pattern. Then, the conclusions drawn from the work will be discussed.

Exact Solution of the Holding Pattern Problem

The exact solution of the holding pattern problem provides the following information to the pilot:
(1) Inbound wind correction angle (IWCA)
(2) Outbound heading and outbound wind correction angle (OWCA)
(3) Outbound time measured from the point at which the aircraft has completed its turn to the outbound heading There are parameters that substantially affect the shape and extent of the holding pattern, and the actual dimensions of the holding pattern. Specifically, as in all ground reference maneuvers, there are two parameters that come into play when tracking the inbound course in the holding pattern. These parameters include: (a) The windspeed ratio $$\overline{V}_W = \frac{V_W}{V_{TAS}},$$

and (b) The angle α, which is the relative angle between the wind direction and the inbound course to the holding fix. The solution of the "Wind Triangle" problem provides both the groundspeed and the wind correction angle (WCA) σ. The WCA while tracking a particular course is $$\sin \sigma = \overline{V}_W \sin \alpha \tag{1}$$

Thus, once the windspeed ratio and relative wind angle α are defined, the WCA is automatically determined from eq. (1). The non-dimensional groundspeed along the particular course to be tracked is given by $$\overline{V}_G = \frac{V_G}{V_{TAS}} = \cos\sigma - \overline{V}_W \cos\alpha \tag{2}$$

There are two additional parameters that characterize the holding pattern. These are: (a) Outbound heading ($\theta_H$), and (b) Outbound time ($t_{out}$). Both parameters depend on: (1) Windspeed ratio ($\overline{V}_W$), (2) Relative wind angle (α), (3) Aircraft turn rate (ω), and (4) Required inbound time to the holding fix.

In order to characterize the holding pattern, an x-y Cartesian Coordinate system is defined, where the holding fix is located at the point x=0, y=0 and the inbound course along the negative-x axis. In FIG. 1, a non-standard holding pattern 100 is shown, i.e. left-hand turns. Point 1 is defined as the location of the aircraft at the point the aircraft has turned to the outbound heading ($\theta_H$). Point 2 is defined as the location of the aircraft at the end of the outbound time ($t_{out}$) at the point where it begins its turn to intercept the inbound course, and point 3, the location of the aircraft at the point at which the aircraft has re-intercepted the inbound course with the appropriate inbound WCA (IWCA).

Since the IWCA is known, the only remaining unknowns are the outbound heading, $\theta_H$, and the outbound time, $t_{out}$. The determination of these two unknowns utilizes two equations to solve for these unknowns. Note that in FIG. 1, it can be seen that when the aircraft reaches the holding fix, it initiates a turn and tracks an arc from point 0 to point 1, where the aircraft has turned to the outbound heading $\theta_H$. The aircraft then flies at a constant heading between the points 1 and 2 for a period of time given by $t_{out}$. The aircraft then initiates a turn at point 2 and at point 3, rolls out on a heading which includes the inbound course plus the IWCA. The aircraft then tracks the inbound course for the prescribed amount time (i.e. one-minute below 14000MSL, or one-minute and 30 seconds at or above 14000MSL, as per the AIM 5-3-8).

Since the aircraft initiated the arc at point 0 (i.e. x=0, y=0), it must return to point 3 at the same value of y, i.e. Y=0. Thus, if one calculates the changes in the value of y in going from segments 0-1, 1-2 and 2-3, these changes must sum to zero. This is the first constraint necessary to obtain the holding pattern solution. The second equation is obtained by calculating the changes in the value of x along the 3 segments 0-1, 1-2, and 2-3 and then adding the groundspeed along the segment 3-0 multiplied by the prescribed inbound time (i.e. one-minute or one-minute and 30 seconds) and require the sum of all the changes in x to be identically zero (i.e. aircraft ends up at x=0). Using these two equations, one can determine both the unknown outbound heading $\theta_H$, and outbound time $t_{out}$.

Without any loss in generality, it can be assumed that the inbound course is 0 degrees. In this x-y Cartesian Coordinate system, the angle $\theta$, represents the aircraft heading relative to the inbound course, where $\theta$ is measured from the positive-x axis in the counterclockwise direction. This relative heading should not be confused with the heading observed on the heading indicator. One can easily overlay the heading indicator onto FIG. 1 and obtain the actual outbound heading. However, it is simpler to work with relative heading.

In order to determine the actual track of the aircraft in the holding pattern, the aircraft groundspeed is determined in the x-y Cartesian Coordinate system, i.e. the components of the groundspeed in the x and y directions. The components of the groundspeed in both x and y directions are given by $$V_{G_x} = V_{TAS} \cos\theta - V_W \cos\alpha$$

$$V_{G_y} = V_{TAS} \sin\theta - V_W \sin\alpha \tag{3}$$

When the aircraft is on a constant heading (i.e. constant $\theta$), the groundspeed will be constant. However, when the aircraft is turning, the groundspeed will be varying. Note that when the aircraft is at constant groundspeed, the change in the x-y coordinates of the aircraft are just given by the groundspeed multiplied by the time of flight. However, when the groundspeed is varying, one must compute the change in position of the aircraft by performing an integration of the varying groundspeed multiplied by an element of time, and then integrated over a time interval $t_f - t_i$. Here $t_i$ is the time at the beginning of the turn, and $t_f$ is the time at the end of the turn, i.e.

$$\Delta x = \int_{t_i}^{t_f} V_{G_x} \, dt \tag{4}$$

$$\Delta y = \int_{t_i}^{t_f} V_{G_y} \, dt$$

During the turning portion of the holding pattern, the aircraft rate of turn in radians/sec is given by $$\omega = \frac{g \tan\phi}{V_{TAS}} \tag{5}$$

Here, g is the gravitational acceleration (i.e. 32.174

$$\left(\text{i.e. } 32.174 \frac{\text{ft}}{\text{sec}^2}\right),$$

), $V_{TAS}$ the TAS in ft/sec, and $\phi$ is the aircraft bank angle in degrees. In order to convert the TAS in knots to ft/sec, the TAS is multiplied by 1.6875. In general, the aircraft will be turning at a standard rate of 3 degrees/sec, up to the point where the bank angle reaches 30 degrees (or 25 degrees while using a flight director). Using eq. (5), one can see this will occur at 210 knots for a 30-degree bank, and 170 knots when using a flight director.

In order to perform the integration shown in eq. (4), it is best to transform the element of time, dt, into an element of heading change, d$\theta$. Since the turn rate is constant during the turning portion of the flight, dt is expressed in terms of d$\theta$, i.e.

$$d\theta = \omega \, dt \tag{6}$$

Eq. (4) can now be rewritten as $$\Delta x = \frac{1}{\omega} \int_{\theta_i}^{\theta_f} V_{G_x} \, d\theta \tag{7}$$

$$\Delta y = \frac{1}{\omega} \int_{\theta_i}^{\theta_f} V_{G_y} \, d\theta$$

Where $\theta_i$ is the aircraft heading at the beginning of the turn, and $\theta_f$ is the aircraft heading at the completion of the turn. If $\Delta x$ and $\Delta y$ are normalized by $$\frac{V_{TAS}}{\omega},$$

eq. (7) becomes $$\Delta \bar{x} = \frac{\omega \Delta x}{V_{TAS}} \int_{\theta_i}^{\theta_f} \bar{V}_{G_x} \, d\theta \tag{8}$$

$$\Delta \bar{y} = \frac{\omega \Delta y}{V_{TAS}} \int_{\theta_i}^{\theta_f} \bar{V}_{G_y} \, d\theta$$

Where the normalized groundspeed is given by $$\bar{V}_{G_x} = \cos\theta - \bar{V}_W \cos\alpha$$

$$\bar{V}_{G_y} = \sin\theta - \bar{V}_W \sin\alpha \tag{9}$$

and $$\frac{V_{TAS}}{\omega}$$

is the radius of the turn under no-wind conditions. Note that the shape of the holding pattern when expressed in normalized coordinates is a function of the windspeed ratio, $\overline{V}_W$, the angle of the wind relative to the inbound course, $\alpha$, the outbound heading, $\theta_H$, and the outbound time, $t_{out}$. However, the actual extent of the holding pattern (i.e. what the radar controller will see on the screen), will depend on the value of $$\frac{V_{TAS}}{\omega},$$

since every normalized value of $\overline{x}$ and $\overline{y}$ will be multiplied by this quantity.

Equations (8) and (9) can now be utilized to obtain the two equations necessary to determine the outbound time and the outbound heading required to intercept the inbound course with either a one-minute, or one minute and 30 second inbound leg to the holding fix. If eq. (9) is substituted into eq. (8), the following equations are obtained for the normalized values of x and y during the turning portion of the holding pattern, i.e.

$$\Delta\overline{x} = (\sin\theta_f - \sin\theta_i) - \overline{V}_W \cos\alpha(\theta_f - \theta_i)$$

$$\Delta\overline{y} = -[(\cos\theta_f - \cos\theta_i) + \overline{V}_W \sin\alpha(\theta_f - \theta_i)] \quad (10)$$

Equation (10) can be utilized for the turning segments, i.e., segments 0-1, and 2-3.

The changes in $\Delta\overline{x}$ and $\Delta\overline{y}$ along the straight segments 1-2 and 3-0, where the groundspeed is constant, are given by $$\Delta\overline{x} = (\cos\theta - \overline{V}_W \cos\alpha)\omega t$$

$$\Delta\overline{y} = (\sin\theta - \overline{V}_W \sin\alpha)\omega t \quad (11)$$

Where t represents either the unknown outbound time from point 1 to 2, or the known inbound time from point 3 to 0. In regard to the aircraft headings, $\theta = \theta_H$ is the unknown outbound heading from point 1 to 2, and $\theta = 2\pi + \sigma$ is the aircraft heading after completing a 360-degree turn. Here, $\sigma$ is the IWCA while tracking the segment from points 3 to 0.

It should be noted that it has been assumed that at the appropriate times, the turn rate instantaneously changes from either zero to the value $\omega$, or from the value $\omega$ to zero. If the rate of roll-in and roll-out is similar, one would expect this assumption to have a minor effect on the accuracy of the solution.

The changes in $\Delta\overline{y}$ corresponding to the 3 segments, 0-1, 1-2, and 2-3 are calculated using $$\Delta\overline{y}_{0-1} = -(\cos\theta_H - \cos\sigma) - \overline{V}_W \sin\alpha(\theta_H - \sigma)$$

$$\Delta\overline{y}_{1-2} = (\sin\theta_H - \overline{V}_W \sin\alpha)\omega t_{out}$$

$$\Delta\overline{y}_{2-3} = -(\cos(2\pi+\sigma) - \cos\theta_H) - \overline{V}_W \sin\alpha[(2\pi+\sigma) - \theta_H] \quad (12)$$

Note that although the aircraft heading comes back to its original heading on the inbound leg, it has turned 360 degrees (i.e. $2\pi$ radians). In the presence of a wind, the aircraft total time is a key factor, and thus the 360 degrees must be taken into account.

Since the sum of the $\Delta\overline{y}$'s needs to be identically zero in order for the aircraft to re-intercept the inbound course at the time the aircraft has turned to the inbound course plus the inbound WCA, the sum can be set equal to zero and solve for the unknown outbound time, $t_{out}$, i.e., $$t_{out} = \frac{\left(\frac{2\pi}{\omega}\right)}{\left[\left(\frac{\sin\theta_H}{\sin\sigma}\right) - 1\right]} \quad (13)$$

where $\omega$ is the turn rate in radians/sec. Degrees/sec can be converted to radians/sec using the following formula $$\omega = \frac{\pi}{180}k \quad (14)$$

where k is the aircraft turn rate in degrees/sec. Substituting eq. (14) into eq. (13), gives the following equation for the outbound time in seconds between point 1 and 2, i.e.

$$t_{out} = \frac{\left(\frac{360}{k}\right)}{\left[\left(\frac{\sin\theta_H}{\sin\sigma}\right) - 1\right]} \quad (15)$$

Note that the outbound time is a function of the turn rate k, the outbound heading $\theta_H$, and the IWCA $\sigma$. Since the turn rate and the IWCA are known, the only unknown is the outbound heading $\theta_H$. In the case of an aircraft performing a standard rate turn, the outbound time will be given by $$t_{out} = \frac{120}{\left[\left(\frac{\sin\theta_H}{\sin\sigma}\right) - 1\right]} \quad (16)$$

The equation to determine the outbound heading $\theta_H$ is now developed, starting by calculating the changes in the $\Delta\overline{x}$'s corresponding to the 3 segments, 0-1, 1-2, and 2-3. The changes in $\Delta\overline{x}$ are given by $$\Delta\overline{x}_{0-1} = (\sin\theta_H - \sin\sigma) - \overline{V}_W \cos\alpha(\theta_H - \sigma)$$

$$\Delta\overline{x}_{1-2} = (\cos\theta_H - \overline{V}_W \cos\alpha)\omega t_{out}$$

$$\Delta\overline{x}_{2-3} = [\sin(2\pi+\sigma) - \sin\theta_H] - \overline{V}_W \cos\alpha[(2\pi+\sigma) - \theta_H] \quad (17)$$

If the three values of $\Delta x$ are added together, it will place the aircraft at point 3. The distance from point 3 to point 0 must be equal to $$\Delta\overline{x}_{3-0} = [\cos(2\pi+\sigma) - \overline{V}_W \cos\alpha]\omega t_{in} \quad (18)$$

Thus, the equation that determines $\theta_H$ is given by $$\Delta\overline{x}_{0-1} + \Delta\overline{x}_{1-2} + \Delta\overline{x}_{2-3} + \Delta\overline{x}_{3-0} = 0 \quad (19)$$

Note that $\sin(2\pi+\sigma) = \sin\sigma$, and $\cos(2\pi+\sigma) = \cos\sigma$. If eqs. (17) and eq. (18) are substituted into eq. (19) the following equation for $\theta_H$ is obtained $$-2\pi\overline{V}_W \cos\alpha + (\cos\theta_H - \overline{V}_W \cos\alpha)\omega t_{out} + [\cos(2\pi+\sigma) - \overline{V}_W \cos\alpha]\omega t_{in} = 0 \quad (20)$$

The required inbound time $t_{in}$, is given by $$t_{in} = 60\beta \quad (21)$$

where $\beta$ is 1 for a one-minute inbound leg, and 3/2 for a one-minute and 30 second inbound leg. If eq. (15) is now substituted for $t_{out}$, and eq. (21) for $t_{in}$, the following equation for $\theta_H$ is obtained $$a_1 \sin\theta_H + a_2 \cos\theta_H + a_3 = 0 \qquad (22)$$

where $$a_1 = \cos\sigma - \left(1 + \frac{6}{k\beta}\right)\overline{V}_W \cos\alpha \qquad (23)$$

$$a_2 = \frac{6}{k\beta}\sin\sigma$$

$$a_3 = -(\cos\sigma - \overline{V}_W \cos\alpha)\sin\sigma$$

Note that although the equation for the outbound time $t_{out}$ is exact and in analytic form, eq. (22) is a transcendental equation for $\theta_H$, and thus must be solved by numerical root-finding methods. However, it should be pointed out that eq. (22) is also an exact solution for $\theta_H$.

If one is interested in obtaining an analytical solution to eq. (22), $\sin\theta_H$ is first replaced with $\sqrt{1-\cos^2\theta_H}$. By eliminating $\sin\theta_H$ from eq. (22), the following quadratic equation is obtained for $\cos\theta_H$ $$(a_1^2 + a_2^2)\cos^2\theta_H + 2a_2a_3\cos\theta_H + (a_3^2 - a_1^2) = 0 \qquad (24)$$

Solving the above quadratic equation for $\cos\theta_H$ $$\cos\theta_H = \frac{\left[-a_2a_3 \pm a_1\sqrt{a_1^2 + a_2^2 - a_3^2}\right]}{a_1^2 + a_2^2} \qquad (25)$$

Note that eq. (25) contains two possible solutions as can be seen with the ±sign. The negative sign is chosen in order that the relative outbound heading lies in the range $0 \leq \theta_H \leq 180$ degrees. Thus, the final equation for the outbound heading is given by $$\cos\theta_H = \frac{\left[-a_2a_3 + a_1\sqrt{a_1^2 + a_2^2 - a_3^2}\right]}{a_1^2 + a_2^2} \qquad (26)$$

Taking the inverse Cosine of eq. (26), results in $$\theta_H = \cos^{-1}\frac{-\left(a_2a_3 + a_1\sqrt{a_1^2 + a_2^2 - a_3^2}\right)}{a_1^2 + a_2^2} \qquad (27)$$

Since the outbound time $t_{out}$ requires $\sin\theta_H$, the required expression for $\sin\theta_H$ is obtained in one of two ways, i.e.

$$\sin\theta_H = \sin\left\{\cos^{-1}\left[\frac{-\left(a_2a_3 + a_1\sqrt{a_1^2 + a_2^2 - a_3^2}\right)}{a_1^2 + a_2^2}\right]\right\} \qquad (28)$$

or from the identity $$\sin\theta_H = \sqrt{1 - \cos^2\theta_H}, \qquad (29)$$

where eq. (26) is utilized in eq. (29) to obtain $\sin\theta_H$. Thus, the holding pattern solution for an arbitrary windspeed and direction is given by eqs. (1), (15), and (26)-(29).

An additional parameter that is useful to the IFR pilot is the total time for one circuit of the holding pattern. It is easily to obtain this parameter since it is given by $$tth_c = \frac{360}{k} + t_{out} + 60\beta \qquad (30)$$

Where the first term is the time to perform a 360-degree turn, the second term is the outbound time, and the third term is just the required inbound time.

Substituting eq. (15) into eq. (30), the following equation is obtained for the total time in seconds for one circuit in the holding pattern $$tth_c = \frac{60\beta\left[\left(1 + \frac{6}{k\beta}\right)\frac{\sin\theta_H}{\sin\sigma} - 1\right]}{\left[\frac{\sin\theta_H}{\sin\sigma} - 1\right]} \qquad (31)$$

In the case of the aircraft performing a standard rate turn ($k=3$), and a one-minute inbound leg ($f=1$), eq. (31) becomes $$tth_c = 60\frac{\left[3\frac{\sin\theta_H}{\sin\sigma} - 1\right]}{\left[\frac{\sin\theta_H}{\sin\sigma} - 1\right]} \qquad (32)$$

Thus, the total time in the holding pattern for a one-minute inbound time with a standard rate turn is a function of both the outbound heading $\theta_H$, and the IWCA $\sigma$.

In order to understand how to obtain the holding pattern solution for any wind condition, the following method is used:

(1) Select the wind speed and the wind direction
(2) Select the $V_{TAS}$
(3) Determine the windspeed ratio $$\overline{V}_W = \frac{V_{wind}}{V_{TAS}}$$

(4) Determine the value of the wind direction ($\alpha$) relative to the inbound course
(5) Select the aircraft desired rate of turn k in degrees/sec (i.e. either standard rate or bank angle limited)
(6) Select the inbound time ($\beta=1$ below 14000MSL and 3/2 at and above 14000MSL)
(7) Calculate the IWCA $\sigma$ from eq. (1)
(8) Calculate the $a_1$, $a_2$, and $a_3$ coefficients from eq. (23)
(9) Solve eqs. (26) and (27) for $\theta_H$
(10) Solve eq. (29) for $\sin\theta_H$, and eq. (15) for the outbound time $t_{out}$
(11) Solve eq. (31) for the total time for one circuit of the holding pattern Although the above analysis satisfies a required time for the inbound leg, i.e. $60\beta$, it can be extended to satisfying a defined length of the inbound leg. Equation (18) defines the length of the normalized inbound leg. The value of f that meets the required length of the inbound leg $L_{IC}$ can be solved for, i.e.

$$\frac{L_{IC}}{V_{TAS}} = 60\beta[\text{Cos}(2\pi + \sigma) - \overline{V}_W \text{Cos}\alpha] \quad (33)$$

where $L_{IC}$ is in nm, $V_{TAS}$ is the true airspeed in nm/sec (i.e. divide the TAS in knots by 3600). Solving for the unknown value of $\beta$ $$\beta = \frac{L_{IC}}{60V_{TAS}[\text{Cos}(2\pi + \sigma) - \overline{V}_W \text{Cos}\alpha]} = \frac{L_{IC}}{60V_{TAS}[\text{Cos}\sigma - \overline{V}_W \text{Cos}\alpha]} \quad (34)$$

The value of $\beta$ determined by eq. (34) is substituted into the previous equations to determine the outbound heading and outbound time, which will allow the aircraft to re-intercept the inbound course with the required IWCA at a distance $L_{IC}$ from the holding fix.

Although the above analysis was derived for a non-standard holding pattern 100 (i.e. left turns), the same equations can be employed for the standard holding pattern (i.e. right turns), if the definition of the relative heading θ is positive and increasing in the clockwise direction. In both left and right turns, positive α is a wind coming from the holding side. Finally, in order to obtain the correct ground track for the standard holding pattern, the changes in $\Delta\overline{y}$ given in eq. (12) are multiplied by −1. Note, a change in the sign of $\Delta\overline{y}$ does not affect the outbound time equation since all the $\Delta\overline{y}$'s sum to zero. In the following section, the exact holding pattern solution will be discussed in more detail.

Properties of the Holding Pattern

Consider the case where the wind is coming from the relative direction −α instead of +α. In this case, the headwind component on the inbound leg is identical, however in the −α case, the wind is coming from the non-holding side rather than the holding side. The WCA is −σ rather than +σ. Using the fact that $$\text{Sin}(-\sigma) = -\text{Sin }\sigma$$

$$\text{Cos}(-\sigma) = \text{Cos }\alpha \quad (35)$$

It can be seen that the solution for $\theta_H$ in the case α=−α is $$\theta_H = -\theta_H \quad (36)$$

since the ratio $$\frac{\sin(-\theta_H)}{\text{Sin}(-\sigma)} = \frac{\text{Sin}\theta_H}{\text{Sin}\sigma} \quad (37)$$

Figure 2:
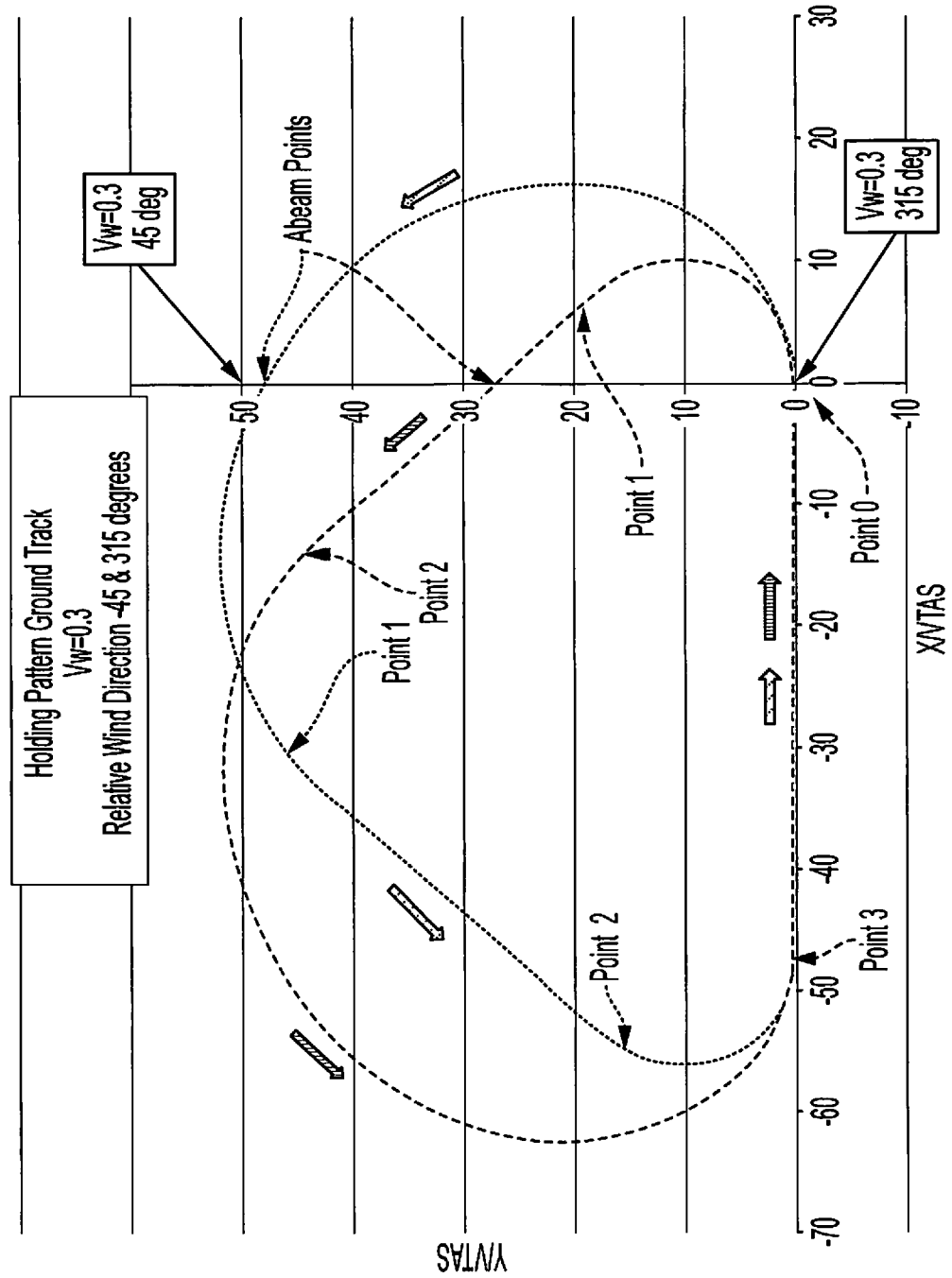
FIG. 2 is a top view of a non-standard holding pattern showing a ground track of an aircraft given relative wind directions of −45 and 315 degrees according to various embodiments described below.

It can be seen that the outbound time $t_{out}$ is the same regardless of whether the wind is coming from the holding side or the non-holding side. Although the outbound time from point 1 to 2 is the same in both cases, the outbound time measured from the abeam point of the holding fix will not be the same. This can be seen in FIG. 2, for the case $\overline{V}_W$=0.3 and α=±45 degrees. Note that α=−45 is equivalent to α=315 degrees as shown in the FIG. In addition, the x-y coordinates are normalized by the TAS in nm/sec.

Thus, there are two distinct advantages of starting the outbound time at the point where the aircraft has turned to the outbound heading: (1) The outbound time is the same whether the wind direction is ±α, and (2) The abeam point does not have to be determined. Removing the requirement of starting the outbound time at the abeam point, reduces the required IFR pilot workload, since the location of the abeam point is no longer necessary. Although the AIM states that the outbound time should be started at the abeam point, if it can be identified, the only requirement in the AIM is to meet the one-minute or one-minute and 30 second inbound time requirement. Thus, starting the outbound time when the aircraft reaches the outbound heading has considerable advantages and should be utilized while flying the holding pattern.

There is another type of holding pattern that can exist when the IFR pilot attempts to hold in the presence of a strong headwind. In this holding pattern, it is impossible for the pilot to meet the required inbound time to the fix unless the aircraft reaches the fix and then turns to an outbound heading that is less than 90 degrees relative to the inbound course. As briefly described above, this holding pattern is defined herein as a Type-2 holding pattern 320. A holding pattern which requires a turn of more than 90 degrees from the inbound course is described herein as a Type-1 holding pattern 310. The Type-1 holding patterns are always shown in current IFR training manuals.

In order to determine under what conditions the Type-2 holding pattern can exist, a solution of eq. (22) is sought assuming the relative outbound heading $\theta_H$=90 degrees. Since $$\text{Sin}(90)=1$$

$$\text{Cos}(90)=0 \quad (38)$$

eq. (22) becomes $$a_1+a_3=0 \quad (39)$$

Substituting eq. (23) into eq. (39) the following equation for $\overline{V}_W$ is obtained $$\sqrt{1 - \overline{V}_W^2 \text{Sin}^2\alpha} \,(1 - \overline{V}_W \text{Sin}\alpha) - \overline{V}_W \sqrt{1 - \text{Sin}^2\alpha}\left[\left(1 + \frac{6}{k\beta}\right) - \overline{V}_W \text{Sin}\alpha\right] = 0 \quad (40)$$

Figure 3A:
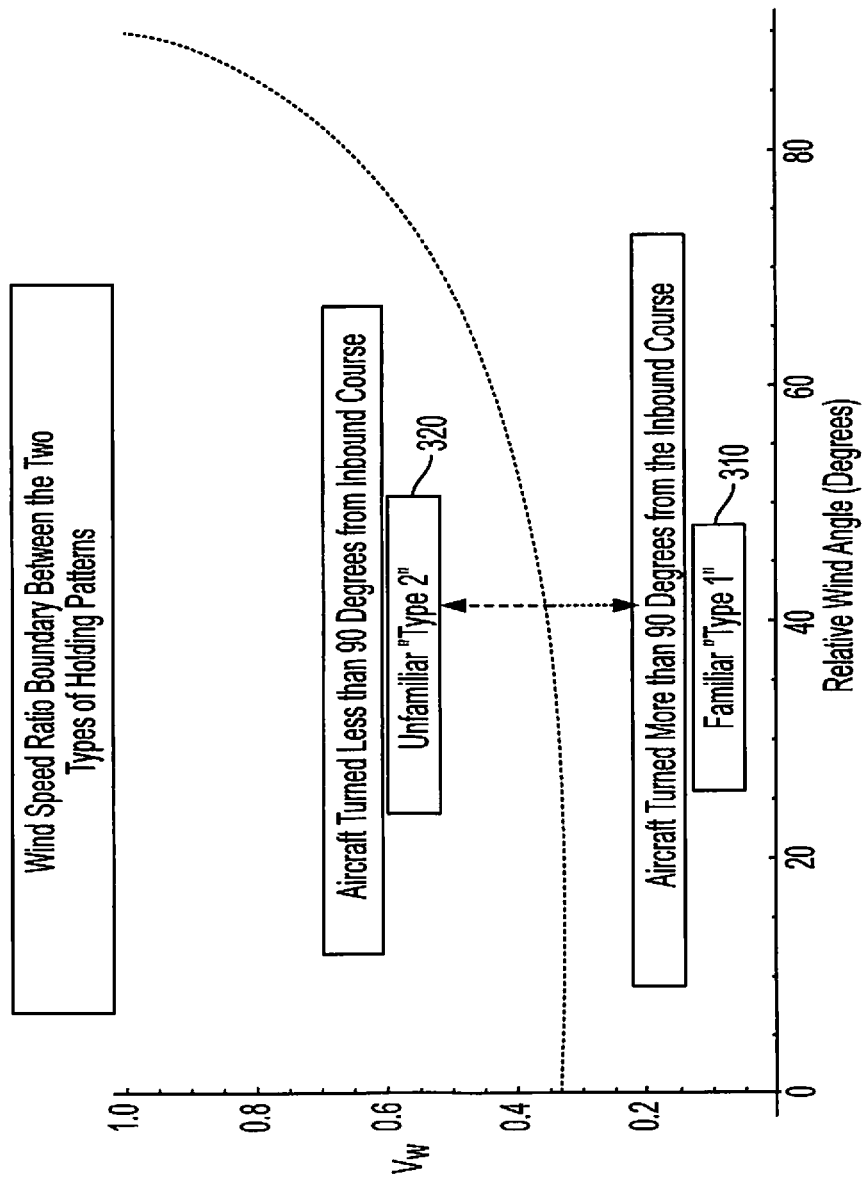
FIG. 3A is a graph showing a plot of windspeed ratio versus relative wind angle for a headwind component on the inbound leg according to various embodiments described below.
Figure 3B:
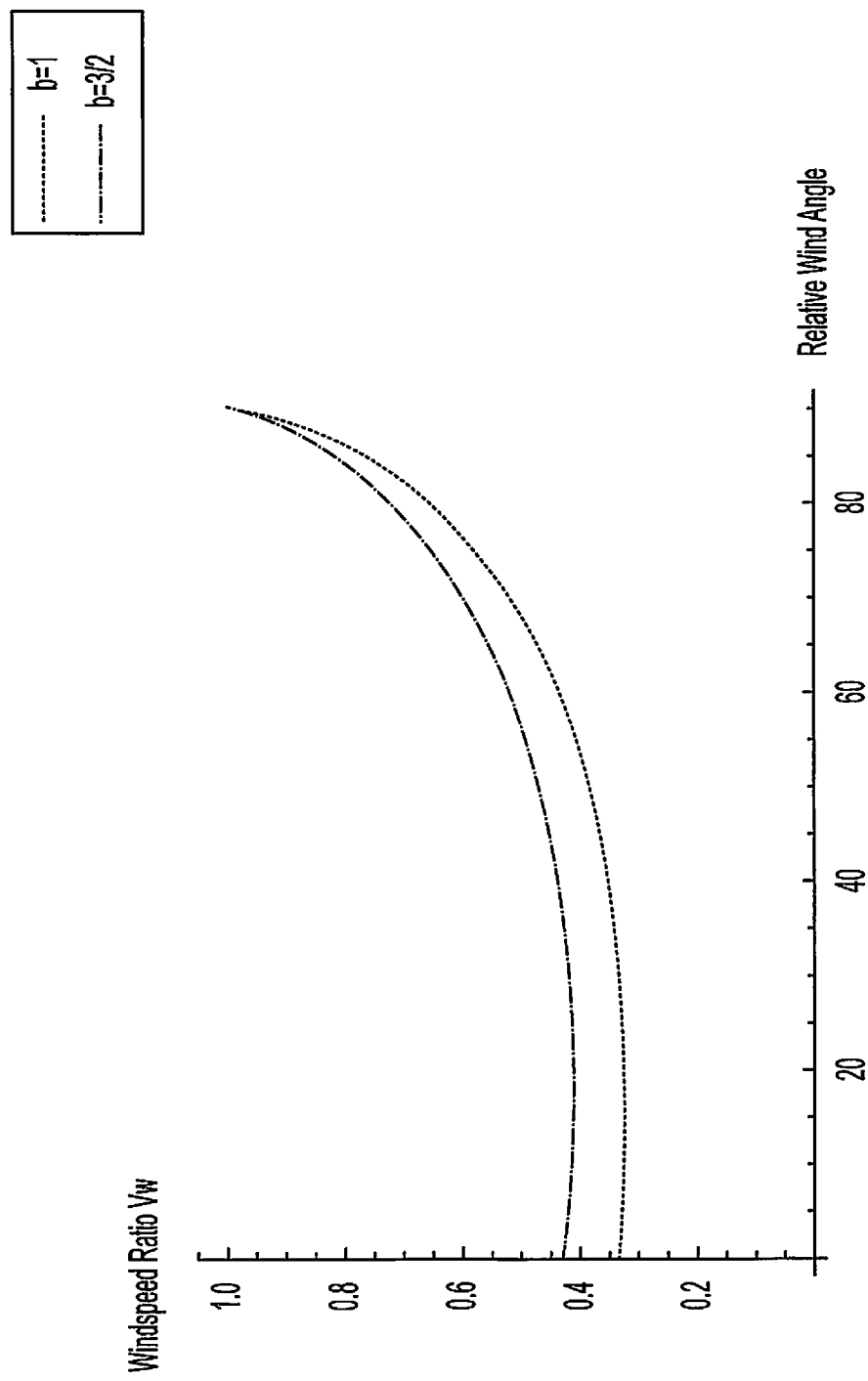
FIG. 3B is a graph showing a comparison of the boundary line for the two inbound time cases according to various embodiments described below.

This equation can be solved for $\overline{V}_W$ as a function of α. FIG. 3A, corresponding to the case k=3 and b=1, shows a plot of $\overline{V}_W$ as a function of a, where a is in the range zero to ninety degrees (i.e. a headwind component on the inbound leg). It is seen that when a direct headwind on the inbound leg exists, windspeed ratios greater than ⅓ will require the pilot to track outbound on the 360-degree course from the fix (i.e. positive x-axis) for a specified time before turning back. In addition, it can be seen that as the relative wind angle moves toward the aircraft's wingtip, the Type-2 holding pattern will occur at higher windspeed ratios. FIG. 3B shows a comparison of the boundary line for the two cases b=1 and b=3/2. It is observed that the Type-2 holding pattern occurs at higher values of $\overline{V}_W$ when b=3/2 as compared to the b=1 case. However, flying the holding pattern at a windspeed ratio less than ⅓ will avoid the Type-2 holding pattern for both values of b.

Another issue that arises for all IFR pilots after entering the hold, is the aircraft initially flies outbound for one minute or one minute and 30 seconds and then turns back to re-intercept the inbound course to the holding fix. Assuming that the aircraft intercepts the inbound course and reaches the holding fix in 40 seconds, the question that arises is: How much additional time should be added to the original outbound time in order that the next inbound time will be one minute? Some CFI-I's use the rule of thumb $\Delta t_{out}$ $\Delta t_{in}$, however, it will be shown that this approximation can be in considerable error when the windspeed ratio is not very small.

In order to understand the outbound time correction issue, it should be noted that all corrections to the outbound time are performed on the outbound leg where the aircraft heading is held constant. Thus, the additional distance parallel to the x-axis that is flown on the outbound leg due to a change in outbound time, $\Delta t_{out}$, will be equal the additional distance flown after re-intercepting the inbound course and flying back to the fix. In order to be consistent, it is assumed that the aircraft's outbound heading will be the same for the next circuit. The above statement is expressed with the following equation $$|\cos\theta_H - \overline{V}_W \cos\alpha|\Delta t_{out} = |\cos\sigma - \overline{V}_W \cos\alpha|\Delta t_{in} \quad (41)$$

Here, the left side of eq. (41) is the change in the distance covered in the x-direction on the outbound leg due to a change in $\Delta t_{out}$, whereas, the right hand side is the change in distance covered in the x-direction on the inbound leg due to a required change in $\Delta t_{in}$. The symbol $\|$ represents the absolute value of the quantity inside the vertical bars. Note that $\Delta t_{in}$ can take on positive or negative values. Thus, one can solve for the required change in the outbound time, necessary to produce the required changed in the inbound time, i.e.

$$\Delta t_{out} = \frac{|\cos\sigma - \overline{V}_W \cos\alpha|}{|\cos\theta_H - \overline{V}_W \cos\alpha|} \Delta t_{in} \quad (42)$$

As an example, consider the case where a pure headwind on the inbound leg to the holding fix exists. In this case, $$\alpha = 0$$

$$\sigma = 0$$

$$\theta_H = 180 \quad (43)$$

Since $\cos(0)=1$, and $\cos(180)=-1$, the change in the outbound time is given by $$\Delta t_{out} = \frac{(1 - \overline{V}_W)}{(1 + \overline{V}_W)} \Delta t_{in} \quad (44)$$

In the case of a windspeed ratio of $\overline{V}_W = 0.05$, $\Delta t_{out}$ $0.9\Delta t_{in}$, and thus for a required change in inbound time, one only needs 90 percent of that for the change in the outbound time. However, as the windspeed ratio increases to 0.2, it can be seen that $$\Delta t_{out} = \frac{2}{3} \Delta t_{in},$$

and thus, in order to make the required inbound time, the aircraft must correct the outbound time by only ⅔ of the required change in the inbound time. Consequently, the use of the approximation $\Delta t_{out}$ $\Delta t_{in}$ would cause the pilot to fly additional circuits in order to obtain the required inbound time. Therefore, the rule-of-thumb for correcting the outbound time being used in the IFR community is only valid for small windspeed ratios. However, eq. (42) provides the exact ratio of the required change in outbound time for a prescribed change in inbound time, when the outbound heading is held constant. The following section will analyze the two simplest cases, i.e., the direct headwind ($\alpha=0$) and direct tailwind ($\alpha=180$).

Holding Pattern Solution: Pure Headwind or Tailwind Case

The solution for the outbound time, given in eq. (15) contains the ratio of $$\frac{\sin\theta_H}{\sin\sigma}$$

and the value of the turn rate, k. In the pure headwind ($\alpha=0$) or tailwind ($\alpha=180$) cases, this ratio is indeterminate, i.e. 0/0. The solution for this ratio must be obtained using a limiting process known as L'Hopital's rule, wherein the numerator and denominator are obtained using series expansions around the points $\alpha=0$ and $\alpha=180$.

In the pure headwind case ($\alpha=0$, the $\alpha_i$ coefficients in eq. (23) can be expanded around $\alpha=0$, while retaining $\sin\sigma$. These approximate coefficients will be designated with an overbar, i.e.

$$\overline{a}_1 = 1 - \left(1 + \frac{6}{k\beta}\right)\overline{V}_W \quad (45)$$

$$\overline{a}_2 = \frac{6}{k\beta}\sin\sigma$$

$$\overline{a}_3 = -(1 - \overline{V}_W)\sin\sigma$$

Equation (22) can be rewritten as $$\overline{a}_1 \sin\theta_H - \overline{a}_2 + \overline{a}_3 = 0 \quad (46)$$

since $\sigma=0$, the relative outbound heading $\theta_H = -180$, and $\cos(180)=-1$. Dividing eq. (46) by $\sin\sigma$, the final equation for the ratio $$\frac{\sin(\theta_H)}{\sin\sigma}$$

is obtained, i.e.

$$\frac{\sin(\theta_H)}{\sin\sigma} = \frac{\left[\frac{6}{k\beta} + 1 - \overline{V}_W\right]}{\left[1 - \left(1 + \frac{6}{k\beta}\right)\overline{V}_W\right]} \quad (47)$$

Note that although both $\sin\sigma=0$ and $\sin\theta_H=0$, the ratio of these quantities has a limit which is given by eq. (47). Substituting the above result into eq. (15) gives the final result for the outbound time $t_{out}$ $$t_{out} = \frac{60\beta\left[1 - \left(1 + \frac{6}{k\beta}\right)\overline{V}_W\right]}{(1 + \overline{V}_W)} \quad (48)$$

In the pure tailwind case one can perform a similar expansion around $\alpha=180$ degrees, however, the result can also be obtained more quickly by redefining the tailwind as $\alpha=0$, and replacing $\overline{V}_W$ with $-\overline{V}_W$. Thus, the Sine ratio and $t_{out}$ in the pure tailwind case become $$\frac{\sin\theta_H}{\sin\sigma} = \frac{\left[\frac{6}{k\beta} + 1 + \overline{V}_W\right]}{\left[1 + \left(1 + \frac{6}{k\beta}\right)\overline{V}_W\right]} \quad (49)$$

$$t_{out} = \frac{60\beta\left[1 + \left(1 + \frac{6}{k\beta}\right)\overline{V}_W\right]}{(1 - \overline{V}_W)} \quad (50)$$

In the pure headwind case, eq. (48) shows the outbound time goes to zero when $$\overline{V}_W = \overline{V}_W^* = \frac{1}{\left(1 + \frac{6}{k\beta}\right)} \quad (51)$$

For values of $\nabla_W > \nabla_W^*$, the value of $t_{out}$ becomes negative and indicates a failure in the analysis. However, the reason for the failure is due to the fact that when $\nabla_W > \nabla_W^*$, the aircraft must fly outbound along the inbound course (i.e. along the positive x axis) for a specified time. This case corresponds to the value of $\theta_H = 0$. Thus, when $\nabla_W > \nabla_W^*$, the term $$\frac{\sin\theta_H}{\sin\sigma}$$

is no longer obtained by solving eq. (46), but by solving $$\overline{a}_1 \sin\theta_H + \overline{a}_2 + \overline{a}_3 = 0 \quad (52)$$

Where $\cos(180) = -1$ has been replaced with $\cos(0) = 1$. If solving for the ratio $$\frac{\sin\theta_H}{\sin\sigma}$$

in eq. (52), the following is obtained $$\frac{\sin\theta_H}{\sin\sigma} = \frac{-\left(\frac{6}{k\beta}\right)(1 - \overline{V}_W)}{1 - \left(1 + \frac{6}{k\beta}\right)\overline{V}_W} \quad (53)$$

Substituting eq. (53) into eq. (15), the following equation for the outbound time is obtained when $\nabla_W > \nabla_W^*$ $$t_{out} = 60\beta \frac{\left[\left(1 + \frac{6}{k\beta}\right)\overline{V}_W - 1\right]}{(1 - \overline{V}_W)} \quad (54)$$

Summarizing the outbound times in the headwind case $$t_{out} = \frac{60\beta\left[1 - \left(1 + \frac{6}{k\beta}\right)\overline{V}_W\right]}{(1 + \overline{V}_W)} \quad \overline{V}_W \leq \frac{1}{\left(1 + \frac{6}{k\beta}\right)} \quad (55)$$

$$t_{out} = 60\beta \frac{\left[\left(1 + \frac{6}{k\beta}\right)\overline{V}_W - 1\right]}{(1 - \overline{V}_W)} \quad \overline{V}_W \geq \frac{1}{\left(1 + \frac{6}{k\beta}\right)} \quad (56)$$

As an example, in the case of an aircraft performing a standard rate turn in the holding pattern (k=3 degrees/sec), and using a required inbound time of one minute, corresponding to a holding pattern below 14000MSL, results in the following equations for $t_{out}$:

Headwind Case:

$$t_{out} = \frac{60[1 - 3\overline{V}_W]}{(1 + \overline{V}_W)} \quad \overline{V}_W \leq \frac{1}{3} \quad (57)$$

$$t_{out} = 60 \frac{[(3\overline{V}_W - 1)]}{(1 - \overline{V}_W)} \quad \overline{V}_W \geq \frac{1}{3} \quad (58)$$

Tailwind Case:

$$t_{out} = 60 \frac{(1 + 3\overline{V}_W)}{(1 - \overline{V}_W)} \quad (59)$$

Although eqs (57) and (59) were derived using a limiting process, these equations can be obtained using physical arguments. For example, in the headwind/tailwind case, the OWCA is identically zero. Under no wind conditions, the aircraft reaches the holding fix (x=0) and turns 180 degrees. At the end of the turn the aircraft will also be at x=0. In the case of a headwind on the inbound leg, after the first 180-degree turn the aircraft will have drifted a distance downwind by the amount $V_W$ times one minute. On the outbound leg, aircraft travels a distance equal to $(V_{TAS} + V_W) \cdot t_{out}$. After the final 180-degree turn, the aircraft will have drifted an additional distance downwind equal to $V_W$ times one minute and will have intercepted the inbound course. The aircraft is now located a distance $2V_W + (V_{TAS} + V_W)t_{out}$ downwind of the fix. Since the aircraft must return to the fix in one minute, it can be seen that the following equation holds $$(V_{TAS} - V_W) \cdot 1 = 2V_W + (V_{TAS} + V_W)t_{out} \quad (60)$$

Here $t_{out}$ is in minutes. Solving eq. (60) for $t_{out}$ the following equation is obtained $$t_{out} = \frac{(1 - 3\overline{V}_W)}{(1 + \overline{V}_W)} \quad (61)$$

Multiplying eq. (61) by 60 gives the outbound time in seconds, i.e.

$$t_{out} = 60 \frac{(1 - 3\overline{V}_W)}{(1 + \overline{V}_W)} \quad (62)$$

Note that eq. (57) and (62) are identical, verifying the limiting process gives the correct answer. Again, substituting $-V_W$ for $V_W$, gives the correct answer for the tailwind case on the inbound leg as shown in eq. (59)

Figure 4:
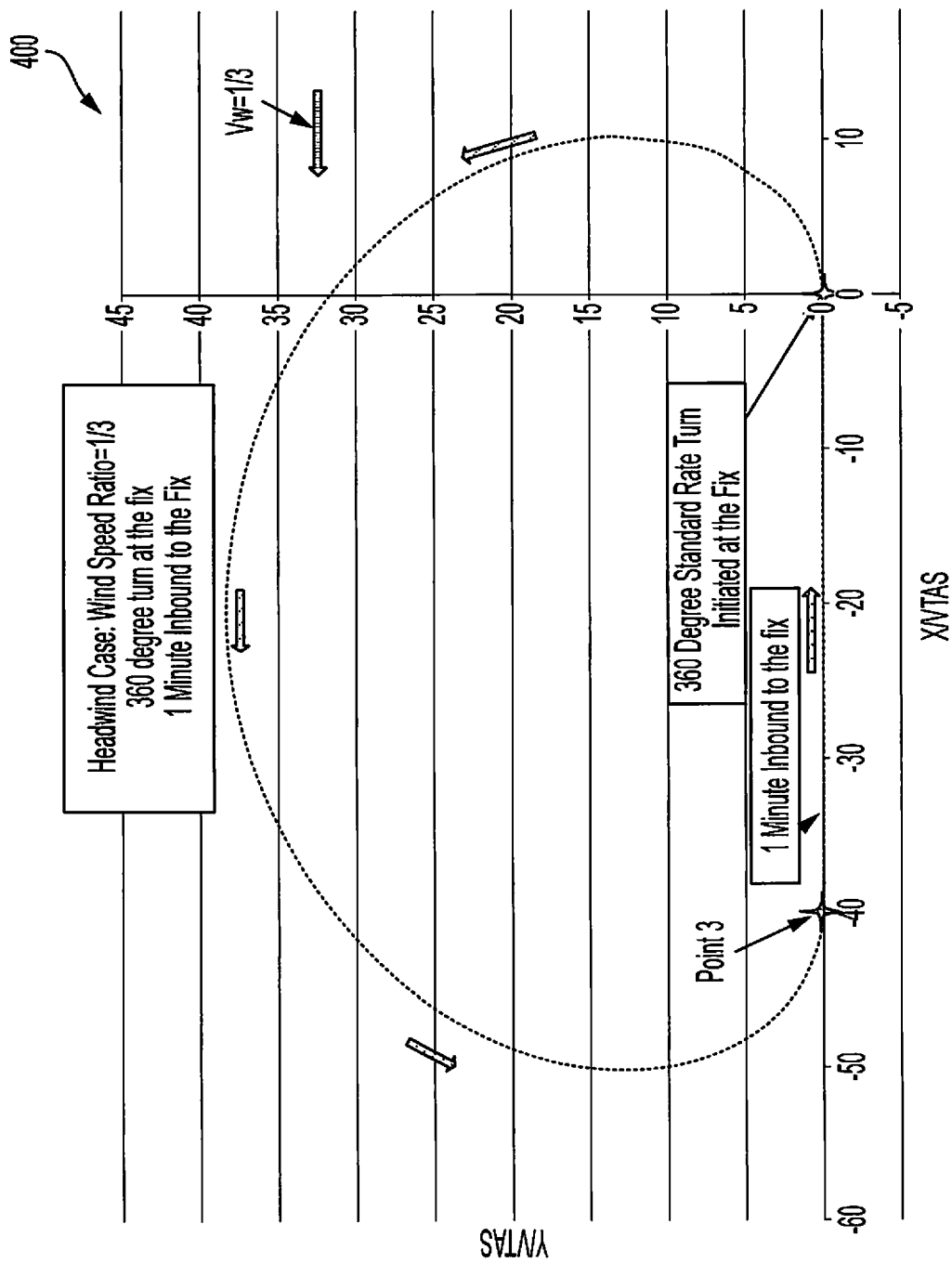
FIG. 4 is a top view of a pure headwind holding pattern showing a ground track of an aircraft given a windspeed ratio of ⅓ according to various embodiments described below.

In the case of a pure headwind, with $$\overline{V}_W = \frac{1}{3}$$

the outbound time is identically zero. In this scenario, the aircraft reaches the holding fix, performs a 360 degree turn re-intercepting the inbound course, and then flies one minute to the holding fix. Under this wind condition, the time to fly the holding pattern is exactly three minutes. This particular pure headwind holding pattern 400 is shown in FIG. 4.

In order to understand this pure headwind holding pattern 400, consider the aircraft reaching the holding fix and executing a two-minute standard rate turn. After re-intercepting the inbound course, the aircraft has been blown downwind a distance $V_W*$(2 minutes). If the aircraft flies for an additional minute while on the headwind, the aircraft will be blown an addition distance downwind equal to $V_W*$(1 minute). Thus, during these three minutes, the aircraft has been blown $V_W*$(3 minutes) downwind from the fix. In order for the aircraft to arrive at the fix at the end of 3 minutes, the aircraft's TAS must be three times the windspeed. Thus, this particular case corresponds to a value of $$\overline{V}_W = \frac{1}{3}.$$

If $$\overline{V}_W > \frac{1}{3},$$

it will be impossible to fly a one-minute inbound leg to the holding fix, unless the aircraft tracks outbound along the inbound course (i.e. along the positive x-axis) for a given amount of time before making a 360 turn to re-intercept the inbound course. The outbound time in this case is given by eq. (58). One can also obtain this result using physical arguments. For example, if the aircraft is performing a standard rate turn (i.e. k=3) and starts a two-minute turn when it reaches the holding fix, it will have been blown downwind a distance $2*V_W$. After intercepting the inbound radial, it travels a distance of $(V_{TAS}-V_W)\beta$ toward the fix. The x-location of the aircraft at this time is given by $-(2+\beta)V_W+V_{TAS}\beta$. If $\overline{V}_W>1/(1+2/\beta)$ the aircraft will need to fly a distance beyond the fix equal to $(V_{TAS}-V_W)t_{out}$. In order to arrive at the holding fix after $\beta$ minutes, the following equation must hold $$-(2+\beta)V_W+V_{TAS}\beta+(V_{TAS}-V_W)t_{out}=0 \qquad (63)$$

Solving for $t_{out}$ $$t_{out} = 60\frac{[(2+\beta)\overline{V}_W - \beta]}{(1-\overline{V}_W)} \qquad (64)$$

Note that eq. (64) is identical to eq. (56), which again, confirms the results of the limiting process.

As an example, if $\overline{V}_W$=0.4 and, $\beta$=1, the outbound time $t_{out}$ is 20 seconds. Thus, if the aircraft reaches the fix and tracks outbound for 20 seconds, performs a 360 standard-rate turn, and flies for one minute, the aircraft will be at the holding fix at the end of the one-minute inbound leg. Instead of using eq. (58) the pilot can use the following simple method: When $$\overline{V}_W > \frac{1}{3},$$

the pilot can track the inbound course to the holding fix, perform a 360-degree standard-rate turn, re-intercept the inbound course, and then time the inbound leg to the holding fix. The time to fly beyond the fix, $t_{out}$, is just the difference between the time for the inbound leg and the required inbound time of either one-minute or one-minute and 30 seconds.

In the pure headwind or tailwind case, both the IWCA and OWCA are zero, and thus, $$\frac{\sin\theta_H}{\sin\sigma} = \frac{\sin\delta}{\sin\sigma}\frac{OWCA}{IWCA} \qquad (65)$$

Where $\delta=180-\theta_H$ and corresponds to the OWCA. In the case of $$\overline{V}_W < \frac{1}{3}$$

it is easy to see that the M-Factor is bounded by $$\frac{(3-\overline{V}_W)}{(1-3\overline{V}_W)} \geq \frac{OWCA}{IWCA} \geq \frac{(3+\overline{V}_W)}{(1+3\overline{V}_W)} \qquad (66)$$

Equation (66) shows that the maximum value of the M-Factor corresponds to the direct headwind case, and the minimum value of the M-Factor corresponds to the direct tailwind case. In the case of $\overline{V}_W$=0.3, the M-Factor is bounded by $$27 \geq \frac{OWCA}{IWCA} \geq 1.74 \qquad (67)$$

Equation (66) debunks conventional wisdom, which states that the M-Factor is always between 2 and 3. In the following section, the arbitrary wind case where the outbound turn is more than 90 degrees (i.e., the standard Type-1 holding pattern) will be discussed.

Holding Pattern with an Arbitrary Wind (Type-1)

The general solution of the holding pattern problem is given by eqs. (1), (15), (22) and (23), which are solved for the IWCA, $\sigma$, the outbound time, $t_{out}$, and outbound heading $\theta_H$, given the coefficients $a_1$, $a_2$, and $a_3$. Again $a_1$-$a_3$ are functions of the windspeed ratio $\overline{V}_W$, and the wind direction $\alpha$, relative to the inbound course. In addition, $a_1$ and $a_2$ are also functions of both the turn rate k and the inbound time to the fix $\beta$. The latest AIM (paragraph. 5-3-8) recommends that the OWCA should be 3 times the IWCA in order to properly re-intercept the inbound course to the holding fix. However, it will now be shown that this rule-of-thumb for the OWCA is useful only under a limited set of wind conditions. In order to show this conclusion, the M-Factor will be determined, which is the ratio of the outbound OWCA to the IWCA. The OWCA, δ, is related to the relative outbound heading by the following equation $$\delta = 180 - \theta_H \quad (68)$$

The holding pattern solution for the following range of wind conditions will now be calculated $$0 \leq \overline{V}_W \leq 0.3$$

$$0 \leq \alpha \leq 180 \quad (69)$$

For general aviation (GA) aircraft holding at speeds of 100-110 KTAS, the maximum wind speed would correspond to 30-33 knots. As was discussed earlier, the holding pattern solution for negative values of α are obtained from the solutions for the positive values of α as follows $$\sigma(\overline{V}_W, -\alpha) = -\sigma(\overline{V}_W, \alpha)$$

$$\theta_H(\overline{V}_W, -\alpha) = \theta_H(\overline{V}_W, \alpha)$$

$$t_{out}(\overline{V}_W, -\alpha) = t_{out}(\overline{V}_W, \alpha) \quad (70)$$

A maximum value of $\overline{V}_W = 0.3$ has been chosen in order to avoid the Type-2 holding patterns that arise when the windspeed becomes greater than ⅓ for the case of the one-minute inbound leg. The Type-2 holding pattern solution will be further addressed below. In addition, as pointed out earlier, the shape of the holding pattern is determined by $\overline{x}$ and $\overline{y}$, however the actual dimensions of the holding pattern are determined by multiplying these quantities by the term $$\frac{V_{TAS}}{\omega},$$

where ω is given by eq. (14). In order to provide a database for typical GA aircraft flying a Type-1 holding patterns, it is assumed that the value of k=3 degrees/sec and β=1 (one-minute inbound leg). However, another set of curves can be developed for $$\beta = \frac{3}{2},$$

which corresponds to a holding pattern flown at or above 14000MSL.

Figure 5:
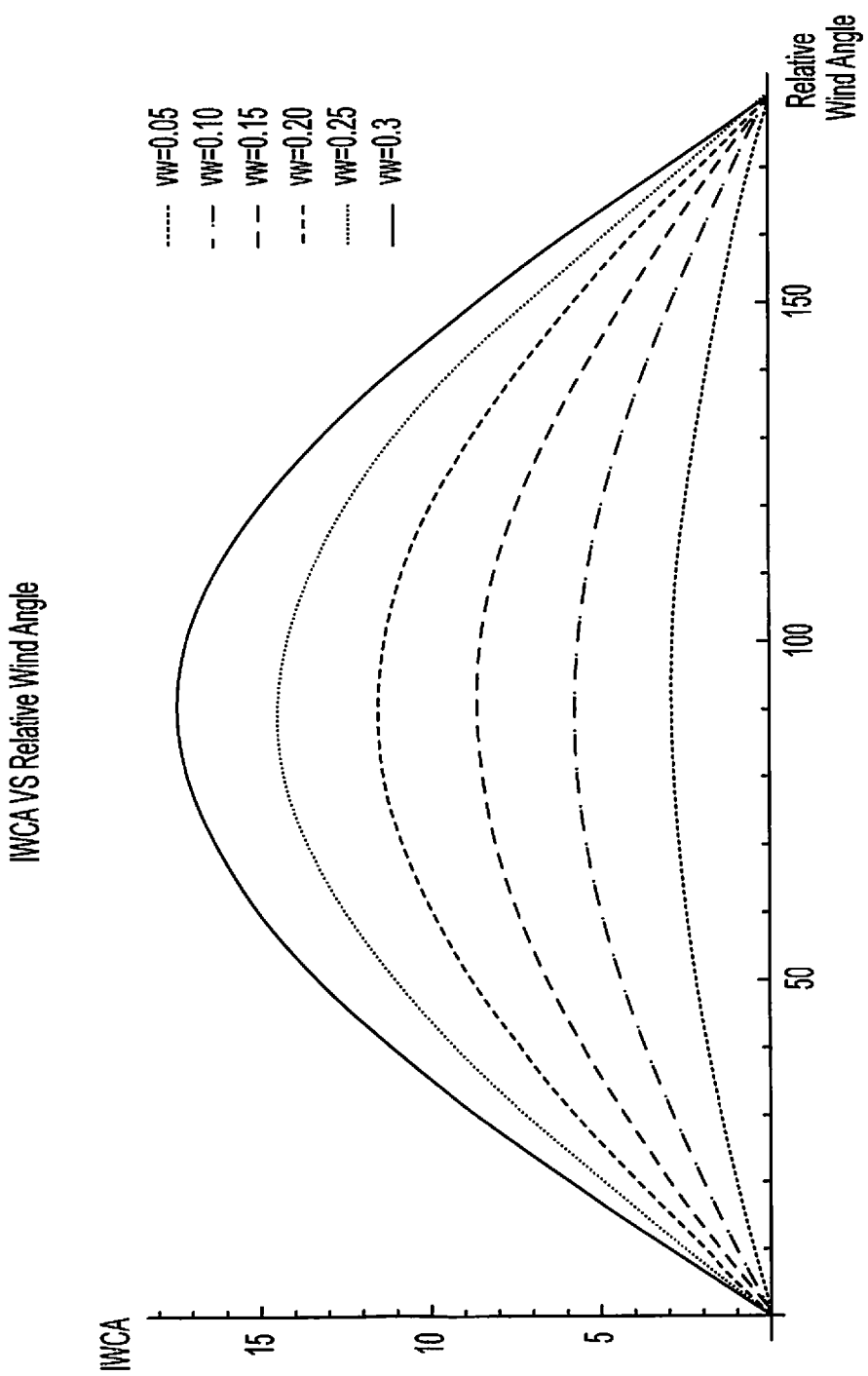
FIG. 5 is a graph showing the inbound wind correction angle versus relative wind angle for the six values of the windspeed ratio according to various embodiments described below.

In the case of the classical Type-1 holding pattern, wherein the outbound turn is greater than 90 degrees relative to the inbound course, the solution is provided for six values of the windspeed ratio: 0.05, 0.1, 0.15, 0.2, 0.25, and 0.3. FIGS. 5-7 show the IWCA, the M-Factor (i.e. OWCA/IWCA), the outbound time, $t_{out}$, measured from the point at which the aircraft has turned to the outbound heading, $\theta_H$, and the OWCA.

Some significant conclusions that can be reached by reviewing FIGS. 5-7 will now be discussed. First, the maximum IWCA will occur when α=90 degrees. In this case the IWCA is given by $$\sigma = \sin^{-1}(\overline{V}_W) \quad (71)$$

FIG. 5 shows the IWCA for the six values of the windspeed ratio. As can be seen, the peak value occurs at α=90 degrees, with the maximum being 17.5 degrees corresponding to the value $\overline{V}_W = 0.3$ In addition, excluding α=90, there are two values of α that produce the same value of the IWCA. One corresponds to a headwind component, and the other corresponds to a tailwind component.
IWCA (Degrees)

Figure 6A:
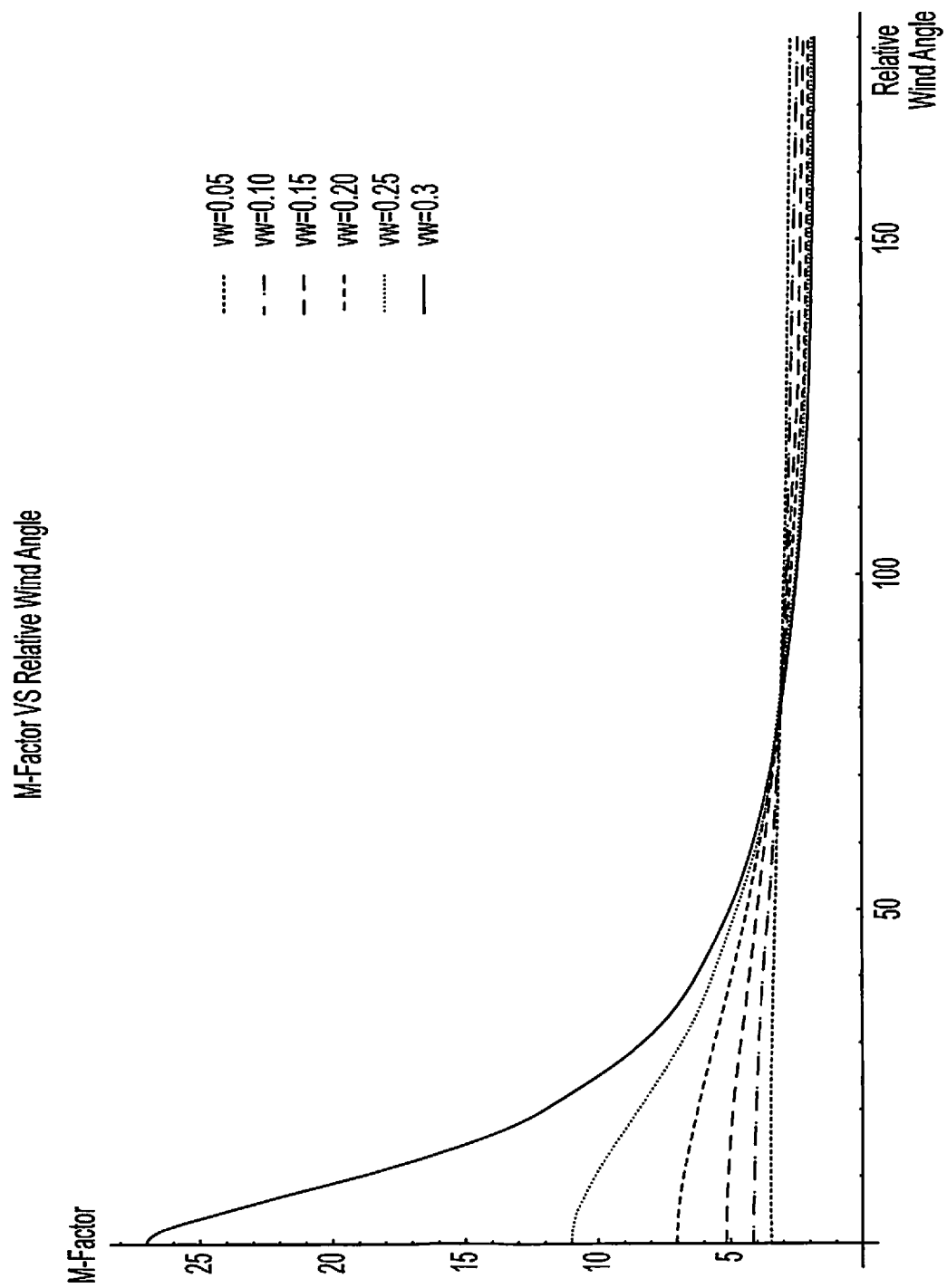
FIGS. 6A and 6B are graphs showing the M-Factor versus relative wind angle for six values of the windspeed ratio according to various embodiments described below.
Figure 6B:
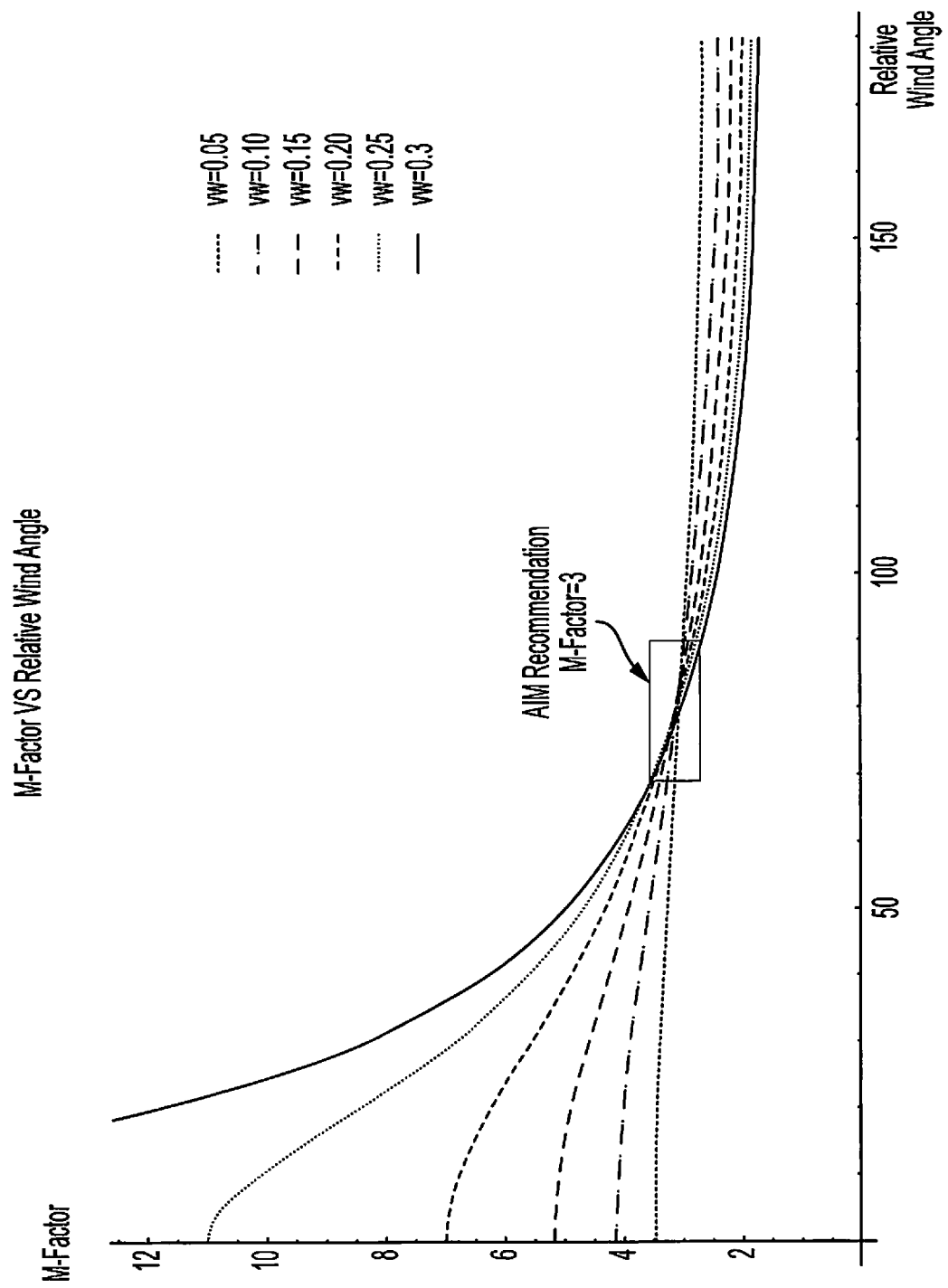

FIGS. 6A and 6B show the M-Factor versus relative wind angle for the six values of the windspeed ratio. It is easy to see that the AIM recommendation of using an M-Factor of 3 on the outbound leg is valid only under limited conditions. In FIG. 6B, an annotated rectangle indicates where the M-Factor is bounded between 2.5 and 3.5. In this limited region, using an M-Factor of 3 would be a good approximation. This region is defined by 70≤α≤95 for $\overline{V}_W \leq 0.3$. However, if $\overline{V}_W \leq 0.05$, using an M-Factor of 3 would also be a good approximation over the entire range of α. Note that as α→0 or α→180, $$M\text{-Factor} = \frac{\delta}{\sigma} \approx \frac{\sin\theta_H}{\sin\sigma} \quad (72)$$

Thus, when α→0, the M-Factor reaches its maximum value given by $$\frac{(3 - \overline{V}_W)}{(1 - 3\overline{V}_w)},$$

and as α→180, the M-Factor reaches its minimum value given by $$\frac{(3 + \overline{V}_W)}{(1 + 3\overline{V}_w)}.$$

Figure 7A:
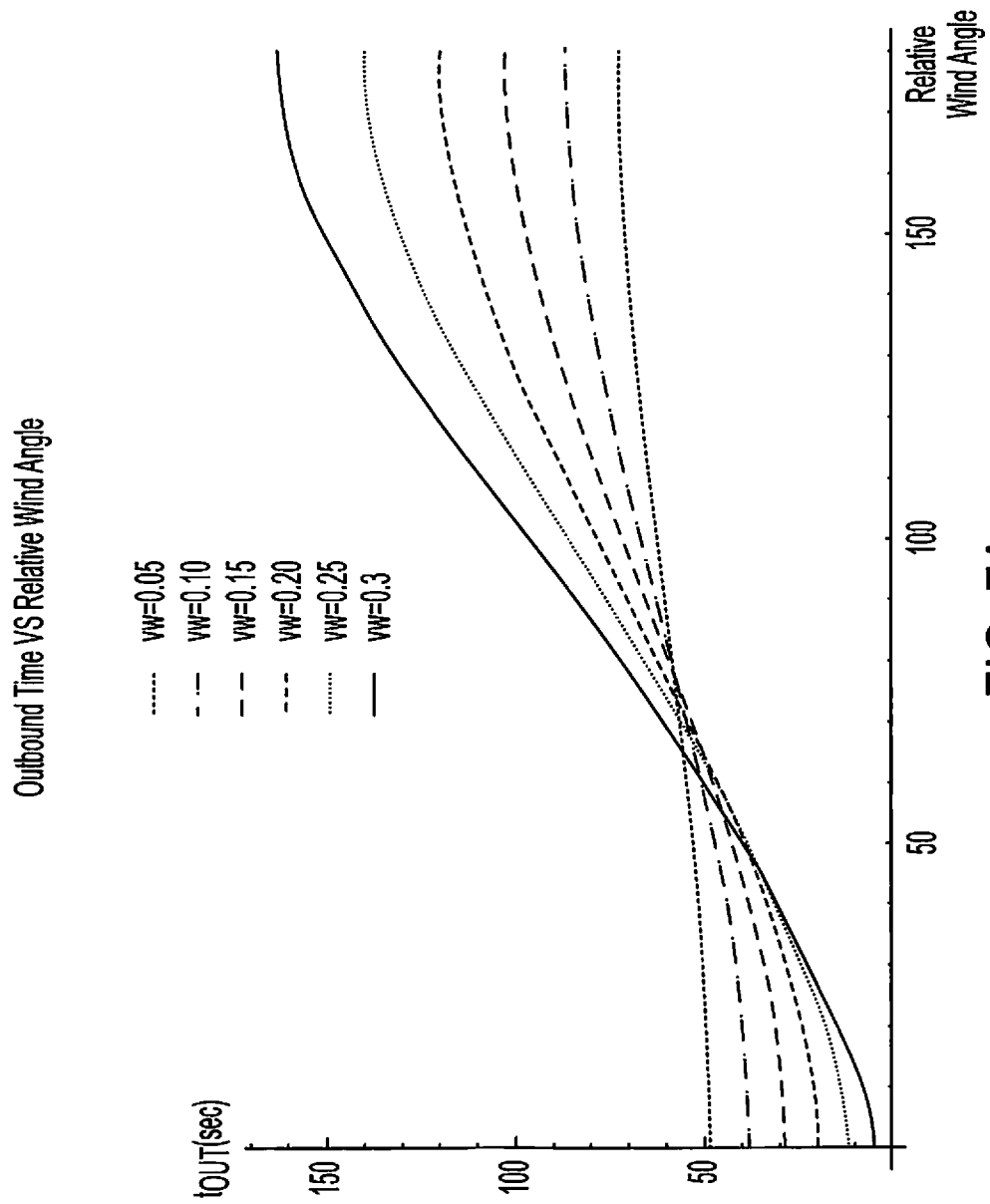
FIG. 7A is a graph showing the outbound time measured from the point that the aircraft has turned to the required outbound heading versus relative wind angle for six values of the windspeed ratio according to various embodiments described below.

FIG. 7A shows the outbound time measured from the point that the aircraft has turned to the required outbound heading $\theta_H$. Note that as the windspeed ratio approaches ⅓, with α→0 the outbound time approaches zero. This is consistent with the limiting case of the headwind discussed previously. It can be seen that one would like to keep the windspeed ratio at or below 0.25 in order for the IFR pilot to have a reasonable amount of time to fly the outbound leg before turning inbound to re-intercept the inbound course.

A rule of thumb for correcting the outbound time as a function of the windspeed states decrease the outbound time 2 seconds per 1 knot of tailwind on the outbound leg (i.e. a headwind on the inbound leg) and increase the outbound time 2 seconds per 1 knot of headwind on the outbound leg (i.e. a tailwind on the inbound leg). FIG. 7A shows the required outbound time for various windspeed ratios. These ratios are shown for an increment of $\overline{V}_W = 0.05$. Note that gradient of the outbound time with respect to the windspeed ratio is not the same for the headwind and the tailwind cases. The tailwind case on the inbound leg has a larger gradient in outbound time for a given change in the windspeed ratio when compared to the headwind case on the inbound leg. In addition, the outbound time gradient is also a function of the aircraft $V_{TAS}$, whereas, the rule-of-thumb is independent of the aircraft $V_{TAS}$. Using eq. (57) for the case of a headwind on the inbound leg, and eq. (59) for the case of a tailwind on the inbound leg, the outbound time gradients for the headwind and tailwind cases can be expressed as $$\left(\frac{dt_{out}}{dV_W}\right)HW = \frac{-240}{V_{TAS}(1 + \overline{V}_W)^2} \quad (73)$$

-continued $$\left(\frac{dt_{out}}{dV_W}\right)TW = \frac{240}{V_{TAS}(1-\overline{V}_W)^2}$$

These gradients are a function of the windspeed ratio. Note, for $V_{TAS}=100$ knots, the outbound time gradient is given by $$\left(\frac{dt_{out}}{dV_W}\right)HW = \frac{-2.4}{(1+\overline{V}_W)^2} \quad (74)$$

$$\left(\frac{dt_{out}}{dV_W}\right)TW = \frac{2.4}{(1-\overline{V}_W)^2}$$

When $\overline{V}_W=0.2$, the outbound time gradient on a headwind is 1.67 seconds/knot, whereas on a tailwind, the outbound time gradient is 3.75 seconds/knot. Consequently, using a constant value for both headwind and tailwind is not correct.

Figure 7B:
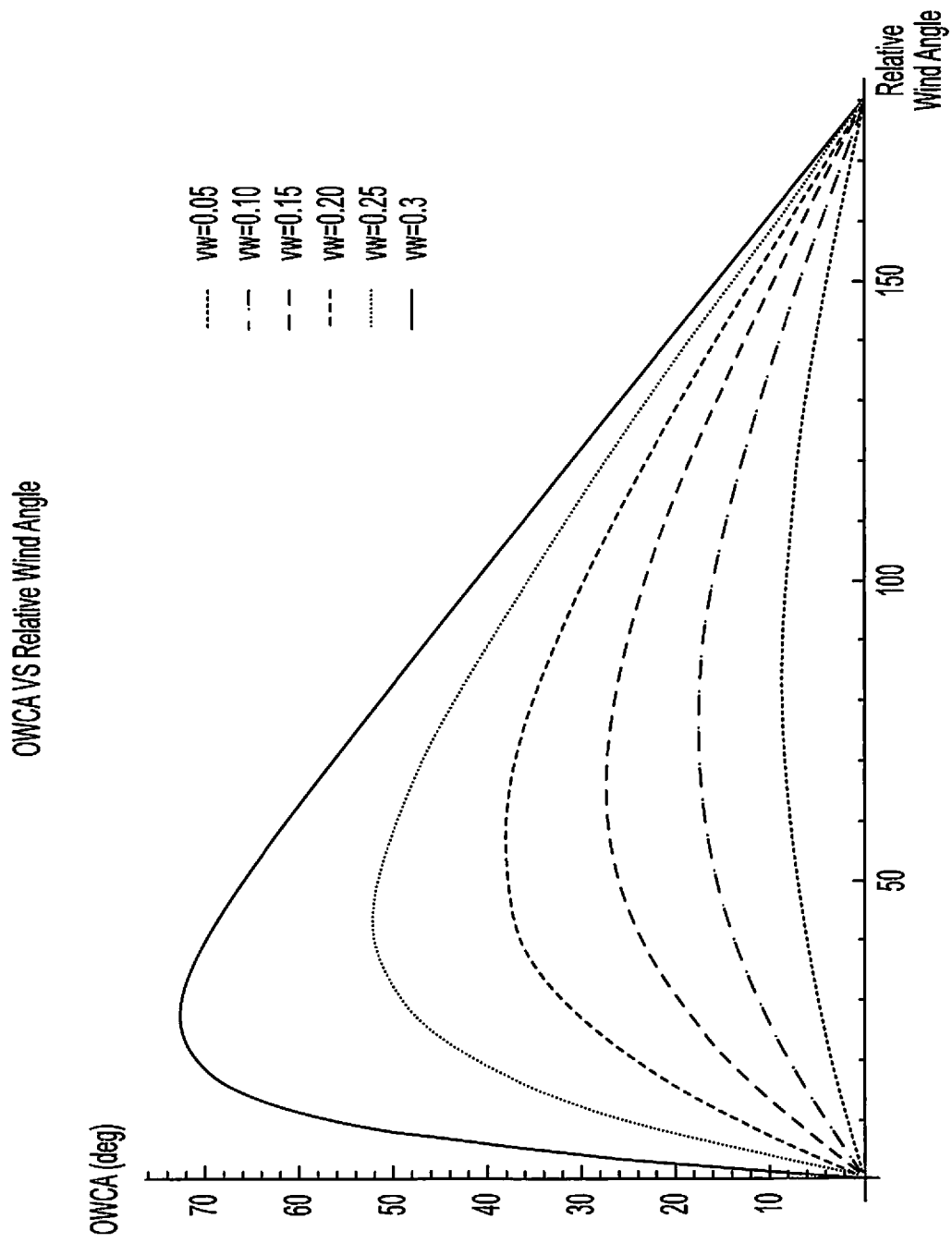
FIG. 7B is a graph showing the outbound wind correction angle versus relative wind angle for six values of the windspeed ratio according to various embodiments described below.

FIG. 7B shows the OWCA versus the relative wind angle $\alpha$. Note that the OWCA is determined by OWCA=$M$-Factor*IWCA (75)

It should be understood that although the M-Factor is a maximum at $\alpha=0$, the IWCA is zero and thus, the OWCA is identically zero on the headwind. It can be seen that the OWCA reaches a maximum somewhere between $0 \leq \alpha \leq 90$ degrees. However, as the windspeed ratio increases, the peak shifts toward $\alpha=0$. Consequently, the conventional recommendation of an M-Factor of 3 completely misses the large OWCA at both the higher values of $\overline{V}_W$ and when $\alpha<70$ degrees.

Figure 8:
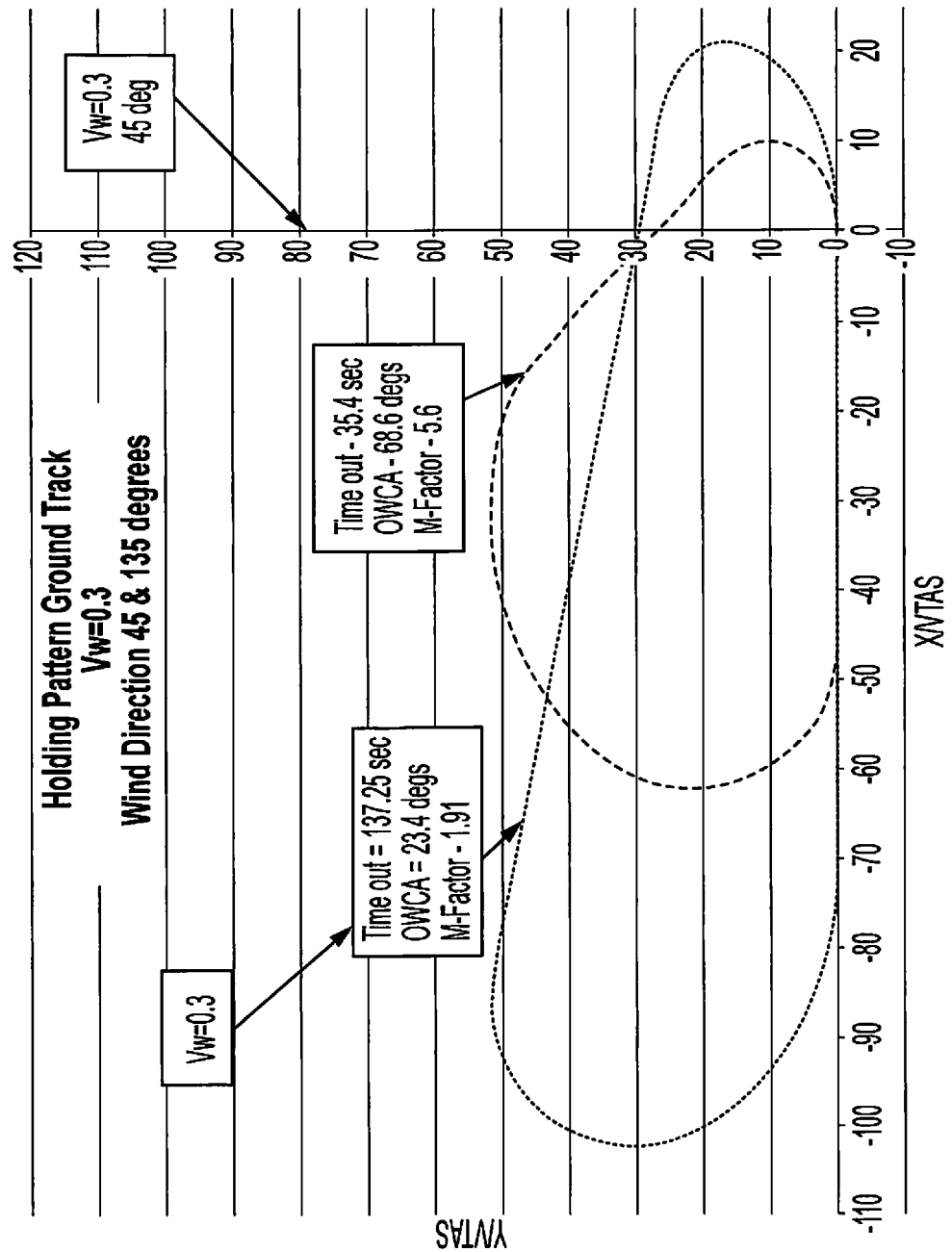
FIG. 8 is a top view of holding patterns showing ground tracks of an aircraft given relative wind directions of 45 and 135 degrees and a windspeed ratio of 0.3 according to various embodiments described below.

FIG. 8 shows a comparison of the holding patterns for $\alpha=45$ and 135 degrees, corresponding to a windspeed ratio of 0.3. Note the significant difference in the OWCA between the two cases. In the case of a tailwind component on the inbound course, the aircraft must be flown further outbound in order to meet the required one-minute inbound leg. In order to prevent the aircraft from undershooting the inbound course, the OWCA must be smaller. Since the IWCA will be the same in both cases, it can easily be seen that the M-Factor in the tailwind case will be smaller than in the headwind case.

Figure 9A:
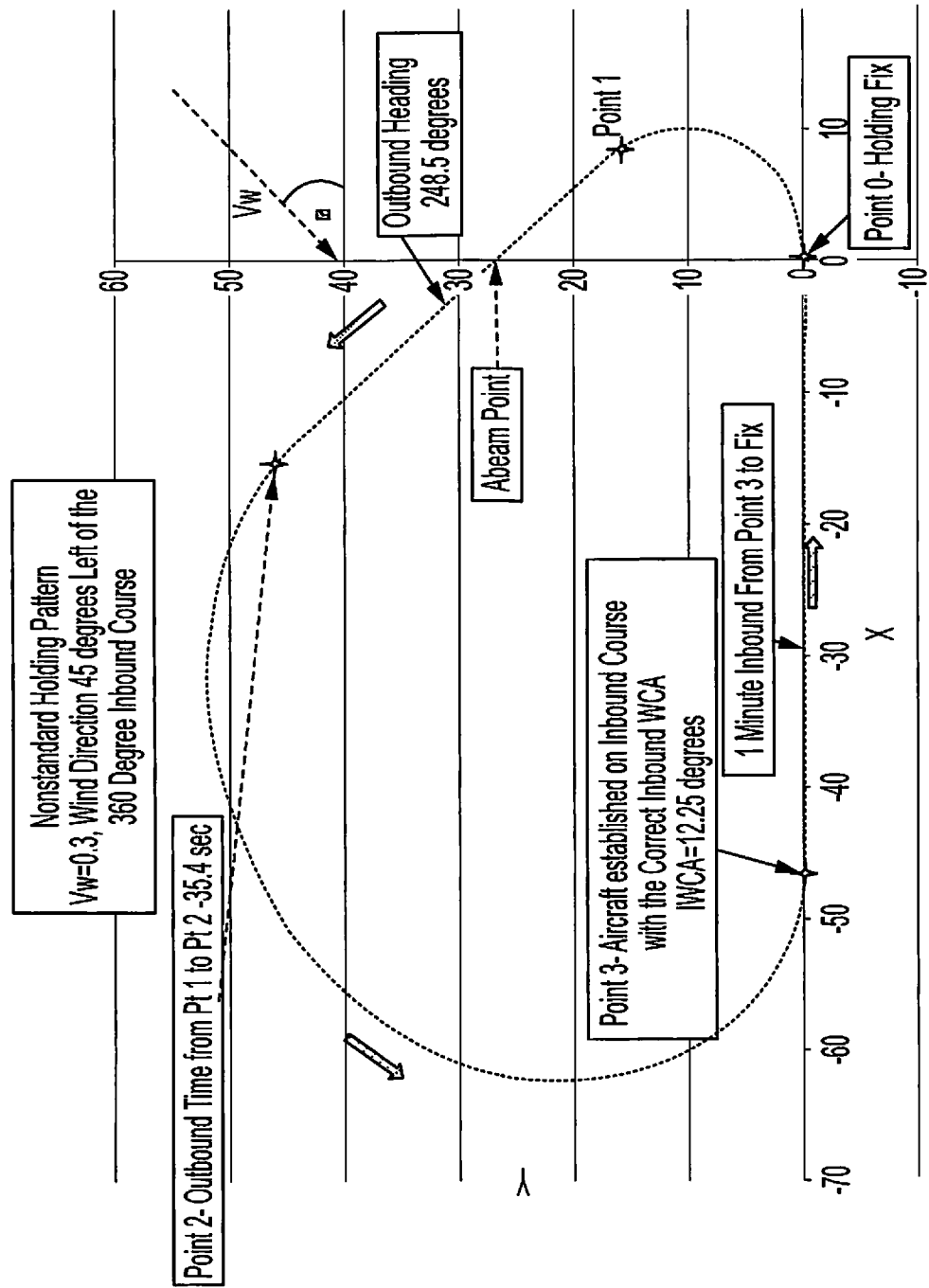
FIG. 9A is a top view of a holding pattern showing a ground track of an aircraft given a relative wind speed and direction according to various embodiments described below.

As an example of a Type-1 holding pattern, consider the case where $\alpha=45$ degrees and $\overline{V}_W=0.3$. FIG. 9A shows the normalized x-y coordinates of the holding pattern, with the outbound time and outbound heading shown. Note that the headings that are annotated on the holding pattern now correspond to the heading that would be indicated on the aircraft Heading Indicator (HI). Since on the outbound leg the aircraft is turned 111.5 degrees from the inbound course, this would correspond to the HI reading 248.5 degrees when the inbound course is 360 degrees. Here the outbound time, measured from the point at which the aircraft turns to the outbound heading, is 35.4 seconds. In this case the IWCA is 12.2 degrees, so the M-Factor for this case is 5.6 (i.e. (180−111.5)/12.2), which is nearly twice the AIM recommendation for the M-Factor. This particular holding pattern solution has been tested on a Frasca 131 FTD. The results of the flight simulation were that (1) The aircraft re-intercepted the inbound course with the CDI centered and (2) The aircraft reached the holding fix in 61 seconds, which confirms the holding pattern solution previously derived.

Although solutions for $0 \leq \alpha \leq 180$ and windspeed ratios up to 0.3 have been shown, the case of the direct crosswind in the holding pattern will now considered. This particular case has a very simple closed form solution for both the outbound heading and outbound time. In the crosswind case, $\alpha=90$ degrees and thus, $\cos(90)=0$, and $\sin(90)=1$. Thus, the $a_i$ coefficients in eq. (23) become $$a_1 = \cos\sigma \quad (76)$$

$$a_2 = \frac{6}{k\beta}\sin\sigma$$

$$a_3 = -\cos\sigma\sin\sigma$$

Substituting eq. (76) into eq. (26) gives the following result $\theta_H$ $$\cos\theta_H = -\frac{(1-\overline{V}_W^2)^{\frac{3}{2}}}{(1+3\overline{V}_W^2)} \quad (77)$$

Using eq. (16), it can be seen that the outbound time in seconds is given by $$t_{out} = 60\frac{(1+3\overline{V}_W^2)}{(1-\overline{V}_W^2)} \quad (78)$$

The outbound time gradient for the crosswind case can be determined using eq. (78). The final result is given by the following equation $$\left(\frac{dt_{out}}{dV_W}\right)_{xwind} = \frac{480\overline{V}_W}{V_{TAS}(1-\overline{V}_W^2)^2} \quad (79)$$

In the case $\overline{V}_W=0.2$ and a value of $V_{TAS}=100$ knots, the outbound time gradient is 1.04 seconds/knot. Again, using a constant value of the outbound time gradient for all values of the relative wind would not be correct.

Figure 9B:
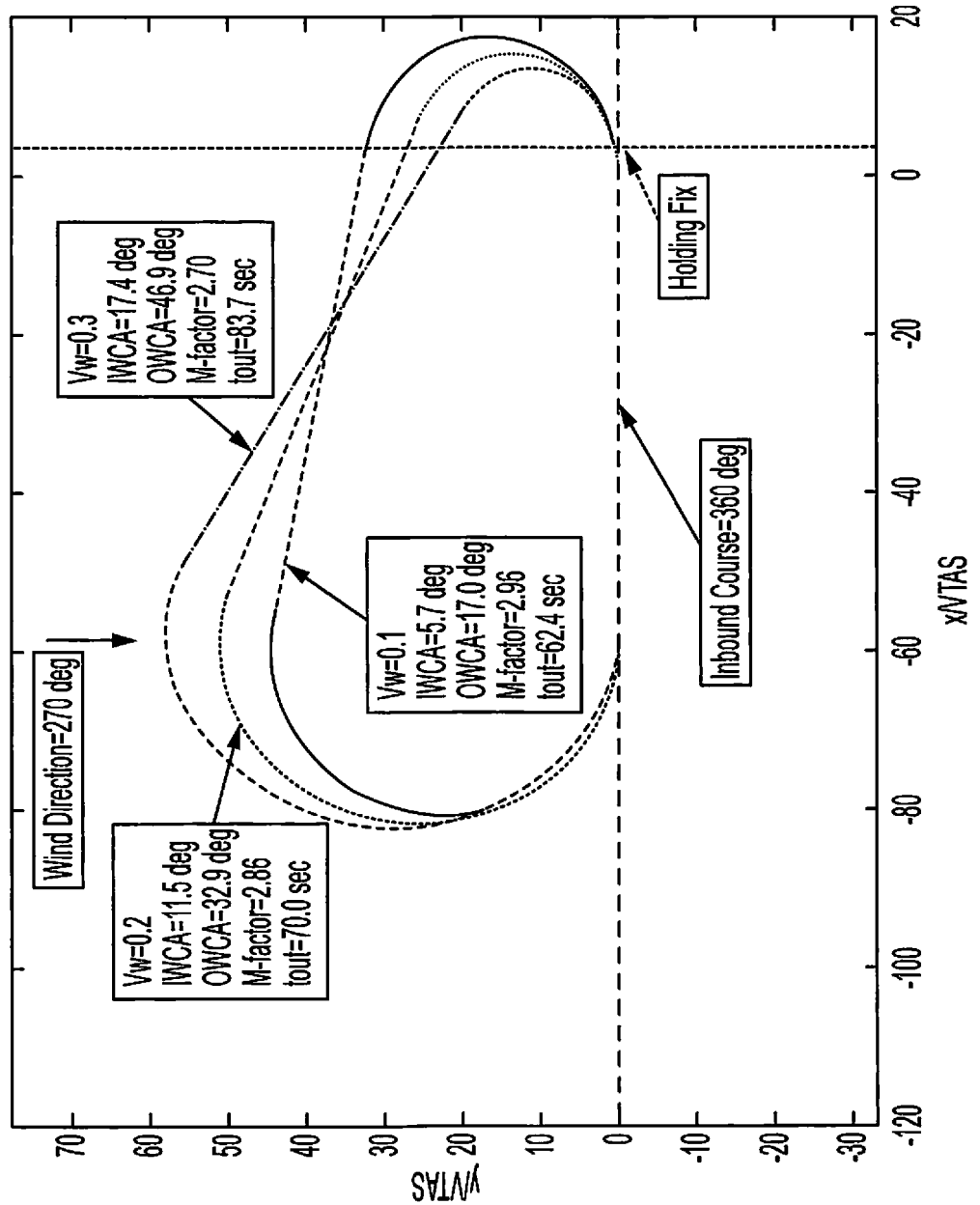
FIG. 9B is a top view of holding patterns showing ground tracks of an aircraft given various one relative wind direction and three wind speeds according to various embodiments described below.

If eq. (77) is expanded in the limit of $\overline{V}_W \rightarrow 0$, it is seen that the M-Factor approaches 3, and thus, in this limit, the OWCA$\rightarrow$3*IWCA. FIG. 9B shows the ground tracks for the crosswind case for values of $\overline{V}_W=0.1$, 0.2, and 0.3. It can be shown by series expansion methods, that for arbitrary $\alpha$, in the limit of $\overline{V}_W \rightarrow 0$, the M-Factor$\rightarrow$3. This result can be seen in FIG. 6B for small values of $\overline{V}_W$.

In the general weak wind limits, the M-Factor approaches $(1+6/k*\beta)$ and depends on the turn rate k and the inbound time $\beta$. To illustrate why the M-Factor is 3 in the limit of $\overline{V}_W \rightarrow 0$ the holding pattern with a one-minute inbound leg will be considered. In this limit, it is assumed that the outbound time is close to one minute. Since the time for the two turns add up to two minutes, the total time for the three legs is 3 minutes. The component of the wind perpendicular to the inbound course is given by $V_W \sin\alpha$. Thus, during the 3 minutes, the aircraft will drift a distance of $3V_W \sin\alpha$ perpendicular to the inbound course. Since this distance can only be made up on the outbound leg, the OWCA, $\delta$, can be expressed by $$\sin\delta\frac{3V_W\sin\alpha}{V_{TAS}} = 3\overline{V}_W\sin\alpha \quad (80)$$

Using the IWCA given in eq. (1), $$\frac{\mathrm{Sin}\delta}{\mathrm{Sin}\sigma} = \frac{3\overline{V}_W \mathrm{Sin}\alpha}{\overline{V}_W \mathrm{Sin}\alpha} = 3 \quad (81)$$

Note, for small values of both the IWCA and OWCA, eq. (81) can be written as $$\frac{\mathrm{Sin}\delta}{\mathrm{Sin}\sigma} \approx \frac{\delta}{\sigma} = 3 \quad (82)$$

The above argument clarifies the origin of factor of 3 between the OWCA and the IWCA, and shows the factor of 3 only applies to the case of the weak-wind limit.

Prior to the late 1980's, the recommendation was to use a factor of 2 between the OWCA and the IWCA. This was based on the incorrect assumption that the pilot only needed to correct the wind drift during the 2 minutes of turning flight. Note that if eq. (82) is substituted into eq. (16), and using the fact that the Sin $\delta$=Sin $\theta_H$, confirms that in this limit, the outbound time is one minute. Conventional practices include bounding the M-Factor between 2 and 3. However, bounding the M-Factor between 2 and 3 does not properly account for how the wind affects the OWCA. The true variation of the M-Factor is shown in FIGS. 6a and 6b.

Figure 9C:
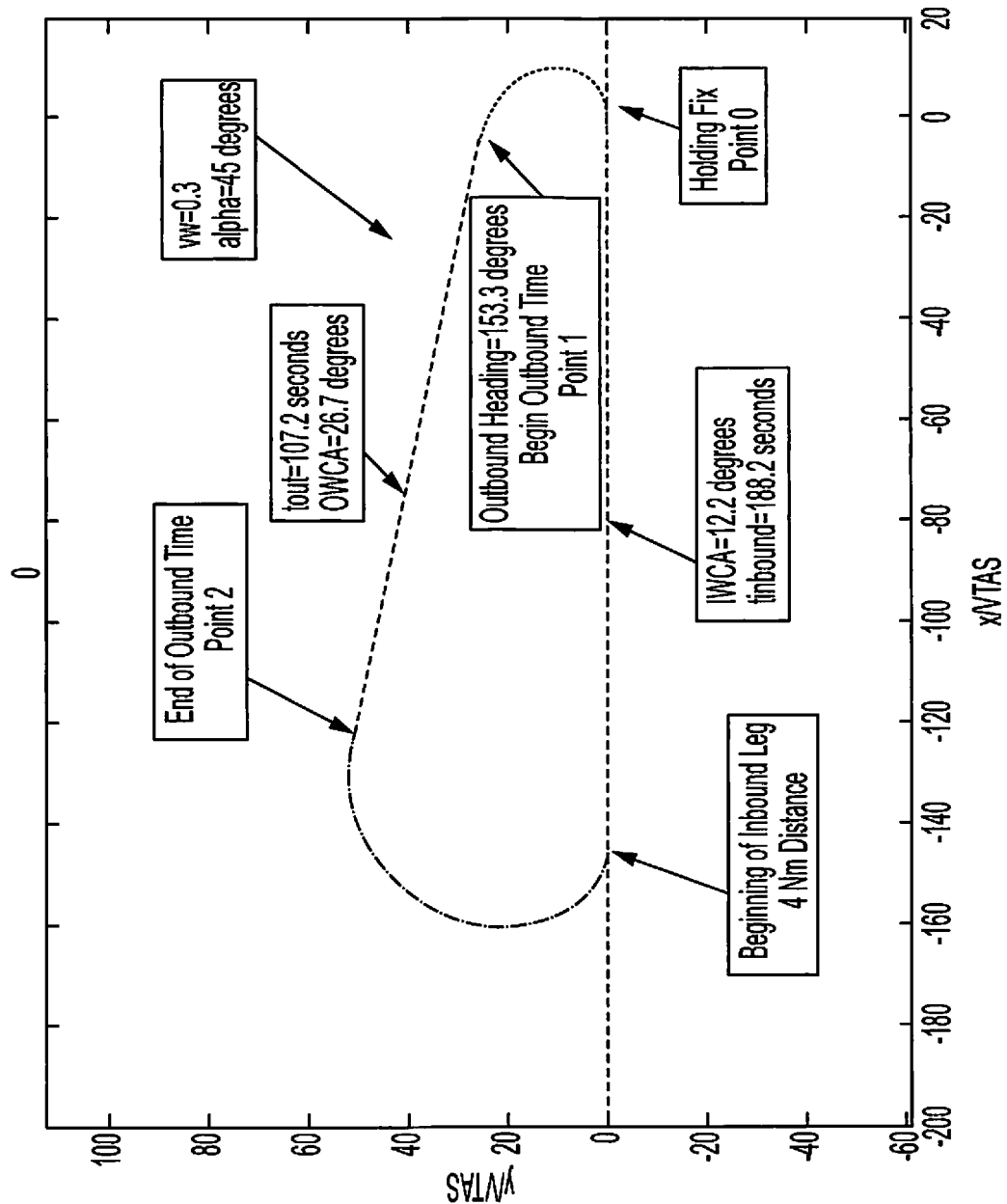
FIG. 9C is a top view of a holding pattern showing an example of a 4 nm inbound leg, instead of a minute inbound leg according to various embodiments described below.

Finally, FIG. 9C, shows an example of determining the holding pattern solution for the case of a 4 nm inbound leg, instead of a minute inbound leg. Here, the identical wind speed ratio and direction as in FIG. 9A is used. In both cases the TAS for is 100 knots. The required value of the inbound time for the 4 nm inbound leg is 3.14 minutes.

Holding Pattern with an Arbitrary Wind (Type-2)

Although Type-2 holding patterns will be encountered in strong wind conditions with the inbound course being flown on a headwind component, IFR pilots should understand the complexity of this type of holding pattern. In this case, the outbound time can control the undershoot or overshoot of the interception of the inbound course, whereas, the outbound heading can control the inbound time. This is completely contrary to the way Type-1 holding patterns are flown.

Figure 10:
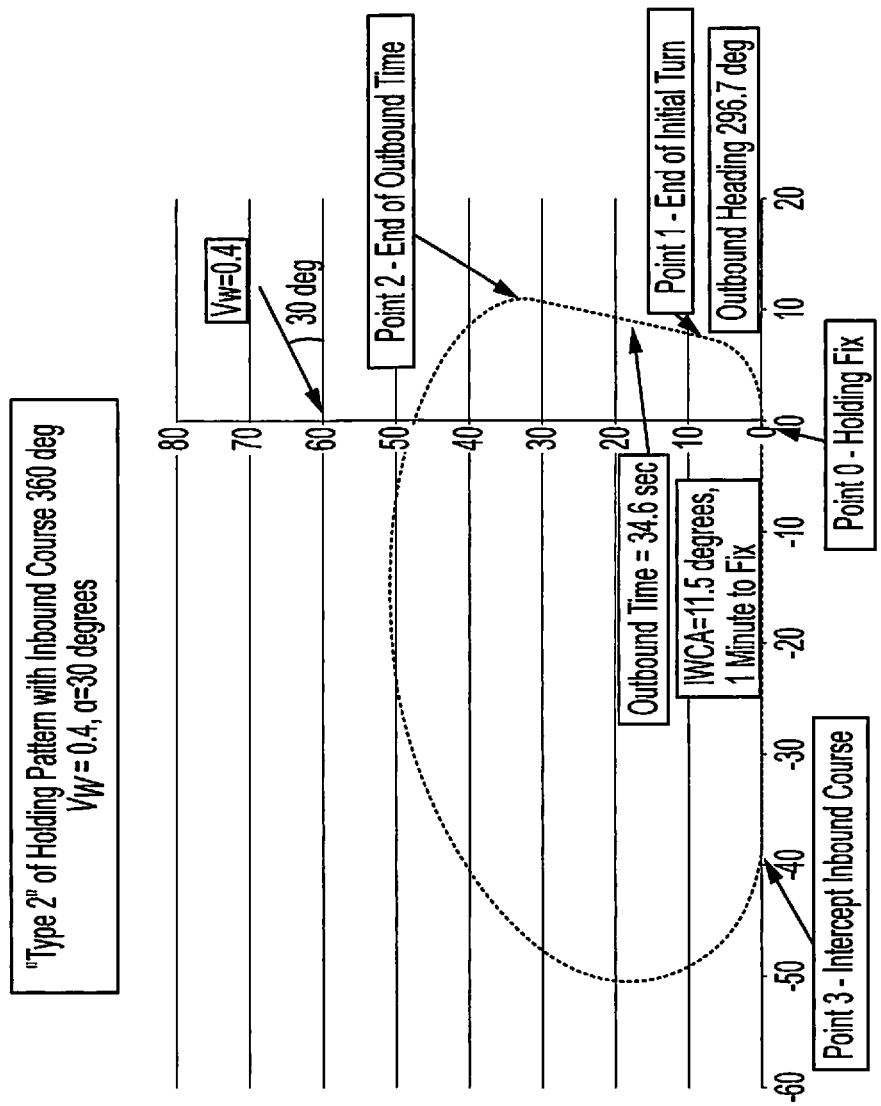
FIG. 10 is a top view of a Type 2 holding pattern according to various embodiments described below.

Using FIG. 3A, which shows the boundary between the Type-1 and Type-2 holding patterns, 310 and 320 respectively, in $\nabla_W$-$\alpha$ a space, the value $\alpha$=30 degrees and the value $\nabla_W$=0.4 are selected. It can be seen that this wind combination would shift the aircraft into the Type-2 holding pattern region. The solution of this Type-2 holding pattern is shown in FIG. 10. In this particular holding pattern the IWCA is 11.5 degrees. However, in this case, the aircraft relative outbound heading is 63.3 degrees from the inbound course and is flown on this heading for 34.6 seconds. The aircraft then turns to a relative heading of 348.5 degrees (i.e. 360−11.5), re-intercepts the inbound course and flies exactly one minute to reach the holding fix. This Type-2 holding pattern was simulated on a Frasca 131 FTD with the following results: (1) The aircraft re-Intercepted the inbound course with the CDI centered and (2) The inbound time was 59 seconds, thereby validating the holding pattern solution.

The completely different shape of this holding pattern as compared to the Type-1 holding pattern previously shown should be noted. It can be seen that the outbound heading is controlling the inbound time, whereas, the outbound time is controlling the undershoot/overshoot of the inbound course.

This result is completely opposite to the conventional manner in which the Type-1 holding pattern is typically flown. Consequently, without prior knowledge of this type of holding pattern, the IFR pilot would spend a considerable amount of time trying to get the one-minute inbound time correct, and even seasoned IFR pilots may not be able fly this pattern correctly.

Figure 11:
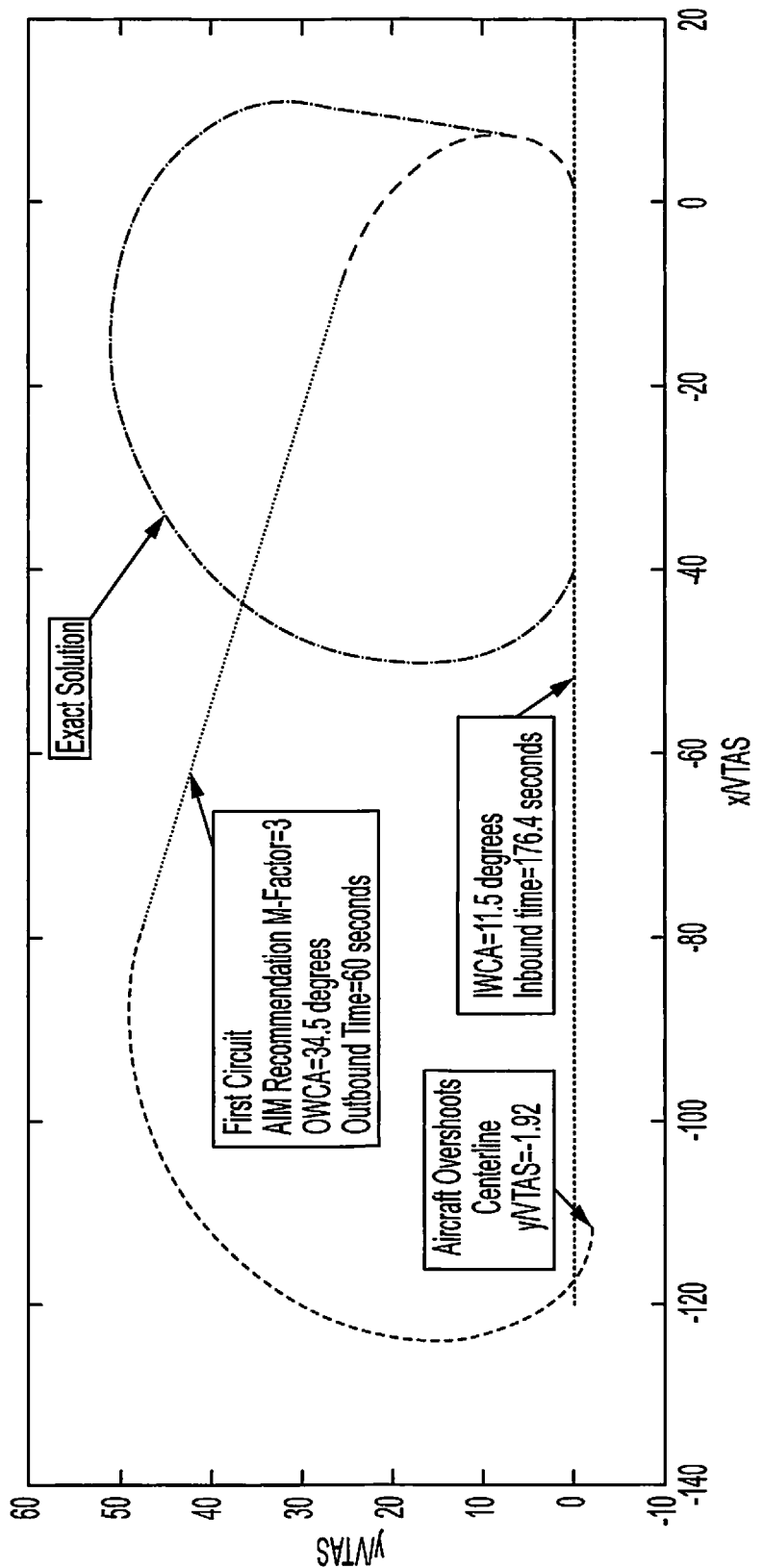
FIG. 11 is a top view of a holding pattern showing a ground track of an aircraft track on the first circuit when using the AIM recommendations for the outbound wind correction angle according to various embodiments described below.

As an example, in FIG. 11 the aircraft track on the first circuit when flying the holding pattern using the AIM recommendations for the OWCA is shown. It is assumed that the IFR pilot has intercepted the inbound course and has determined the IWCA to be 11.5 degrees for these wind conditions (i.e., $\nabla_W$=0.4 and $\alpha$=30 degrees). Using an M-factor of 3, the pilot turns the aircraft outbound to a relative heading of 145.5 degrees from the inbound course (360 degrees), which puts the aircraft on a heading of 214.5 degrees. The pilot then flies for 60 seconds between points 1 and 2, and then turns the aircraft to a heading of 360 degrees plus the IWCA, i.e. the aircraft heading is 348.5 degrees. At this time, the pilot observes that the aircraft has overshot the inbound course by an amount $$\frac{\Delta y}{V_{TAS}} = 1.92.$$

If the TAS of the aircraft is 90 knots, the overshoot is only about 292 feet. Note that the segment from point 3 to 0 does not need to be completed, since the aircraft at this point in time, will fly parallel to the x-axis and provide an accurate inbound time to the holding fix. This time would be identical to the above inbound time, had the aircraft re-intercepted the inbound course and flew directly to the fix. The pilot then has a choice of flying directly to the fix or turning the aircraft slightly to the left and re-intercept the inbound course. If the pilot flies directly to the fix, the inbound time to the fix will be approximately 176.5 seconds. This is nearly a 3-minute inbound leg. The pilot's first thought is to increase the OWCA slightly because of overshooting the inbound course. However, the pilot must shave off nearly 2 minutes in order to meet the required one-minute inbound time to the fix. The pilot may realize that he/she needs to fly past the fix and turn less than 90 degrees, but there are no guidelines as the required heading and the outbound time. As a result, the pilot may become confused and frustrated. As a point of interest, in this type of holding pattern, there is no way to identify the abeam point for starting the outbound time. Accordingly this Type-2 holding pattern is difficult to fly by even seasoned IFR pilots.

IFR pilots should avoid being forced into flying a Type-2 holding pattern, i.e. the pilot should increase the aircraft's TAS such that the windspeed ratio is less than ⅓. In fact, keeping the windspeed ratio below 0.25 will allow the pilot to fly the familiar Type-1 holding pattern with a sufficient amount of outbound time before turning to re-intercept the inbound course and achieve the one-minute inbound time.

Comparison of Exact Solution with AIM Recommendations for First Circuit

In the following section, techniques that can be used when flying a Type-1 holding pattern that will allow the IFR pilot to converge to the holding pattern solution in a minimum number of circuits will be discussed.

Proper Technique for Flying the Type-1 Holding Pattern

Up to this point, Type-1 and Type-2 holding patterns have been discussed.

Recommendations have been made for flying the holding patterns below a windspeed ratio of 0.25 to avoid the conventionally problematic Type-2 holding pattern. Accordingly, this section will concentrate on flying the Type-1 holding pattern.

In general, IFR pilots undergoing training in the area of holding patterns are instructed to fly the initial holding pattern by determining the IWCA and multiplying its value by 3 to obtain the OWCA. The initial outbound leg is flown for either 60 seconds or 90 seconds, depending on the aircraft altitude. From then on, all corrections are made in the following manner: (a) Timing: Decrease the outbound time when the inbound time is greater than the prescribed inbound time and increase the outbound time when the inbound time is less than the prescribed inbound time; and (b) Wind Correction: Increase the OWCA when overshooting the inbound course and decrease the OWCA when undershooting the inbound course. This process is one of trial and error in attempting to converge to the holding pattern solution. Recall, the converged solution occurs when the aircraft meets the required inbound time with the aircraft intercepting the inbound course at the time the aircraft's heading is equal to that of inbound course plus the IWCA. In fact, as will be discussed in greater detail below, this method is very inefficient in converging to the correct holding pattern solution. It will now be shown that using a formal systematic process will actually converge to the holding pattern solution in a minimum number of circuits. This methodology is developed below.

The exact solution to the holding pattern problem provides information on how to converge the holding pattern to the correct solution. Recall from FIG. 1, the holding fix is located at the point $\bar{x}=0, \bar{y}=0$. Since the aircraft starts at the holding fix and then flies four segments, returning back to the holding fix, the following two equations are provided for $\bar{x}$ and $\bar{y}$ $$\bar{x} = (Cos\theta_H - \bar{V}_W Cos\alpha)t_{out} + \qquad (83)$$
$$(Cos\sigma - \bar{V}_W Cos\alpha)(60\beta) - \left(\frac{360}{k}\right)\bar{V}_W Cos\alpha$$

$$\bar{y} = (Sin\theta_H - \bar{V}_W Sin\alpha)t_{out} - \left(\frac{360}{k}\right)\bar{V}_W Sin\alpha \qquad (84)$$

Note that when k=3 degrees/sec, the last term in the above equations represents the two-minute time to turn 360 degrees, multiplied by the component of the wind in the x and y directions. The second term in eq. (83) corresponds to inbound leg of the holding fix. The terms which have $t_{out}$ as multipliers, represent the distance traveled in the x and y directions during the outbound time. For a given windspeed and direction, any error in the aircraft position when returning to the holding fix, must be corrected on the outbound leg. Thus, the deviation from $\bar{x}=0, \bar{y}=0$, can be obtained by differentiating equations (83) and (84) with respect to the variables $t_{out}$ and $\theta_H$, i.e.

$$d\bar{x} = \left(\frac{\partial \bar{x}}{\partial t_{out}}\right)\Delta t_{out} + \left(\frac{\partial \bar{x}}{\partial \theta_H}\right)\Delta\theta_H \qquad (85)$$
$$d\bar{y} = \left(\frac{\partial \bar{y}}{\partial t_{out}}\right)\Delta t_{out} + \left(\frac{\partial \bar{y}}{\partial \theta_H}\right)\Delta\theta_H$$

The partial derivatives multiplying the terms $\Delta t_{out}$ and $\Delta\theta_H$ are called influence coefficients, since they relate changes in $d\bar{x}$, which is related to an incorrect inbound time, and $d\bar{y}$, which is related to an undershoot or overshoot in re-intercepting the inbound course. The above equations introduce a concept in the holding pattern that is typically not discussed during IFR training. The concept, as discussed briefly above, is called the "Coupling Effect". The coupling effect brings in the concept that changes needed to the inbound time can occur by changes in both outbound time and OWCA. Whereas, changes needed to correct undershoots/overshoots can be made by changes in both outbound time and OWCA. This is in contrary to the IFR training methods stated above, that changes in inbound time are corrected by a change in outbound time, and changes in undershoots/overshoots are corrected by a change in OWCA.

Figure 12:
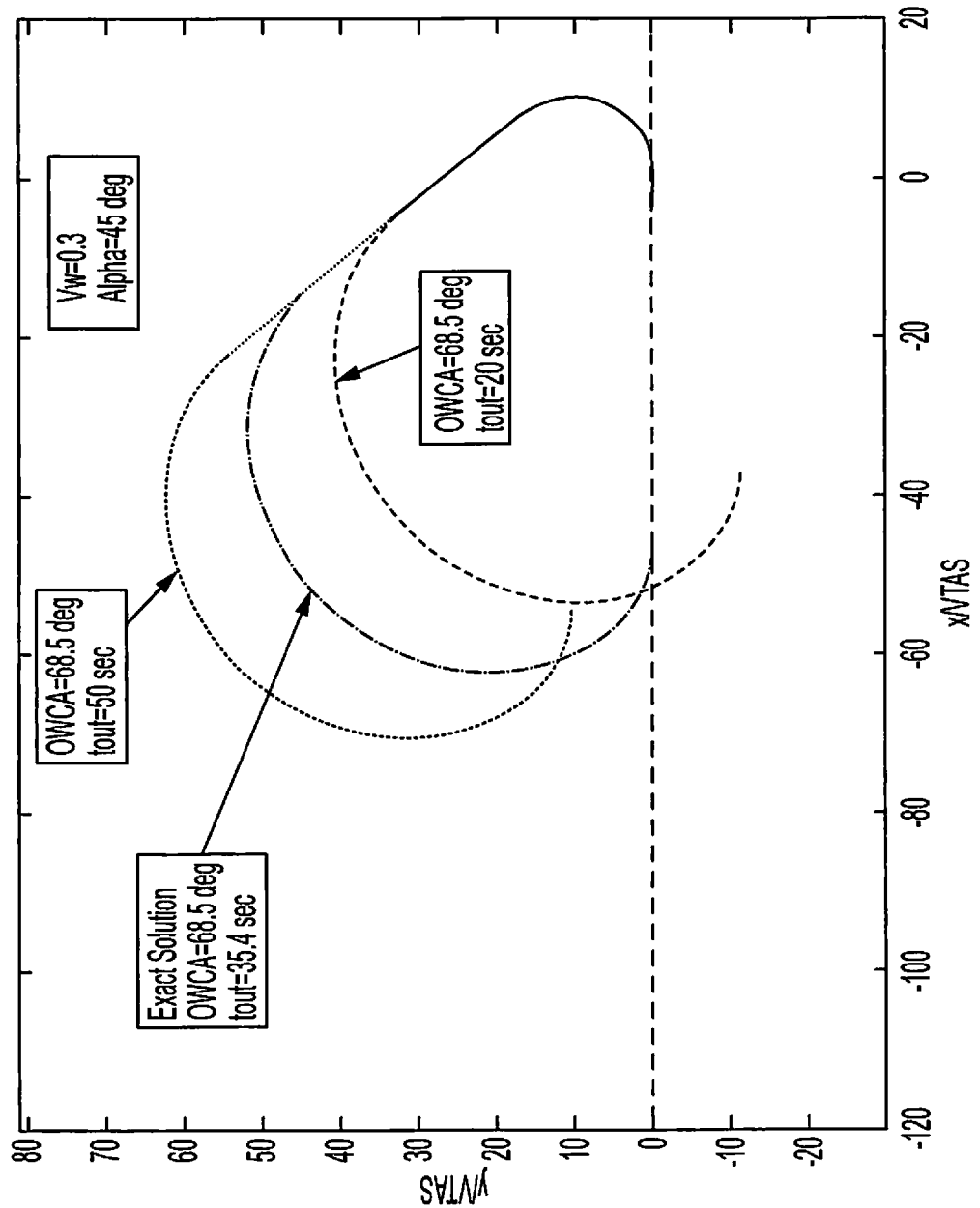
FIG. 12 is a top view of a holding pattern showing effects on a ground track of an aircraft when holding an outbound heading constant and changing the outbound time according to various embodiments described below.
Figure 13:
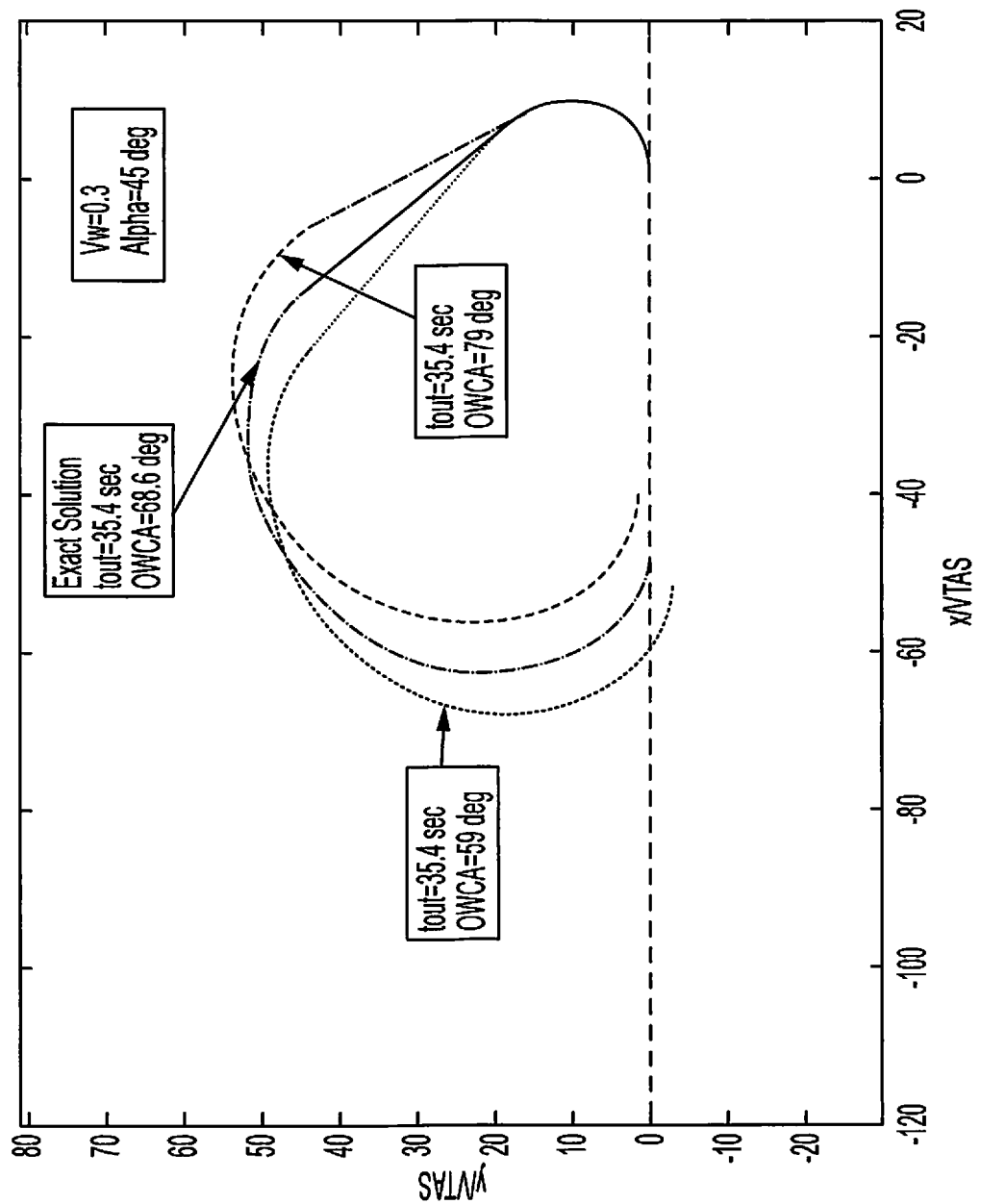
FIG. 13 is a top view of a holding pattern showing effects on a ground track of an aircraft when holding an outbound time constant and changing the outbound wind correction angle according to various embodiments described below.

As an example, consider the case $\bar{V}_W=0.3$ and $\alpha=45$ degrees, k=3, and $\beta=1$. FIGS. 12 and 13 demonstrate the concept of the coupling effect. FIG. 12 shows that when the outbound heading is held constant, changing the outbound time modifies both the inbound time and the overshoot/undershoot of the inbound course. Similarly, FIG. 13 shows that when the outbound time is held constant, changes in OWCA modify both the inbound time and the overshoot/undershoot of the inbound course.

The influence coefficients can be calculated directly from eqs. (85), i.e.

$$\frac{\partial \bar{x}}{\partial t_{out}} = Cos\theta_H - \bar{V}_W Cos\alpha \qquad (86)$$
$$\frac{\partial \bar{x}}{\partial \theta_H} = -t_{out} Sin\theta_H$$
$$\frac{\partial \bar{y}}{\partial t_{out}} = Sin\theta_H - \bar{V}_W Sin\alpha$$
$$\frac{\partial \bar{y}}{\partial \theta_H} = -t_{out} Cos\theta_H$$

Since the required changes in both $\Delta t_{out}$ and $\Delta\theta_H$ are desired, eq. (85) is inverted to obtain these variables in terms of the observed changes in both $d\bar{x}$ and $d\bar{y}$. Performing this inversion provides the following equations for both $\Delta t_{out}$ and $\Delta\theta_H$ $$\Delta t_{out} = \frac{Cos\theta_H d\bar{x} + Sin\theta_H d\bar{y}}{[1 - \bar{V}_W Cos(\theta_H - \alpha)]} \qquad (87)$$

and $$\Delta\theta_H = \frac{[Cos\theta_H - \bar{V}_W Cos\alpha]d\bar{y} - [Sin\theta_H - \bar{V}_W Sin\alpha]d\bar{x}}{t_{out}[1 - \bar{V}_W Cos(\theta_H - \alpha)]} \qquad (88)$$

The quantity $d\bar{x}$ can be related to the error in the inbound time using the following equation $$d\bar{x}=[Cos\ \sigma - \bar{V}_W Cos\ \alpha](t_{in}-60\beta) \qquad (89)$$

Note that the term in brackets is just the aircraft groundspeed on the inbound course to the fix, multiplied by the difference between the inbound time and the required inbound time. If the inbound time is less than the required inbound time, the aircraft would be beyond the holding fix after a time of $60\beta$, and thus, the pilot must introduce a value of $d\bar{x}<0$ in order to bring the aircraft back to the holding fix. When the inbound time is greater than $60\beta$, $d\bar{x}>0$ in order to bring the aircraft forward to the holding fix. Thus, early arrival requires $d\bar{x}<0$, and late arrival requires $d\bar{x}>0$. In regard to the aircraft overshooting or undershooting the inbound course, the following is true: (a) Overshooting the inbound course places the aircraft at a value of $\bar{y}<0$, and thus, to bring the aircraft upward onto the inbound course requires a value of $d\bar{y}>0$, and (b) Similarly, undershooting the inbound course requires a value of $d\bar{y}<0$ in order to move the aircraft downward onto the inbound course. Thus, after each complete circuit back to the holding fix, the estimated values of $d\bar{x}$ and $d\bar{y}$ necessary to bring the aircraft back to the holding fix are obtained. Using these values and the values of $\theta_H$ and $t_{out}$ used in the just completed circuit, the required changes in both $t_{out}$ and $\theta_H$ can be calculated for the next circuit.

Figure 14:
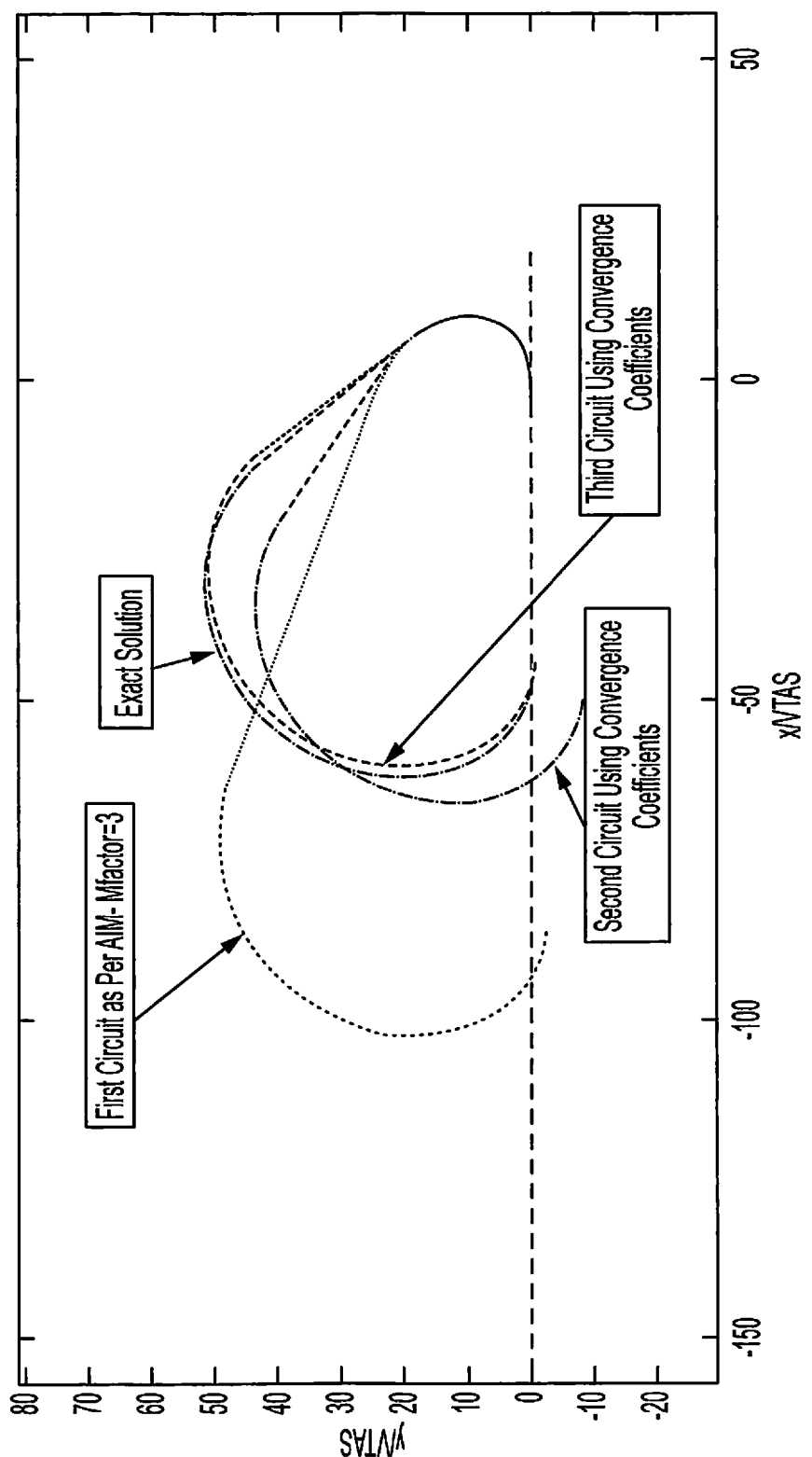
FIG. 14 is a top view of a holding pattern showing ground tracks corresponding to a convergence process through three circuits according to various embodiments described below.

This convergence process is shown in FIG. 14. Here it can be seen that the initial holding pattern (circuit 1), as recommended by the AIM (i.e. an M-factor=3) is quite far off from the exact solution of the holding pattern under these wind conditions. The outbound time and heading for circuit 2 are obtained by adding the changes in eqs. (87) and (88) to the values of $t_{out}$ and $\theta_H$ used in the previous circuit (i.e. circuit 1). This process is then used for each subsequent circuit, until the holding pattern converges to the correct solution. Note that using this smart-convergence algorithm, the holding pattern is essentially converged in two additional circuits, i.e. by circuit 3. The exact solution for this holding pattern is shown for comparison purposes. It should be noted that even with the smart-convergence algorithm, the initial guess for the holding pattern is a significant factor in rapidly converging to the exact solution. For example, if circuit 2 was the initial guess, the holding pattern would converge by the next circuit using this smart-convergence algorithm. Table 1 shows the results of the actual track of the holding pattern during this convergence process. In Table 1, the aircraft heading indicator is overlaid, so that the actual outbound heading for these circuits is shown. It can be seen that by circuit 3 the pilot is close to convergence, and by circuit 4, the pilot has converged to the exact solution.

It should also be noted that there are two cases that arise when analyzing eqs. (87) and (88). In eq. (87), it can be seen that the numerator becomes zero when $$\text{Cos } \theta_H d\bar{x} + \text{Sin } \theta_H d\bar{y} = 0 \qquad (90)$$

Under this condition, there would be no required change in $\Delta t_{out}$. Equation (90) can be rewritten as the dot product of the normalized TAS vector along the outbound segment, i.e. $\vec{V} = \text{Cos } \theta_H \hat{i} + \text{Sin } \theta_H \hat{j}$ and $\vec{\varepsilon} = d\bar{x}\hat{i} + d\bar{y}\hat{j}$. Where $\hat{i}$ and $\hat{j}$ are the unit vectors in the x and y directions, and $\varepsilon$ is the error vector between the holding fix and where the aircraft is located at the end of the required inbound time, 60β. Equation (90) is satisfied when the TAS vector on the outbound segment is orthogonal to the error vector for the just completed circuit. In this case, any changes in $t_{out}$ will not change the error vector.

In a similar fashion, the numerator of eq. (88) is identically zero when $$\frac{\partial \bar{y}}{\partial \bar{x}} = \frac{[\text{Sin}\theta_H - \bar{V}_W \text{Sin}\alpha]}{[\text{Cos}\theta_H - \bar{V}_W \text{Cos}\alpha]} \qquad (91)$$

Equation (91) shows that when the groundspeed vector on the outbound segment is parallel to the error vector in the just completed circuit, there will be no required change in the outbound heading for the next circuit. A change in outbound time will just change the magnitude of the error vector and not its direction. For example, if the correct value of $t_{out}$ was used on the next circuit, the error vector would be identically zero upon returning to the holding fix.

TABLE 1

Using the Holding Pattern Convergence Coefficients
($\bar{V}_W = 0.3$, $\alpha = 45$ degrees)

| Circuit Number | Time Out (sec) | Heading Out (sec) | Time In (sec) | Centerline Error/VTAS (sec) |
|---|---|---|---|---|
| 1 | 60 | 216.7 | 112.7 | −2.3 |
| 2 | 30.3 | 233.1 | 65.4 | −7.6 |
| 3 | 34.1 | 250.3 | 57.7 | −0.6 |
| 4 | 35.4 | 248.5 | 60.0 | −0.03 |

Figure 15:
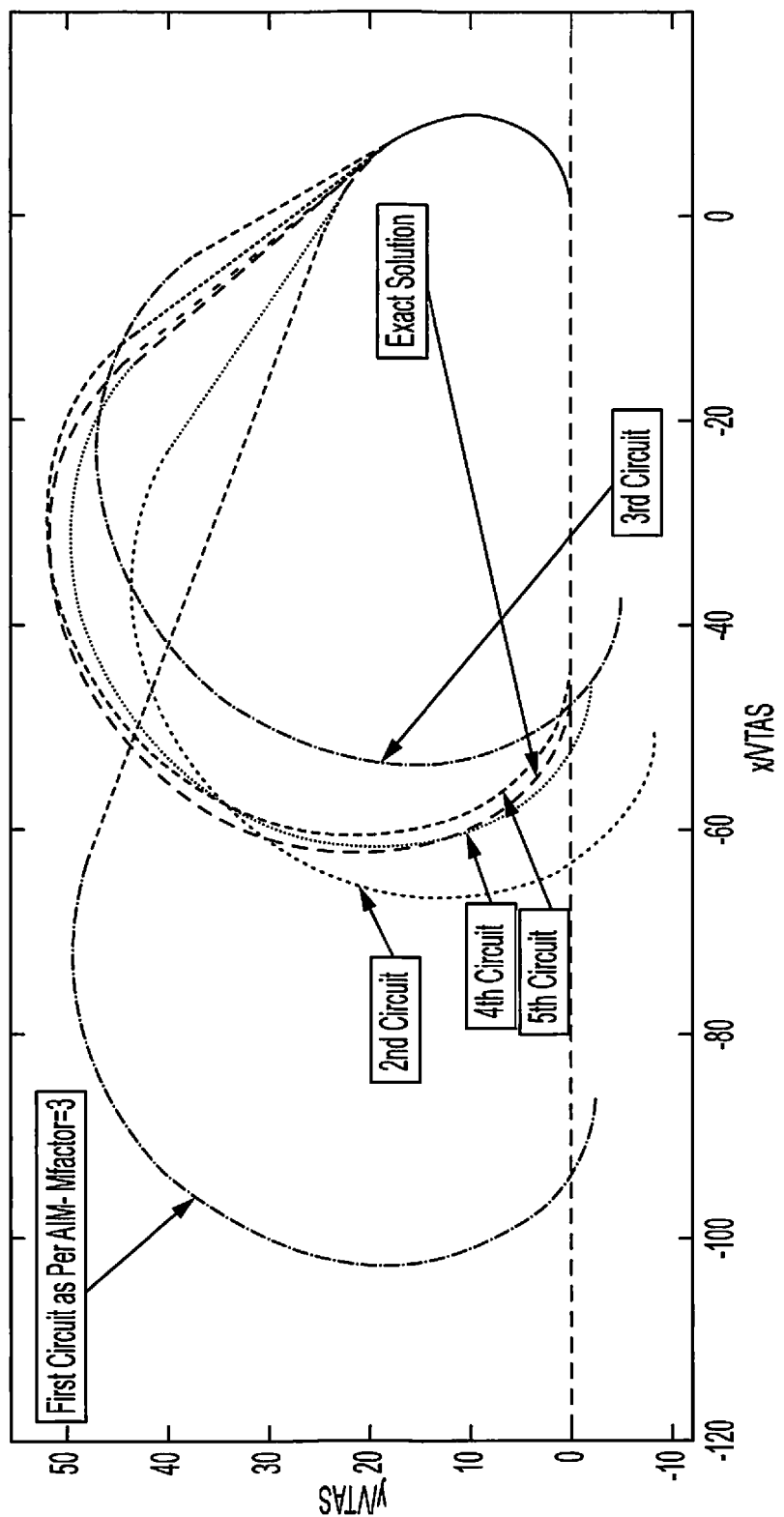
FIG. 15 is a top view of a holding pattern showing ground tracks corresponding to an attempt to converge to the exact solution of the holding pattern using the bracketing method according to various embodiments described below.

The example now considers an experienced IFR pilot attempting to converge the holding pattern using the bracketing method they were taught during their IFR training. The initial holding pattern is identical to that shown in FIG. 14. Table 2 shows the corrections the IFR pilot is making while attempting to fly the holding pattern. FIG. 15 shows the actual track of the aircraft during the IFR pilot's attempt to converge to the exact solution of the holding pattern using the bracketing method. Note that by the end of circuit 5 the IFR pilot, although close, has still not converged to the correct holding pattern. In fact, the error in both the outbound time and outbound heading after 5 circuits is nearly identical to the smart-convergence algorithm after 3 circuits. This difference in the number of circuits is due to the coupling effect not being taken into account during the IFR pilot's attempt to converge to the correct holding pattern.

TABLE 2

Average IFR pilot Attempting to Converge to the holding pattern Solution
($\bar{V}_W = 0.3$, $\alpha = 45$ degrees)

| Circuit Number | Time Out (seconds) | Heading Out (degrees) | Time In (seconds) | Centerline Error/VTAS (seconds) |
|---|---|---|---|---|
| 1 | 60 | 217 | 113 | −2.3 |
| 2 | 30 | 232 | 66 | −8.2 |
| 3 | 27 | 257 | 49 | −4.9 |
| 4 | 33 | 247 | 59 | −2.1 |
| 5 | 35 | 251 | 58 | 0.2 |

It is clear that there are two causes requiring the IFR pilot to need additional circuits to converge to the correct holding pattern solution. The first being the poor initial circuit that is based on the AIM recommendations, and the second being the obvious lack of understanding of the coupling effect between the outbound time and the outbound heading and their relationship to the incorrect inbound time and the overshoots/undershoots that occur while attempting to re-intercept the inbound course. A form of the smart-convergence algorithm that can be used in the bracketing method that will allow one to converge the holding pattern using fewer circuits will now be developed in the discussion below.

Detailed Comparison of the Bracketing Method and the Smart-Convergence Algorithm for Type-1 Holding Patterns The simplest method of nailing the holding pattern down correctly is to pick the outbound time and the M-Factor off FIGS. 6 and 7a. In fact, even eyeballing the inbound time and M-Factor would most probably nail the holding pattern down in two circuits. One might challenge the method by stating that the wind is not accurately known. However, using the latest technology of the GPS (or the E6B), a reasonably accurate current wind speed and direction is determined using the correct TAS and WCA (i.e. solving the inverse "Wind Triangle Problem") input by the pilots.

As is commonly known, doing mental arithmetic in the cockpit during a hold is a challenging task. However, using a table provided below, the information is readily available to the pilot corresponding to which direction to make changes in the outbound time and outbound heading, based on the inbound time and the overshoot/undershoot that occurs during the time the aircraft is re-intercepting the inbound course. In order to develop this table, the smart-convergence algorithm discussed above is used. This table is similar to a tic-tac-toe board or matrix with the three columns representing undershooting, on course, and overshooting the inbound course. Whereas, the three rows represent the aircraft arriving at the holding fix before the required inbound time, on time, or arriving at the holding fix later than the required inbound time. Note that the center box corresponds to the aircraft being on time and on the inbound course, and therefore, no changes are required.

First, the sign of the required changes in the quantities $d\overline{x}$ and $d\overline{y}$, and the product of $d\overline{x}*d\overline{y}$, are determined for each of the nine boxes on the table, i.e.

TABLE 3

Sign and product of $d\overline{x}$ and $d\overline{y}$
in Converging to Holding Pattern Solution

|  | Undershoot (dy < 0) | On Course (dy = 0) | Overshoot (dy > 0) |
|---|---|---|---|
| Inbound Time Early (dx < 0) | dx < 0 dy < 0<br>dx * dy > 0 | dx < 0, dy = 0<br>dx * dy = 0 | dx < 0 dy > 0<br>dx * dy < 0 |
| On Time (dx = 0) | dx = 0 dy < 0<br>dx * dy = 0 | dx = 0 dy = 0<br>dx * dy = 0<br>Converged | dx = 0 dy > 0<br>dx * dy = 0 |
| Inbound Time Late (dx > 0) | dx > 0 dy < 0<br>dx * dy < 0 | dx > 0 dy = 0<br>dx * dy = 0 | dx > 0 dy > 0<br>dx * dy > 0 |

Recall that the center box is the converged holding pattern solution. In this case, the pilot should continue to fly the previous outbound time and OWCA. Since the wind has some variability over 5-10 minutes, the holding pattern may change slightly from one circuit to the next. However, the perturbation should be minor, and in general, the solution should be close to the target solution previously achieved.

Equations (87) and (88) can now be used to determine whether $\Delta t_{out}>0$ or $\Delta t_{out}<0$, and whether $\Delta \theta_H>0$ or $\Delta \theta_H<0$. Note that the denominator of the coefficients in eqs. (87) and (88) is always greater than zero. Since the Type-1 holding patterns are being addressed, where the relative outbound heading is somewhere between 90 and 180 degrees, the sign of the coefficients of $d\overline{x}$ and $d\overline{y}$ are bounded in the following manner $$\text{Cos } \theta_H < 0$$

$$\text{Sin } \theta_H > 0 \tag{92}$$

The coefficient of $d\overline{x}$ in eq. (88) can be rewritten as $$\text{Sin}\sigma\left[\frac{\text{Sin}\theta_H}{\text{Sin}\sigma} - 1\right].$$

Using eqs. (47), (49) and (53), it is seen that $$\left[\frac{\text{Sin}\theta_H}{\text{Sin}\sigma} - 1\right]$$

is greater than zero for $$\overline{V}_W < \frac{1}{3}.$$

Manipulating eq. (22), and using the fact that $$\left[\frac{\text{Sin}\theta_H}{\text{Sin}\sigma} - 1\right] > 0,$$

it is seen that $\text{Cos } \theta_H - \overline{V}_W \text{Cos } \alpha < 0$ for $$\overline{V}_W < \frac{1}{3}.$$

Therefore, the signs of the remaining two coefficients are shown to be $$\text{Sin } \theta_H - \overline{V}_W \text{Sin } \alpha > 0$$

$$\text{Cos } \theta_H - \overline{V}_W \text{Cos } \alpha < 0 \tag{93}$$

The process will first concentrate on the required changes in the outbound time for required changes in both $d\overline{x}$ and $d\overline{y}$. The table can now be filled in with the required $\Delta t_{out}$. This is shown below in Table 4.

TABLE 4

Required Changes in Outbound Time $t_{out}$

|  | Undershoot (dy < 0) | On Course (dy = 0) | Overshoot (dy > 0) |
|---|---|---|---|
| Inbound Time Early (dx < 0) | dx < 0 dy < 0<br>$\Delta t_{out}$ = ? | dx < 0, dy = 0<br>$\Delta t_{out}$ > 0 | dx < 0 dy > 0<br>$\Delta t_{out}$ > 0 |
| On Time (dx = 0) | dx = 0 dy < 0<br>$\Delta t_{out}$ < 0 | dx = 0 dy = 0<br>Converged | dx = 0 dy > 0<br>$\Delta t_{out}$ > 0 |
| Inbound Time Late (dx > 0) | dx > 0 dy < 0<br>$\Delta t_{out}$ < 0 | dx > 0 dy = 0<br>$\Delta t_{out}$ < 0 | dx > 0 dy > 0<br>$\Delta t_{out}$ = ? |

Note that upper left and lower right corner boxes show $\Delta t_{out}$=? The smart-convergence algorithm shows that in these two cases, the $d\overline{x}$ and $d\overline{y}$ contributions to $\Delta t_{out}$ are of opposite sign, so that one needs to know the magnitude of each term before determining whether to increase or decrease the outbound time.

In a similar fashion, an equivalent table for the outbound heading $\theta_H$ can be generated. This is shown below in Table 5 below.

TABLE 5

Required Changes in the Outbound Heading $\theta_H$

|  | Undershoot (dy < 0) | On Course (dy = 0) | Overshoot (dy > 0) |
|---|---|---|---|
| Inbound Time Early (dx < 0) | dx < 0 dy < 0<br>$\Delta \theta_H$ > 0 | dx < 0, dy = 0<br>$\Delta \theta_H$ > 0 | dx < 0 dy > 0<br>$\Delta \theta_H$ = ? |
| On Time (dx = 0) | dx = 0 dy < 0<br>$\Delta \theta_H$ > 0 | dx = 0 dy = 0<br>Converged | dx = 0 dy > 0<br>$\Delta \theta_{out}$ < 0 |

TABLE 5-continued

Required Changes in the Outbound Heading $\theta_H$

|  | Undershoot (dy < 0) | On Course (dy = 0) | Overshoot (dy > 0) |
|---|---|---|---|
| Inbound Time Late (dx > 0) | dx > 0 dy < 0 $\Delta\theta_H$ = ? | dx > 0 dy = 0 $\Delta\theta_H$ < 0 | dx > 0 dy > 0 $\Delta\theta_H$ < 0 |

In this case, the upper right and lower left corner boxes in Table 5 show $\Delta\theta_H$=? Again, this indicates that the contributions from $\overline{dx}$ and $\overline{dy}$ are of opposite signs, and thus, one needs to know the magnitude of each term before determining whether to increase or decrease the outbound heading.

Since $\theta_H$ is the outbound heading relative to the inbound course, it is best to describe the required changes in terms of the outbound time and the OWCA. Recall that increasing $\theta_H$ reduces the OWCA and decreasing $\theta_H$ increases the OWCA. Equation (68) shows the relationship between the OWCA ($\delta$) and the relative outbound heading $\theta_H$. Table 6 shown below, is now described in terms of required changes in outbound time and OWCA.

TABLE 6

Pilot Corrective Actions to Converge to the Holding Pattern

|  | Undershoot (dy < 0) | On Course (dy = 0) | Overshoot (dy > 0) |
|---|---|---|---|
| Inbound Time Early (dx < 0) | Change in $t_{out}$ = ? Decrease OWCA | Increase $t_{out}$ Decrease OWCA | Increase $t_{out}$ Change in OWCA = ? |
| On Time (dx = 0) | Decrease $t_{out}$ Decrease OWCA | No Change in $t_{out}$ and OWCA | Increase $t_{out}$ Increase OWCA |
| Inbound Time Late (dx > 0) | Decrease $t_{out}$ Change in OWCA = ? | Decrease $t_{out}$ Increase OWCA | Change in $t_{out}$ = ? Increase OWCA |

Note that the four corners of Table 6, where both $\overline{dx}$ and $\overline{dy}$ are non-zero will have some uncertainty in either the outbound time or the OWCA, due to the competing effects of the $\overline{dx}$ and $\overline{dy}$ terms described earlier.

The results of Table 6, which utilizes the information from the smart-convergence algorithm, will now be compared with the bracketing method taught to IFR pilots during their training on holding patterns. In order to make the comparison, all changes that agree between the bracketing method and the smart-convergence algorithm are highlighted in italics. All changes that are not consistent between the two methods are highlighted in bold. In addition, changes that are required by the smart-convergence algorithm, but not required in the bracketing method are highlighted in underlines. These results are shown in Table 7 below.

TABLE 7

Comparison of Corrective Actions between Bracketing Method and Smart-Convergence Tool Algorithm

|  | Undershoot (dy < 0) | On Course (dy = 0) | Overshoot (dy > 0) |
|---|---|---|---|
| Inbound Time Early (dx < 0) | Increase $t_{out}$ *Decrease OWCA* | *Increase $t_{out}$* *Decrease OWCA* | *Increase $t_{out}$* Increase OWCA |
| On Time (dx = 0) | Decrease $t_{out}$ *Decrease OWCA* | *No Change in both $t_{out}$ and OWCA* | Increase $t_{out}$ *Increase OWCA* |
| Inbound Time Late (dx > 0) | *Decrease $t_{out}$* Decrease OWCA | *Decrease $t_{out}$* Increase OWCA | Decrease $t_{out}$ *Increase OWCA* |

It is clear from Table 7 that other than the center box, which corresponds to having achieved the correct holding pattern, all boxes have only one correct pilot response (as highlighted in italics). The corner boxes in Table 7 show four responses in bold which may or may not be the correct response. This is due to the competing terms attributed to the coupling effect. In addition, the boxes which have either $\overline{dx}$ or $\overline{dy}$ equal to zero, only have one input change when using the bracketing method, whereas, the smart-convergence algorithm requires an additional change in the other variable (i.e. highlighted in underlines), due to the coupling effect.

Based on the above tables, the reason that it takes more circuits to converge to the holding pattern solution when using the bracketing method can be identified, which is the lack of accounting for the coupling effect during the convergence process. Table 7 shows the complexity of the convergence process when the winds are not light, as is demonstrated in this particular example. Therefore, if IFR pilots continue to be trained using the bracketing method, the first circuit has to be as close as possible to the converged holding pattern, in order to avoid spending a considerable amount of time trying to converge to the holding pattern solution. If the initial circuit is far off, techniques will now be discussed for obtaining a better update for the next circuit without using the smart-convergence algorithm.

Figure 16:
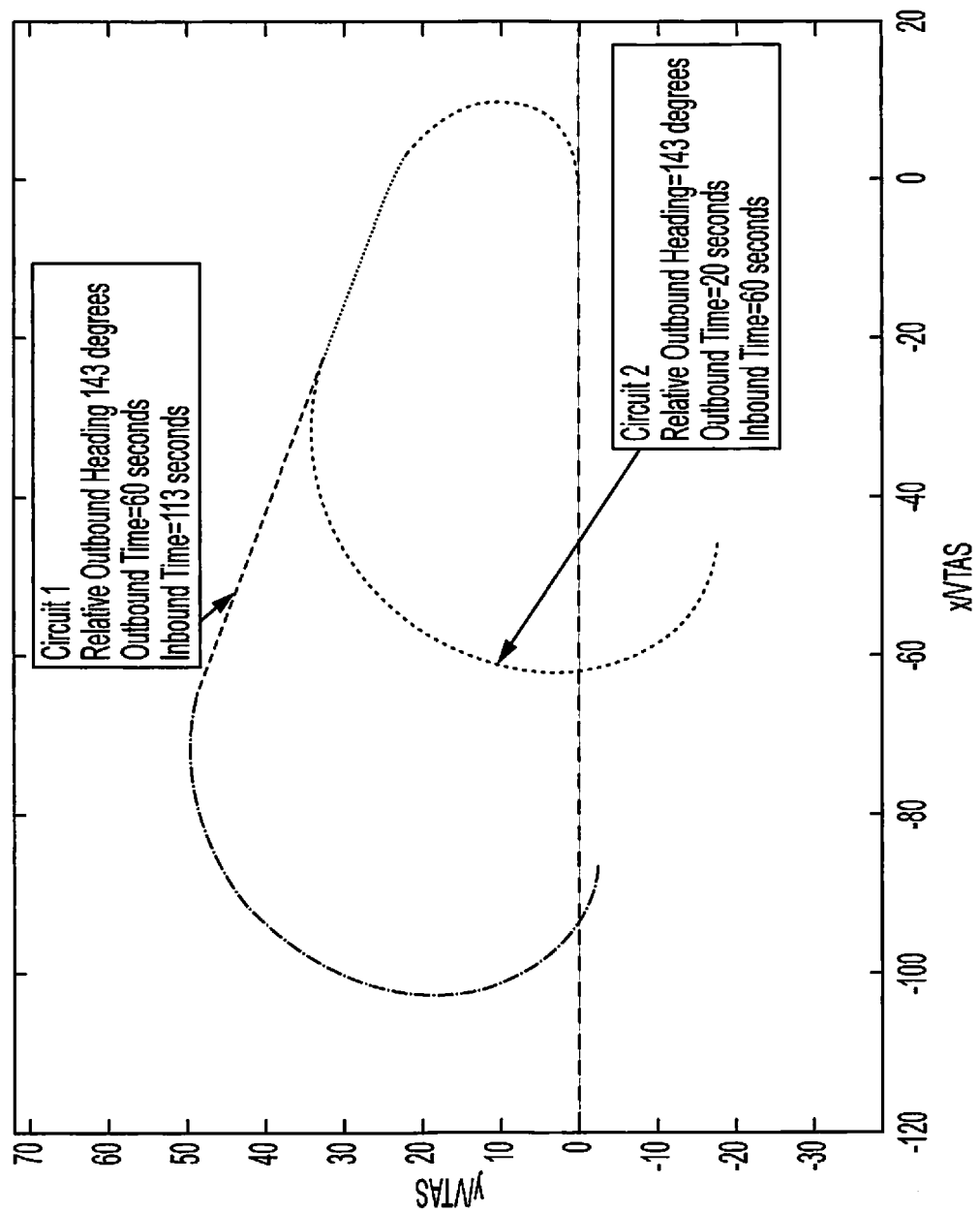
FIG. 16 is a top view of a holding pattern showing ground tracks corresponding to two circuits utilizing a constant outbound wind correction angle and different outbound times according to various embodiments described below.

As an example, in the case of $\nabla_W$=0.3 and $\alpha$=45 degrees, Table 2 showed that using an M-Factor of 3 with a 60 second outbound time, took 113 seconds to return to the holding fix, while at the same time, overshooting the inbound course. In this case, Table 7 indicates that the OWCA (i.e. highlighted in italics) needs to be increased and the outbound time (i.e. highlighted in bold) needs to be decreased. The smart-convergence algorithm shows the required correction in $\overline{dx}$ is considerably larger than the required correction in $\overline{dy}$, and thus, the outbound time should decrease. This is consistent with the decrease in outbound time highlighted in bold in Table 7. Recall that Table 7 only provides the direction of the change in both OWCA and outbound time, and not the magnitude of the change. However, eq. (42) can be used in an attempt to predict a best guess for the required magnitude of the change in the outbound time. In the first circuit, the aircraft flew a relative outbound heading of 143 degrees, with the IWCA=12 degrees. Substituting the required values into eq. (42), gives the following relationship between the required change in the outbound time and the required changed in the inbound time i.e. $\Delta t_{out}$=0.76$\Delta t_{in}$. Therefore, if holding the OWCA constant during the next circuit, the outbound time would need to be decreased by 0.76*53=40 seconds. Thus, the next outbound time would be 20 seconds while holding the relative outbound heading at 143 degrees. This is shown in FIG. 16 below. It is clear that using a 20 second outbound time on circuit 2 gives rise to exactly 60 seconds for the inbound time, although the coupling effect has caused the aircraft to further overshoot the inbound course without the needed increase in the OWCA. However, this does confirm the use of eq. (42) to obtain a first guess for the corrected outbound time for the second circuit.

Figure 17:
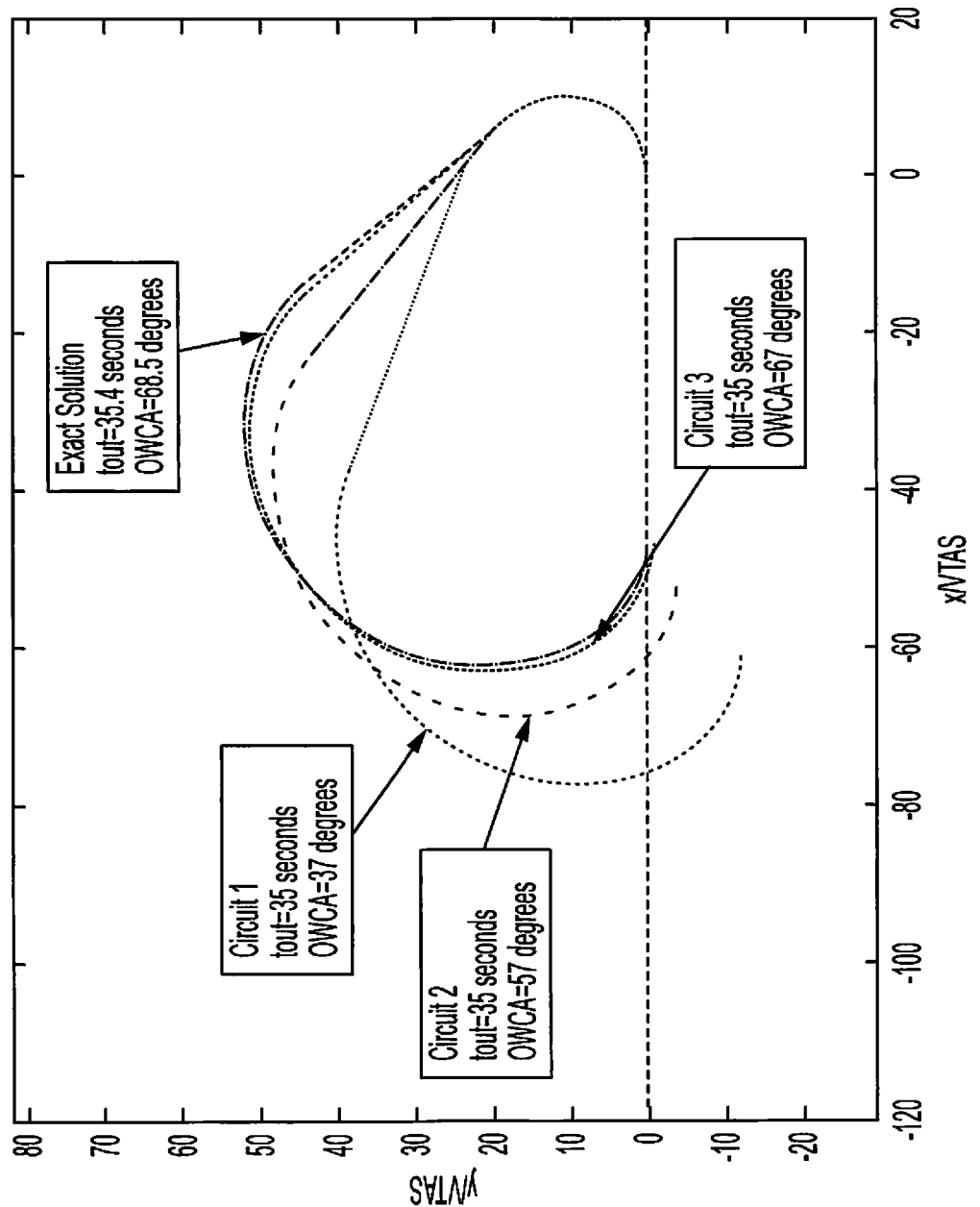
FIG. 17 is a top view of a holding pattern showing ground tracks corresponding to three converging circuits, as well as an exact solution, according to various embodiments described below.

It should be noted that although eq. (42) gave an accurate first guess for the second circuit outbound time, the IFR pilot still cannot perform the mental arithmetic required while flying the holding pattern in IFR conditions. An option to be able to converge to the holding pattern solution in a minimum number of circuits would be to eyeball FIGS. 6 and 7*a* to obtain the outbound time and M-factor for the prescribed wind speed and direction. Although eyeballing both FIGS. 6 and 7A should not be a problem, the pilot just eyeballing the outbound time from FIG. 7A will be considered, and using the AIM recommendation for the M-Factor as 3. If the pilot eyeballs FIG. 7A for the case $\overline{V}_W=0.3$ and $\alpha=45$ degrees, the outbound time is found to be approximately 35 seconds. FIG. 17 shows both the exact solution for this holding pattern, as well as the track of three consecutive circuits, during which the outbound time was held constant at 35 seconds, while the IFR pilot converged on the required OWCA. Note that by eyeballing the outbound time from FIG. 7A, the convergence to the exact solution of the holding pattern occurs in three circuits, compared to the previous convergence process, where the pilot was converging on both the outbound time and OWCA. Table 8 below, shows the details of the convergence process for these three circuits.

TABLE 8

Convergence History of Holding Pattern by Eyeballing t out from FIG. 7a

| Circuit Number | Outbound Time (seconds) | Outbound Heading (degrees) | Inbound Time (seconds) | Centerline Error/VTAS (seconds) |
|---|---|---|---|---|
| 1 | 35 | 143.3 | 79.6 | −11.9 |
| 2 | 35 | 123.3 | 68.1 | −3.6 |
| 3 | 35 | 113.3 | 61.1 | −0.7 |

Here it can be seen that at the end of the first circuit, the aircraft has overshot the inbound course by a considerable amount (i.e. at $V_{TAS}=90$ knots, by nearly 1800 feet). The corresponding inbound time is 79.6 seconds. This locates the aircraft in the lower right corner box in Table 7. Since the outbound time is not changing, the OWCA needs to increase. As a first correction to the OWCA, the OWCA is increased by 20 degrees, flying a relative outbound heading of 123.3 degrees. At the completion of the second circuit, the aircraft has overshot the inbound course again, however only by about 545 feet. The inbound time is now 68.1 seconds. Again, this locates the aircraft in the lower right corner box, which requires an additional increase in the OWCA. However, this time the OWCA is increased by only 10 degrees. The aircraft relative outbound heading is now 113.3 degrees. At the completion of the third circuit, the aircraft overshoots the inbound course by approximately 105 feet. The inbound time for this circuit is now 61.1 seconds. For all practical purposes, the pilot has converged to the holding pattern solution in three circuits, rather than the five circuits previously required when the pilot was converging on both the outbound time and OWCA.

Figure 18A:
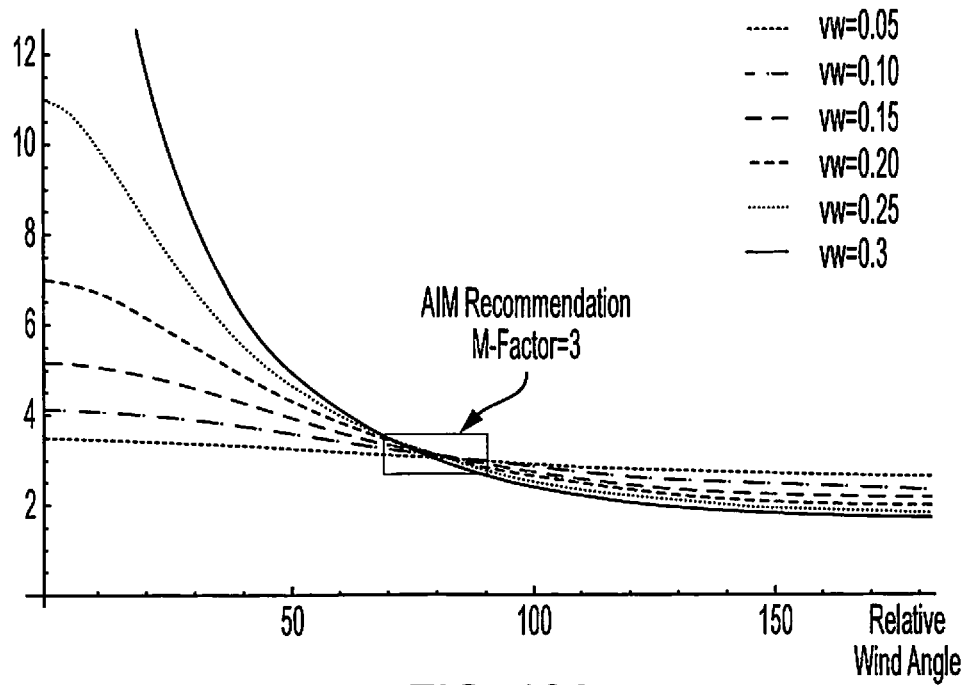
FIGS. 18A and 18B show FIGS. 6B and 7A, respectively, on one page for use by a pilot according to various embodiments described below.
Figure 18B:
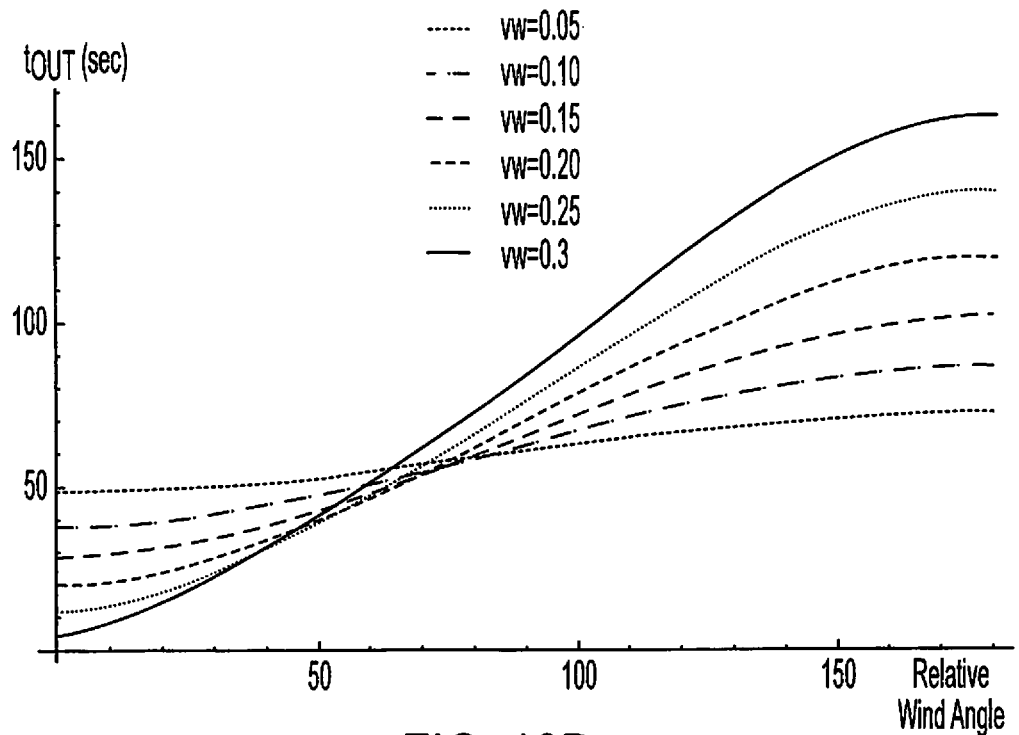

The above results indicate that the IFR pilot should at least have FIG. 7A handy, since eyeballing the outbound time can cut the number of required circuits by about 40% in order to converge to the holding pattern solution. However, having FIG. 6 handy also, would allow the pilot to converge to the holding pattern solution by the second circuit. FIGS. 18A and 18B show both FIGS. 6B and 7A, respectively, on one page that can easily be eyeballed for both the outbound time and M-Factor.

Preparing for the Hold

In preparation for the hold, the IFR pilot should ensure: (a) The Heading Indicator is set accurately, and (b) The outer scale of the airspeed indicator reads the correct TAS for the pressure altitude and the OAT. This is necessary in order to obtain a reasonably accurate solution for the windspeed and wind direction. In today's use of GPS on many GA Aircraft, the pilot is able to display the wind speed and wind direction on the GPS display. For example, on the Garmin 400 W, the AUX page denoted as "Density Alt/TAS/Winds" can be selected. This page requires the following information to be entered into the GPS: (1) Indicated altitude, (2) CAS, (3) Barometric pressure, (4) TAT (total air temperature), and (5) Aircraft heading. The GPS output corresponding to above input parameters are: (a) Density altitude, (b) TAS, (c) Wind direction, (d) Wind speed, and (e) Headwind or tailwind component. The methodology the GPS uses to obtain the wind direction and windspeed is calculated using eqs. (1) and (2) shown below.

$$\operatorname{Sin}\sigma = \overline{V}_W \operatorname{Sin}\alpha \quad (94)$$

$$\overline{V}_G = \frac{V_G}{V_{TAS}} = \operatorname{Cos}\sigma - \overline{V}_W \operatorname{Cos}\alpha$$

Since the GPS knows both the TAS and groundspeed, the left-hand side of the second equation in eq. (94) is known. When tracking directly to the holding fix, knowing the aircraft heading and course to the fix, the WCA σ can be determined. Thus, the groundspeed equation can be rearranged to give $$\overline{V}_W \operatorname{Cos}\alpha = \operatorname{Cos}\sigma - \overline{V}_G \quad (95)$$

Note the first equation in eq. (94) is just $$\overline{V}_W \operatorname{Sin}\alpha = \operatorname{Sin}\sigma \quad (96)$$

Dividing eq. (96) by eq. (95) gives the following result for the wind angle $$\frac{\operatorname{Sin}\alpha}{\operatorname{Cos}\alpha} = \operatorname{Tan}\alpha = \frac{\operatorname{Sin}\sigma}{\operatorname{Cos}\sigma - \overline{V}_G} \quad (97)$$

Taking the inverse tangent of both sides of eq. (97) gives the final result for the wind direction relative to the course the course being tracked, i.e.

$$\alpha = \operatorname{Tan}^{-1}\left[\frac{\operatorname{Sin}\sigma}{\operatorname{Cos}\sigma - \overline{V}_G}\right] \quad (98)$$

Here, α is in radians, and to convert to degrees, the resultant value of α is multiplied by 180/π. Finally, with the relative wind angle known, either eq. (95) or eq. (96) can be used to obtain the value of $\overline{V}_W$, and thus the windspeed. Once the value of alpha and the aircraft heading are specified, the wind direction can be determined.

One solution for GPS (or other computing device) implementations would be to program eq. (15)) for the outbound time and eq. (22) for the outbound heading directly into the GPS. Since the GPS already knows the true airspeed, windspeed, and direction, the only additional information needed is the inbound course to the holding fix. The GPS can then predict the correct outbound time and outbound heading for the holding pattern. Since the GPS is constantly updating the windspeed and direction, the GPS should be able to continually update the outbound time and outbound heading for the next circuit. This approach would reduce the workload of the IFR pilot in attempting to converge to the holding pattern solution.

Recommendations for IFR Training on Holding Patterns

The fact that the holding pattern solution has been derived, it should be noted that CFI-I's take advantage of the techniques described herein. For example, the IFR pilot should understand that without the GPS or other computing device providing the holding pattern solution, the bracketing method will be utilized. Therefore, all CFI-I's should convey the following information to their instrument students:

(1) CFI-I's should introduce their students to the Type-2 holding pattern. This can be performed either on a simulator, or in the air by reducing the TAS to the point where the windspeed ratio is above ⅓. Having the IFR student try to fly this holding pattern will provide the knowledge that these types of holding patterns should be avoided at all cost due to the lack of a systematic convergence process. CFI-I's should teach their IFR students to fly the holding pattern with the windspeed ratio kept at or below 0.25 in order to provide enough outbound time before turning back to re-intercept the inbound course.

(2) CFI-I's training IFR students on Type-1 holding patterns should emphasize the fact that the M-Factor is not always close to 3 and can range from just below two to considerably greater than 3, depending on the windspeed ratio and direction. In order to demonstrate this large variation in the M-Factor, the holding pattern should be flown with the following wind directions
a. Direct headwind (a=0)
b. $\alpha=45$
c. $\alpha=90$
d. $\alpha=135$
e. Direct tailwind (a=180)

If this training is performed in the air, changing the inbound course in the holding pattern can provide the required values of a in (a)-(e).

(3) Fly the holding pattern with the wind direction from ±a to demonstrate that the outbound time will be same if started from the point at which aircraft has turn to the outbound heading but will be different if started at the abeam point. Although the abeam point is given priority in the AIM for starting the outbound time, it is the inbound time that needs to be satisfied while remaining in the holding pattern protected airspace.

(4) Vary the TAS for a given windspeed in order to demonstrate that the windspeed ratio is one of the parameters that controls the shape of the holding pattern.

(5) Introduce the use of Table 7 and the concept of the coupling effect when converging to the holding pattern solution. Provide FIG. 18 to the IFR Student as an aid in reducing the number of circuits necessary to converge to the holding pattern solution.

Results

In this disclosure, the exact solution of the holding pattern problem has been derived. The exact solution provides the following information: (a) The IWCA, (b) The outbound heading (or the OWCA), and (c) The outbound time measured from the time the aircraft completes the turn to the outbound heading, all as a function of the windspeed ratio ($\nabla_W$) and the wind angle relative to the inbound course ($\alpha$). The exact solution contains two algebraic equations for the outbound heading and the outbound time.

The exact solution provides a number of unexpected observations:

(1) Specifically, there are advantages to starting the outbound time when the aircraft completes the turn to the outbound heading, rather than at the abeam point. These advantages are: (a) For a given value of $\alpha$, the outbound time is the same, independent of whether the wind is coming from the holding or non-holding side, and (b) The pilot does not need to determine the abeam point. Point (a) is significant because one only needs to determine the solution for $0 \leq \alpha \leq 180$, rather than for $0 \leq \alpha \leq 360$. In addition, the OWCA for $\alpha \leq 0$ is just the negative of the OWCA for $\alpha \geq 0$.

(2) Type-2 holding pattern: When the windspeed ratio is greater than one-third while holding with a headwind component, it is impossible to make the inbound time one minute unless the aircraft reaches the holding fix and turns to an outbound heading which is less than 90 degrees to the inbound course. When the relative heading for the outbound turn is between 45 and 90 degrees from the inbound course, the outbound time controls the overshoots/undershoots, whereas the OWCA controls the inbound time. This is contrary to the way that IFR pilots are normally trained. As a consequence, in order to avoid flying a Type-2 holding patterns it is recommended that all IFR pilot's ensure that they fly the holding pattern with a windspeed ratio of less than or equal to 0.25, which will provide a reasonable amount of outbound time before turning back to re-intercept the inbound course.

(3) The exact solution of the holding pattern shows when flying the standard Type-1 holding pattern with a 1-minute inbound leg, the recommendation in the AIM for the OWCA, i.e. using an OWCA=3*IWCA is valid under limited conditions. These conditions were determined to be
a. $70 \leq \alpha \leq 95$ for $\nabla_W$ less than 0.3
b. $0 \leq \alpha \leq 180$ degrees, for $\nabla_W \leq 0.05$ Using the exact solution of the holding pattern problem, a "Smart-Convergence" algorithm has been developed, which drives to the correct holding pattern solution in a minimum number of circuits. The algorithm introduces the concept of the "Coupling-Effect", which shows that any changes in the outbound time to converge to the holding pattern solution will cause changes in both inbound time and undershoots/overshoots to the inbound course. In addition, any changes in the OWCA will cause changes in both inbound time and undershoots/overshoots to the inbound course. The "Coupling-Effect" is the root cause of why IFR pilots take additional circuits in the holding pattern to converge to the correct holding pattern when the windspeed ratio is greater than about 0.1. It has been shown that just the use of a single chart for the outbound time as a function of the $\nabla_W$ and $\alpha$ can reduce the number of circuits required to converge to the holding pattern solution by 40% at large windspeed ratios (i.e. 0.3). In addition, eyeballing the outbound time and the M-Factor from FIGS. 18(*a*) and (*b*) will allow IFR pilots to converge to the correct holding pattern within two circuits. Consequently, the best option to reduce the IFR pilot workload while attempting to converge to the correct holding pattern is to implement the equations for the outbound time and outbound heading directly into the GPS or other computing device software. This would provide the pilot with the needed information to fly the holding pattern without spending time using the trial and error method. Finally, having the exact solution to the holding pattern as a function of $\overline{V}_W$ and $\alpha$ during training of IFR pilots can eliminate many of the incorrect rules-of-thumb used by CFI-I's and the FAA, which relate to timing and wind correction in the holding pattern.

Holding Pattern Computer/Calculator

According to various embodiments, the process described above for determining a holding pattern solution according to any ratio of wind speed up to 99.9% of true airspeed may be implemented in a holding pattern computer that makes it easy for the student pilot and seasoned pilots alike solve the most common planning and navigating problems related to flying a holding pattern. This advanced holding pattern computer calculates wind correction angles, headings, and required timings, given the assigned fix, your speed, and virtually any wind direction and velocity. It shows which entry procedure is appropriate and helps the pilot remain mentally oriented to the aircraft's relative position to the pattern, to magnetic north, and any effects of wind. With automatically calculated leg timing, unit conversions, and wind correction angles, the holding pattern computer is convenient in solving the planning and navigating problems associated with holding patterns.

This holding pattern computer employs the advanced analytic solution described above to calculate ground track, wind correction angle, heading, and required timings, given the assigned fix, your speed, and virtually any wind direction and velocity. The holding pattern computer shows which entry procedure is appropriate and helps the pilot remain mentally oriented to the aircraft's relative position to the pattern, to magnetic north, and to any effects of wind. Additionally, taking winds and speed into account, the holding pattern computer calculates which way to turn, left or right, which course and heading to maintain, and how long to fly a heading before initiating a turn. The holding pattern computer takes a step-by-step approach when entering holding data, using individual screens for each component which makes it much easier to focus on one element at a time while continuing to fly the aircraft. Referring now to FIGS. 19-27, an illustrative example embodiment will be described. It should be appreciated that the various embodiments are not limited to the example shown and described with respect to FIGS. 19-27.

Figure 19:
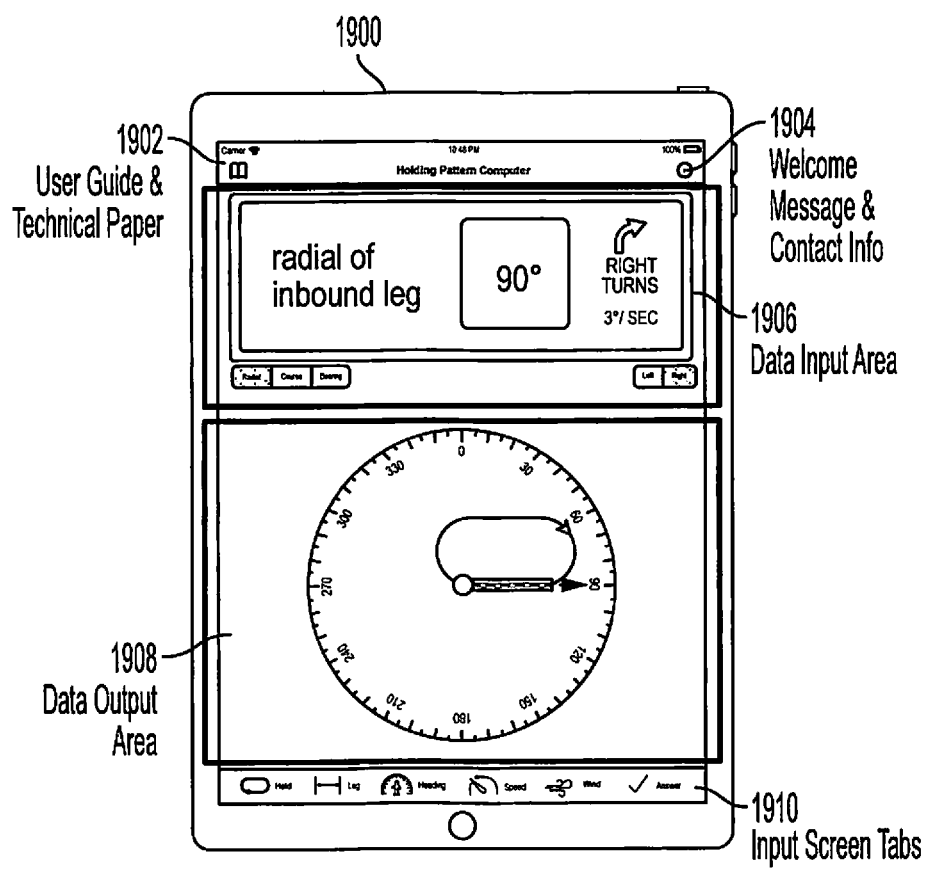
FIGS. 19-27 show example screen layouts and user interfaces provided by a holding pattern computer of a holding pattern determination system according to various embodiments described below.

FIG. 19 shows an example screen layout of the holding pattern computer 1900 according to one embodiment. The screen may include links to a user guide 1902 and associated technical paper, as well as to a welcome message and contact information 1904. The screen includes a data input area 1906 and a data output area 1908. Six different input screen tabs 1910 allow a user to navigate between various input screens described below. It should be appreciated that any number and types of input screen tabs 1910 and corresponding screens may be used without departing from the scope of this disclosure.

Figure 20:
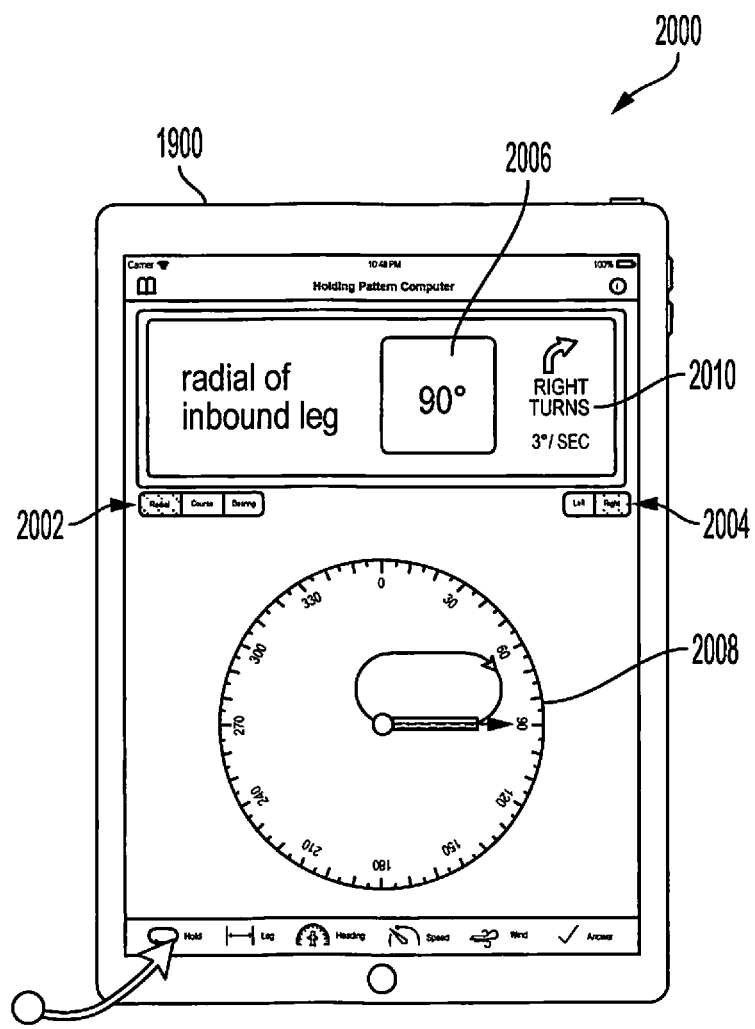

FIG. 20 shows a hold input interface 2000 according to various embodiments. The hold input interface 2000 allows a pilot or other user to set the inbound radial, course or bearing of the fix and to set if the turns in the holding pattern are standard right-hand turns or non-standard left-hand turns. The hold input interface 2000 provides an easy method for entering information. The user simply taps one of the buttons 2002 titled Radial, Course, or Bearing. Then, the user taps on the box 2006 at the top of the screen displaying the degree value to display an on-screen numeric keyboard, or rotates the dial 2008 in the middle of the screen using any finger, stylus, or input device. The user may set the turn direction by tapping one of the buttons 2004 titled Left or Right. If the user is using a flight director, or wants to use a turn rate other than the standard 30 per second, the user may tap the area 2010 of the screen that displays the left or right arrow. The user can enter a custom turn rate, or use the standard of 3° per second. If a standard rate turn is selected, the bank angle will be limited to a maximum of 30° when manually flying and 25° with the use of a flight director. When the bank angle is limited, the rate of turn corresponding to the bank angle limit will be displayed under the Left or Right Turns Arrow.

Figure 21:
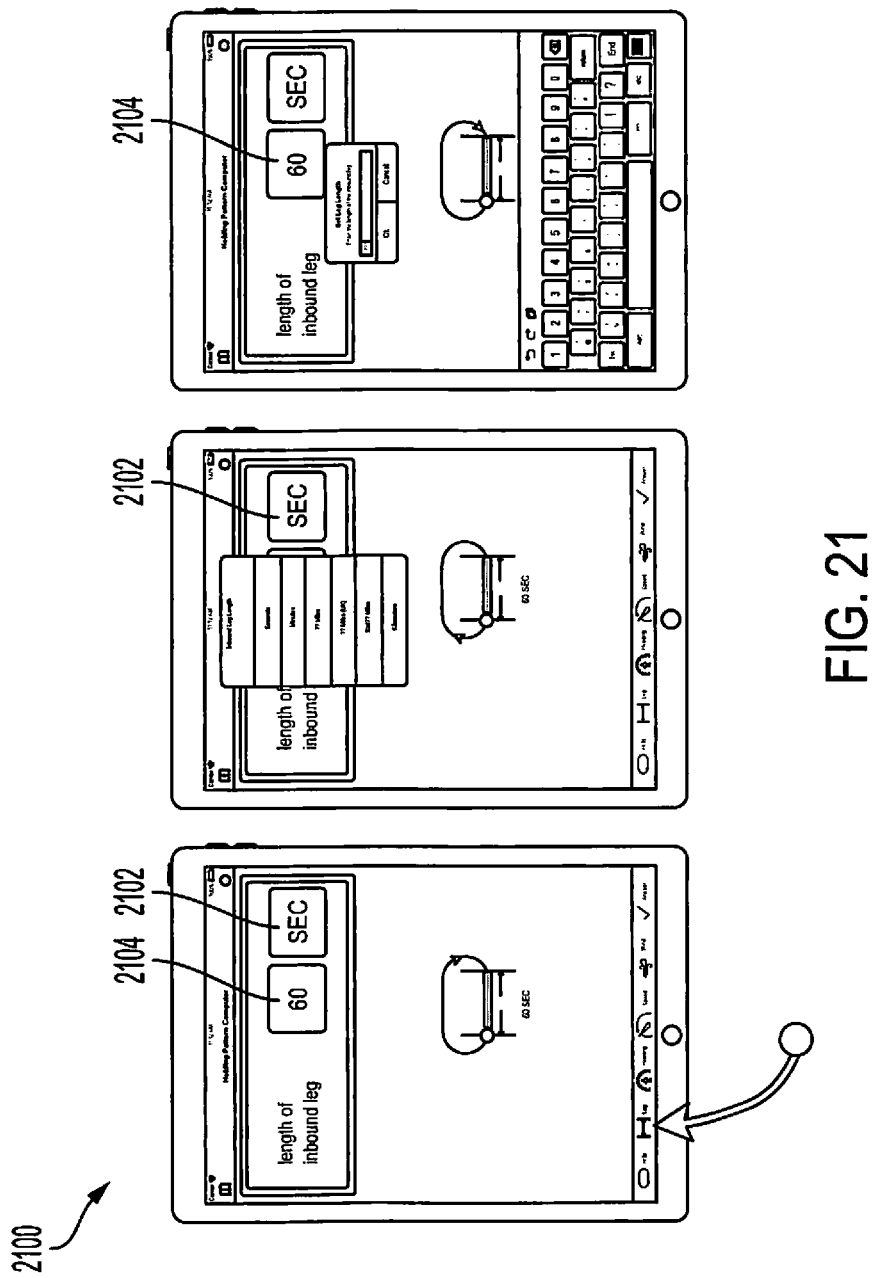

FIG. 21 shows a leg length interface 2100 according to various embodiments. The leg length interface 2100 allows the user to provide applicable data regarding the length of the inbound leg. Many holding patterns define the length of an inbound leg in terms of time, such as 1 or 1.5 minutes depending on altitude, but some holds define the leg in terms of distance, such as six nautical miles. The holding pattern computer 1900 described herein supports inbound leg lengths expressed in both time and distance in any of the following units: seconds, minutes, nautical miles, nautical miles (UK), statute miles, and kilometers. To change the units, a user selects unit selection button 2102, as shown in the center illustration of FIG. 21. Doing so may trigger a drop-down or pop-up menu that receives a unit selection from the user. To enter or change the leg length, the user may select the leg length button 2104, which displays an on-screen numeric keyboard for entering the desired length of the inbound leg. It should be appreciated that any other suitable method for entering and/or changing the leg length, units, or any other data may be utilized without departing from the scope of this disclosure.

Figure 22:
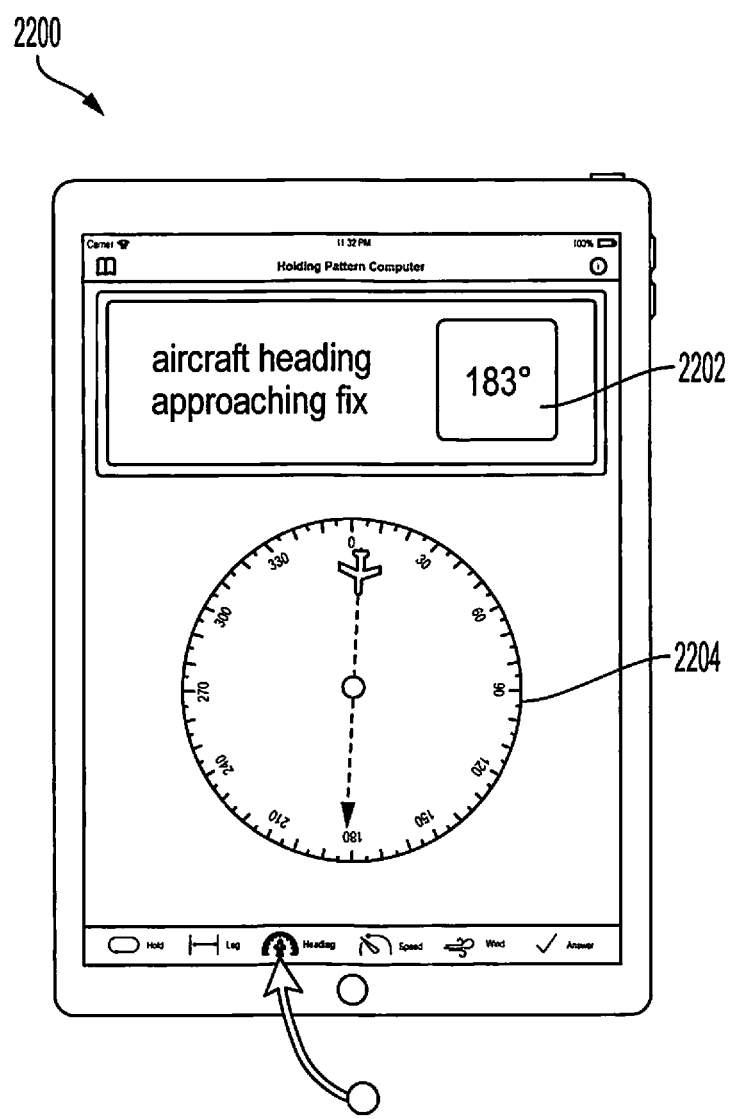

FIG. 22 shows an example of an aircraft heading interface 2200 according to various embodiments. The aircraft heading interface 2200 allows a user to set the heading of an aircraft approaching the fix. The user can change the value displayed in the heading field 2202 by tapping it, to display on-screen keyboard. Alternatively, the user can change the heading value by rotating the heading dial 2204 using one or more fingers. The computer will use this value to determine the recommended entry procedure for the hold and to guide the turns further.

Figure 23:
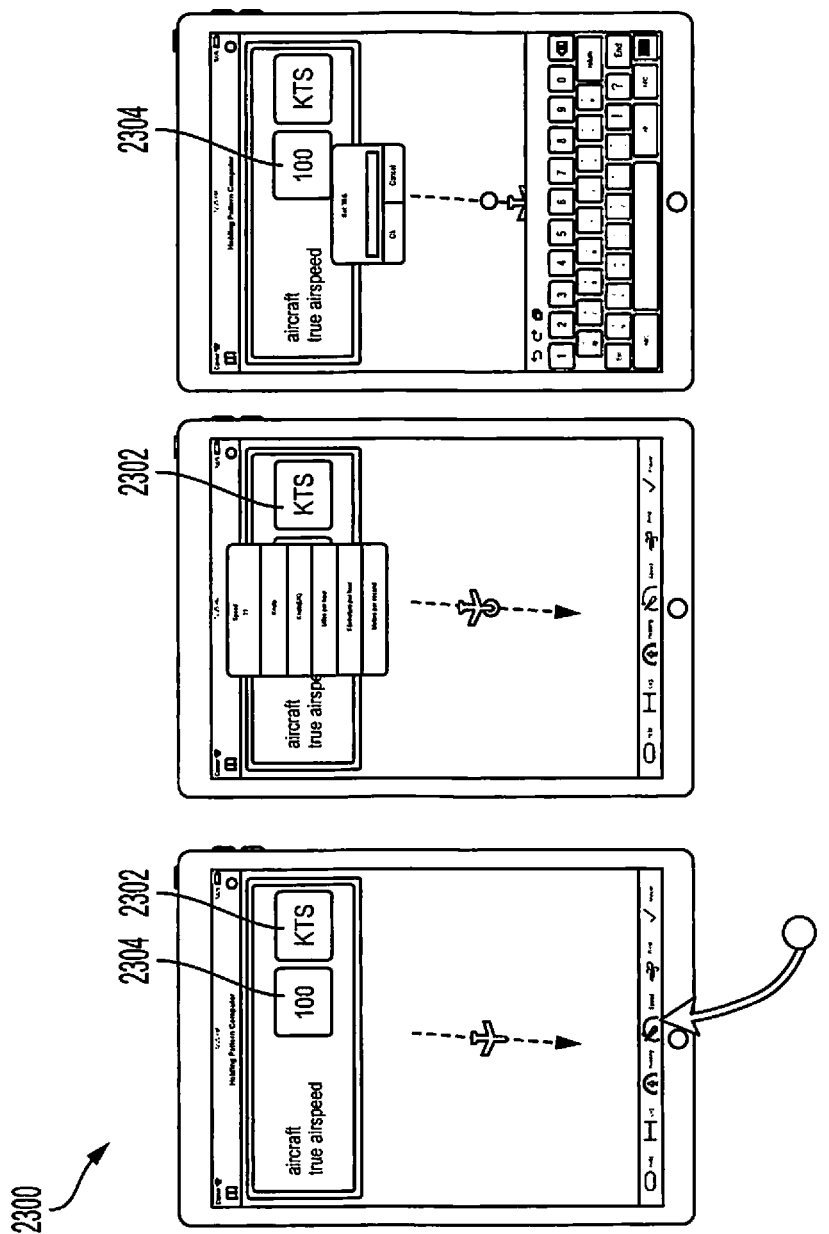

FIG. 23 shows an example of an aircraft true airspeed interface 2300 according to various embodiments. The aircraft true airspeed interface 2300 allows a user to enter the true airspeed of the aircraft. To change the units, a user selects unit selection button 2302, as shown in the center illustration of FIG. 23. Doing so may trigger a drop-down or pop-up menu that receives a unit selection from the user. To enter or change the aircraft true airspeed, the user may select the true airspeed button 2304, which displays an on-screen numeric keyboard for entering the aircraft true airspeed. Along with wind data, the computer uses the true airspeed to determine the aircraft ground speed, wind correction angles, and the perfect length and heading of the outbound leg. The aircraft true airspeed can be expressed in knots, miles per hour, kilometers per hour, or meters per second.

Figure 24:
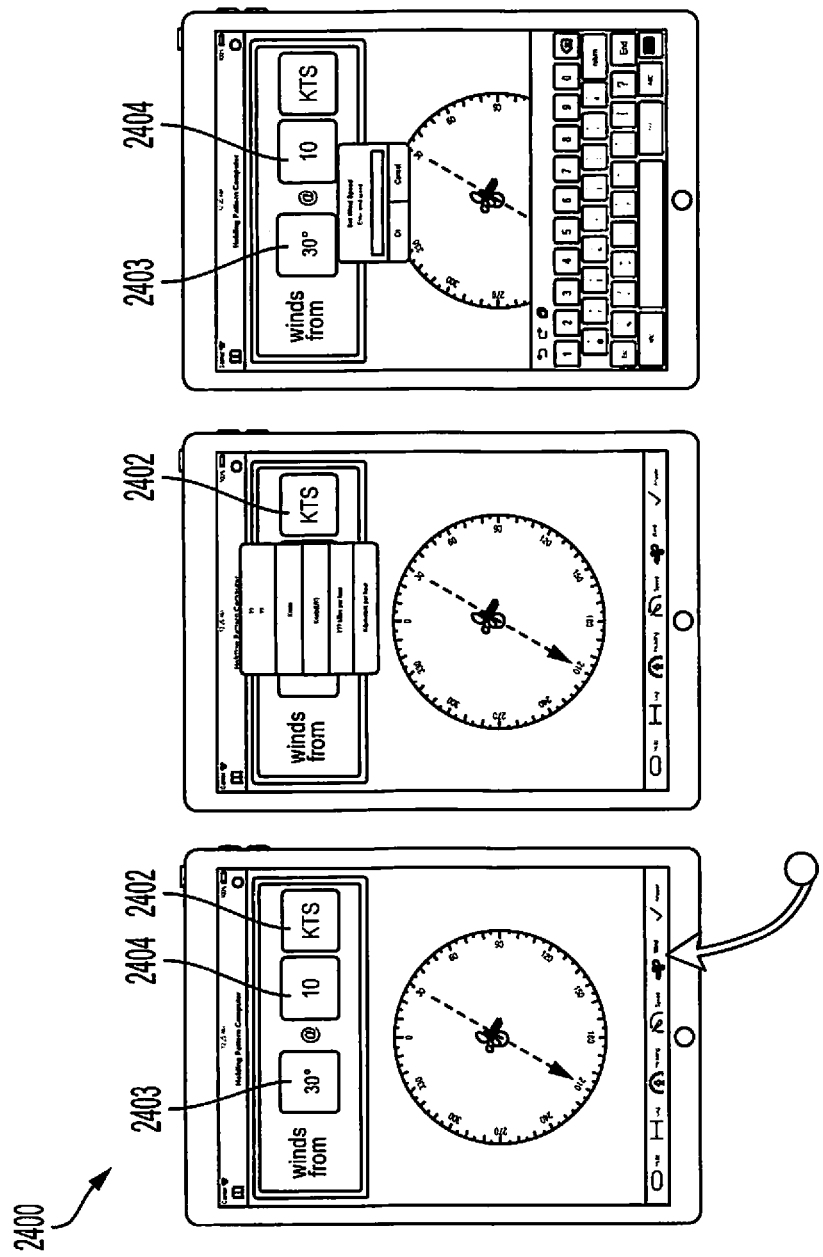

FIG. 24 shows an example of a wind direction and speed interface 2400 according to various embodiments. The aircraft wind direction and speed interface 2400 allows a user to enter the direction and speed of the wind. The wind direction and speed is used as described above to fly an outbound leg that will enable an intercept of the inbound leg with a standard-rate turn (or bank-limited or specified)—every time. To enter the wind direction and speed, the user rotates the dial to change the wind direction, or tap the wind direction button 2403 and/or the wind speed button 2404 to display an on-screen keyboard for entering the appropriate values. Wind speeds can be expressed in knots, knots (UK), statute miles per hour, and kilometers per hour, which may be selected using the unit selection button 2402.

Figure 25:
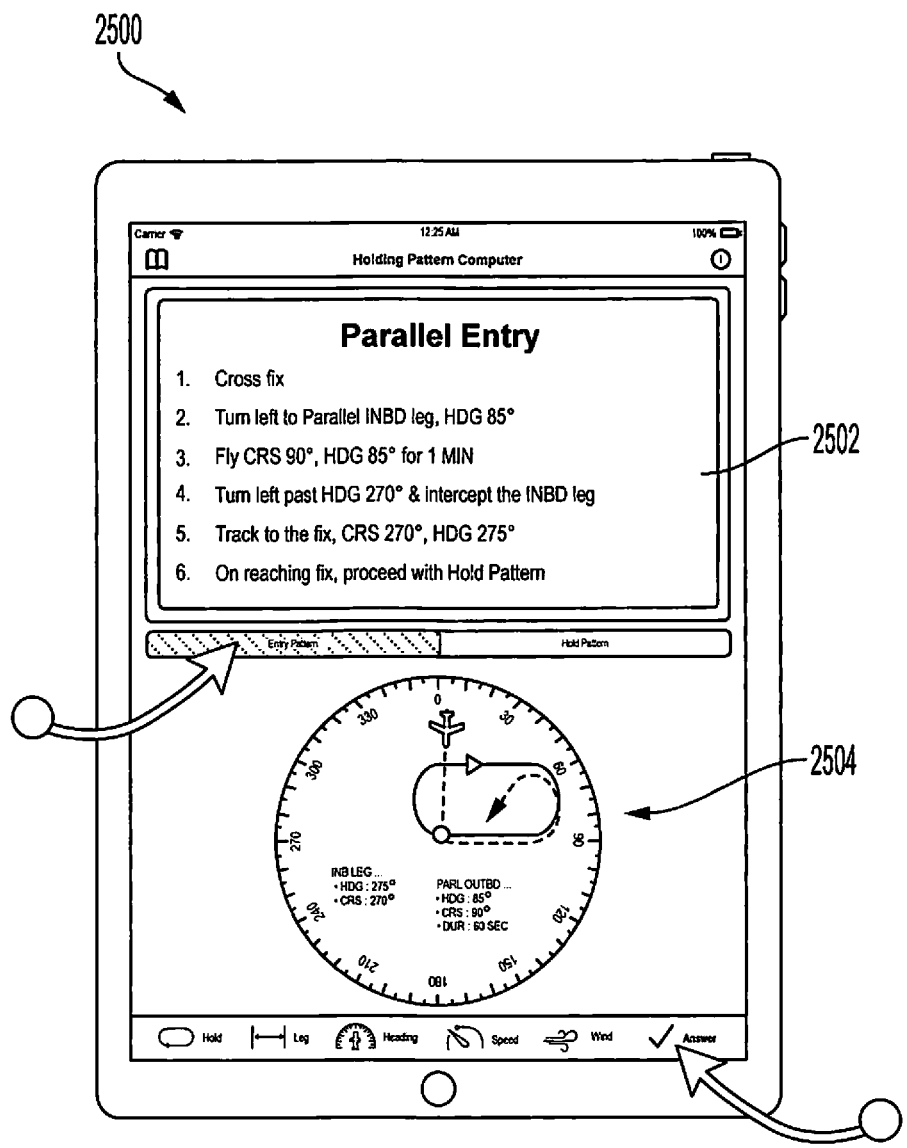

FIG. 25 shows an entry pattern solution screen 2500 provided to the user via selection of an "Entry Pattern" tab on an answer screen. The system displays the entry pattern solution screen 2500 after receiving applicable data from the user via interfaces shown in FIGS. 19-23 and performing the calculations described in detail above. The entry pattern solution screen 2500 graphically depicts the recommended entry procedure 2502 as entry pattern graphic 2504, while displaying the textual steps necessary to fly it. Direct, Parallel or Teardrop, the appropriate Entry Procedure is selected based on where the tail of the aircraft is located when it passes over the holding fix. Additionally, the computer calculates which way to turn, left or right, which course and heading to maintain, and how long to fly a heading before initiating a standard-rate turn. Specifically, the entry pattern solution screen 2500 provides the user with a visualization of the holding pattern entry procedure, the entry procedure including turn directions, inbound and outbound course, inbound and outbound heading, outbound leg duration, and the total time for one circuit of the holding pattern.

Figure 26:
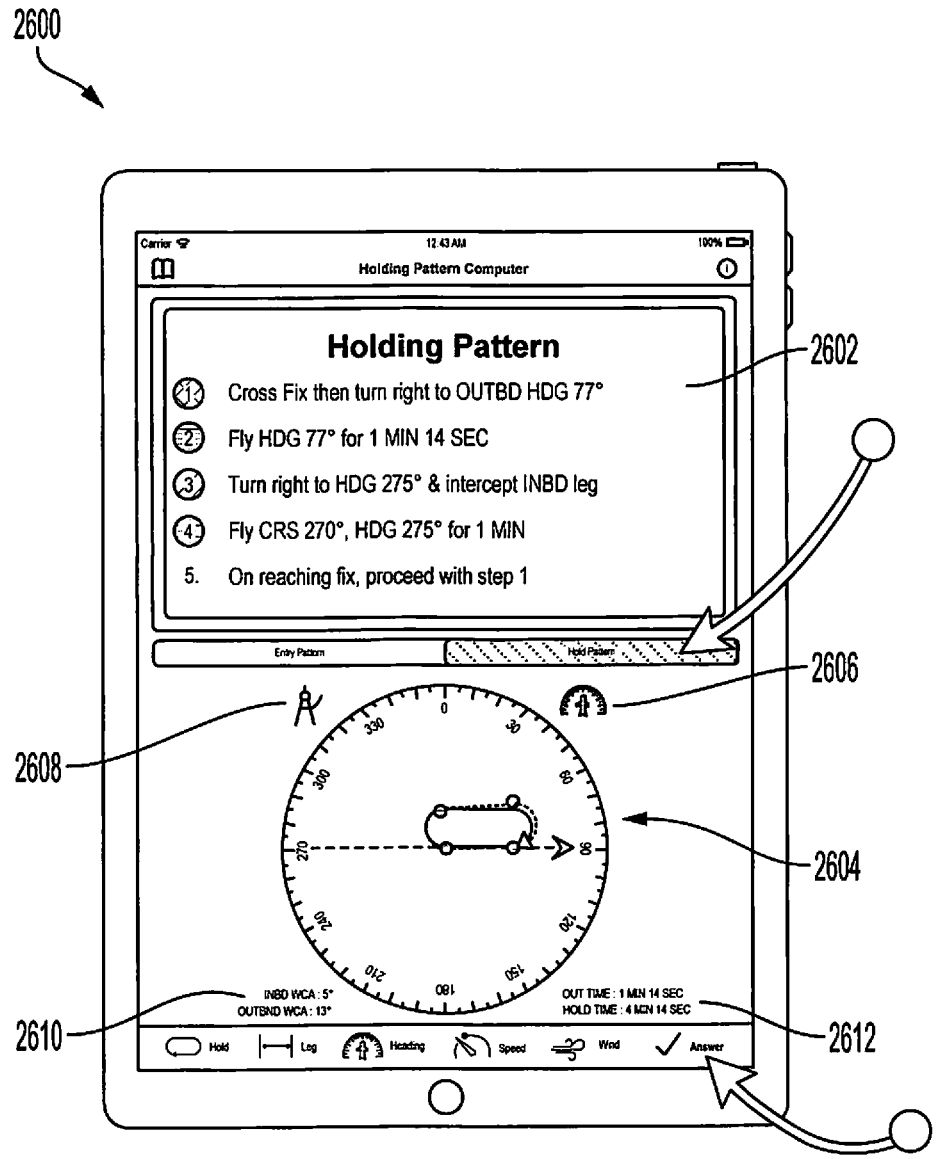
Figure 27:
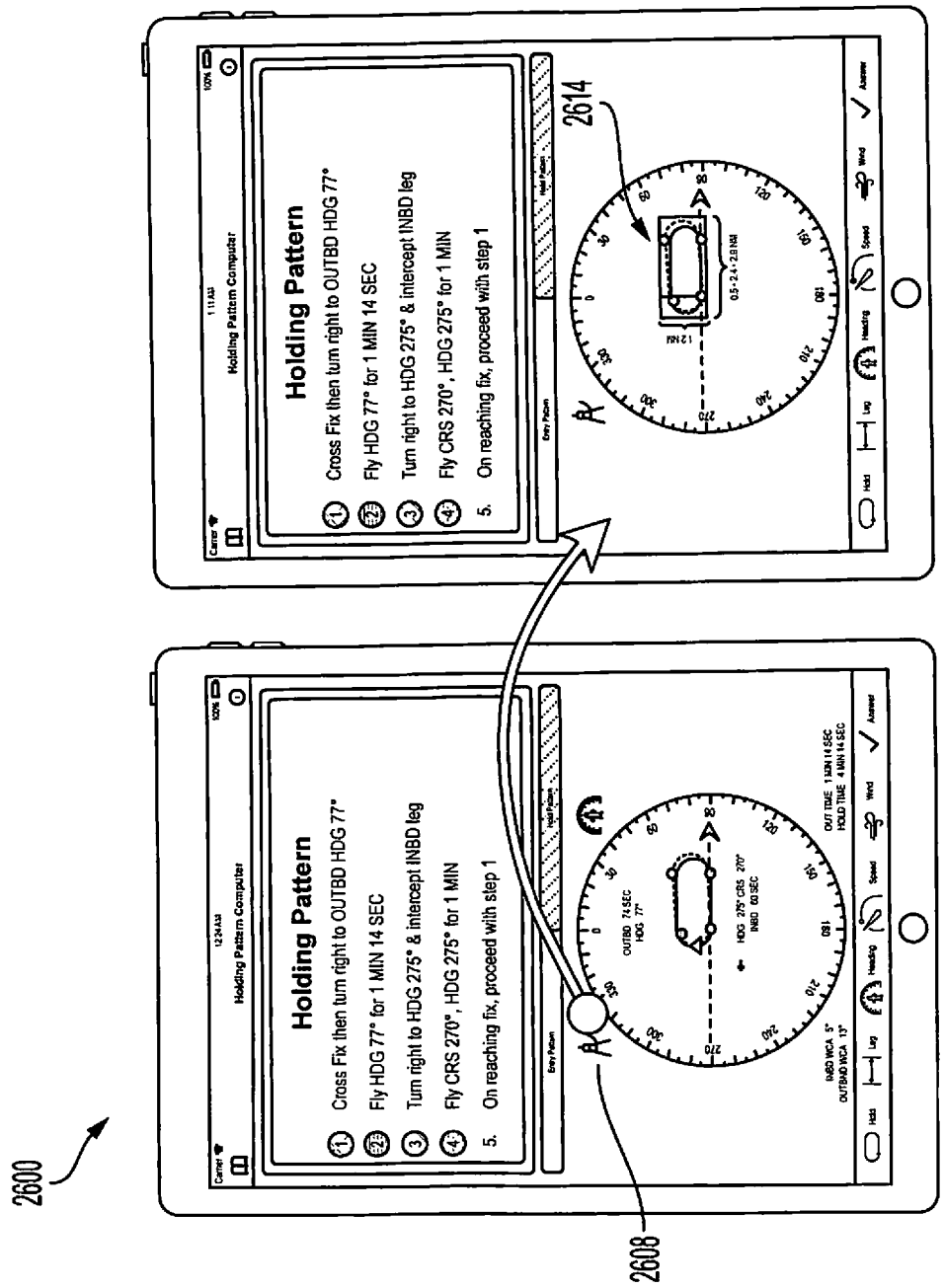

FIGS. 26 and 27 show a holding pattern solution screen 2600 provided to the user via selection of a holding pattern tab on an answer screen. The system displays the holding pattern solution screen 2600 after receiving applicable data from the user via interfaces shown in FIGS. 19-23 and performing the calculations described in detail above. The holding pattern solution screen 2600 graphically depicts a holding pattern graphic 2604 and displays the steps necessary to fly it as the holding procedure 2602. The holding pattern computer 1900 calculates which way to turn, left or right, which course and heading to maintain, and how long to fly a heading before initiating a turn. Specifically, the holding pattern solution screen 2600 provides the user with a visualization of the holding pattern, turn directions, inbound and outbound course, inbound and outbound heading, outbound leg duration, and total hold time. The outbound time and hold time information 2612 is shown in the bottom right portion of the screen according to this embodiment, while the wind correction angles 2610 is provided on the bottom left portion of the screen.

Selecting the summary button 2606, The shape of the holding pattern depicted on this screen is derived from a completely analytic solution, rather than rule-of-thumb formulas, and is more accurate than the recommendations found in the Airman Information Manual, especially when in the presence of strong winds. The holding pattern depicted in the holding pattern graphic 2604 using a solid line shows the holding pattern with zero wind. The holding pattern depicted in the holding pattern graphic 2604 using a broken line shows what will be flown with the timing and wind correction angle applied.

The user can view the dimensions of the holding pattern by tapping the measure button 2608, as shown in the example screen on the left side of FIG. 27. The results are shown on the right side of FIG. 27. The X axis includes the length of segments to the left and right of the fix. The results show nautical miles of the X and Y axis, as depicted by the dimensional holding pattern graphic 2614.

Example System Architecture

Figure 28:
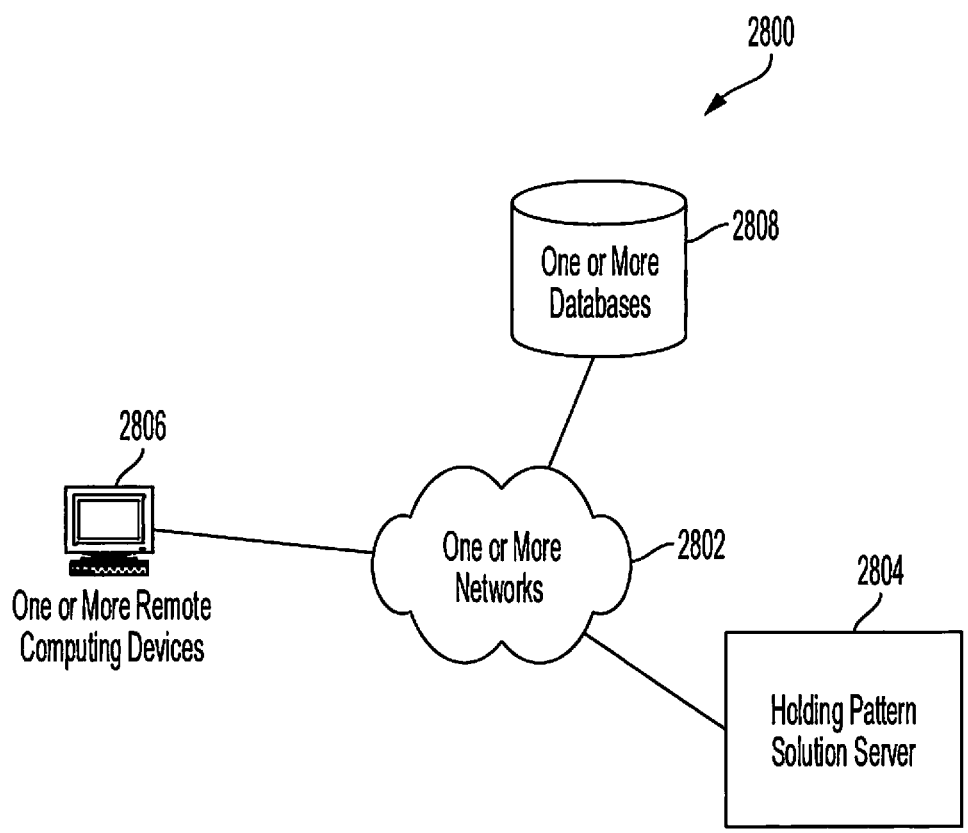
FIG. 28 is a block diagram of a holding pattern determination system according to various embodiments described below.

FIG. 28 is a block diagram of a Holding Pattern Determination System 2800 according to various embodiments.

The Holding Pattern Determination System 2800 may be configured to provide a platform for managing the determination and presentation of a holding pattern solution, as described in detail above. The system may, for example, be implemented in the context of a mobile aviation application or GPS solution such as holding pattern computer 1900 shown and described with respect to FIGS. 19-27. The system may be configured to: (1) enable simple, straight-forward entry of applicable holding pattern, flight, aircraft, and environmental data related to a specific holding pattern being flown; (2) process entered data; and (3) present an exact holding pattern solution that will enable a pilot to fly a precise holding pattern with a single or minimized number of circuits.

As may be understood from FIG. 28, the Holding Pattern Determination System 2800 includes one or more computer networks 2802, a Holding Pattern Solution Server 2804, one or more remote computing devices 2806 (e.g., such as a desktop computer, laptop computer, tablet computer, smartphone, GPS device, etc.), and One or More Databases 2808. In particular embodiments, the one or more computer networks 2802 facilitate communication between the Holding Pattern Solution Server 2804, one or more remote computing devices 2806 (e.g., a desktop computer, laptop computer, tablet computer, smartphone, GPS device, etc.), and one or more databases 2808.

The one or more computer networks 2802 may include any of a variety of types of wired or wireless computer networks such as the Internet, a private intranet, a public switch telephone network (PSTN), an air-to-ground aviation communications system, or any other type of network. The communication link between the Holding Pattern Solution Server and the Database may be, for example, implemented via a Local Area Network (LAN) or via the Internet.

Figure 29:
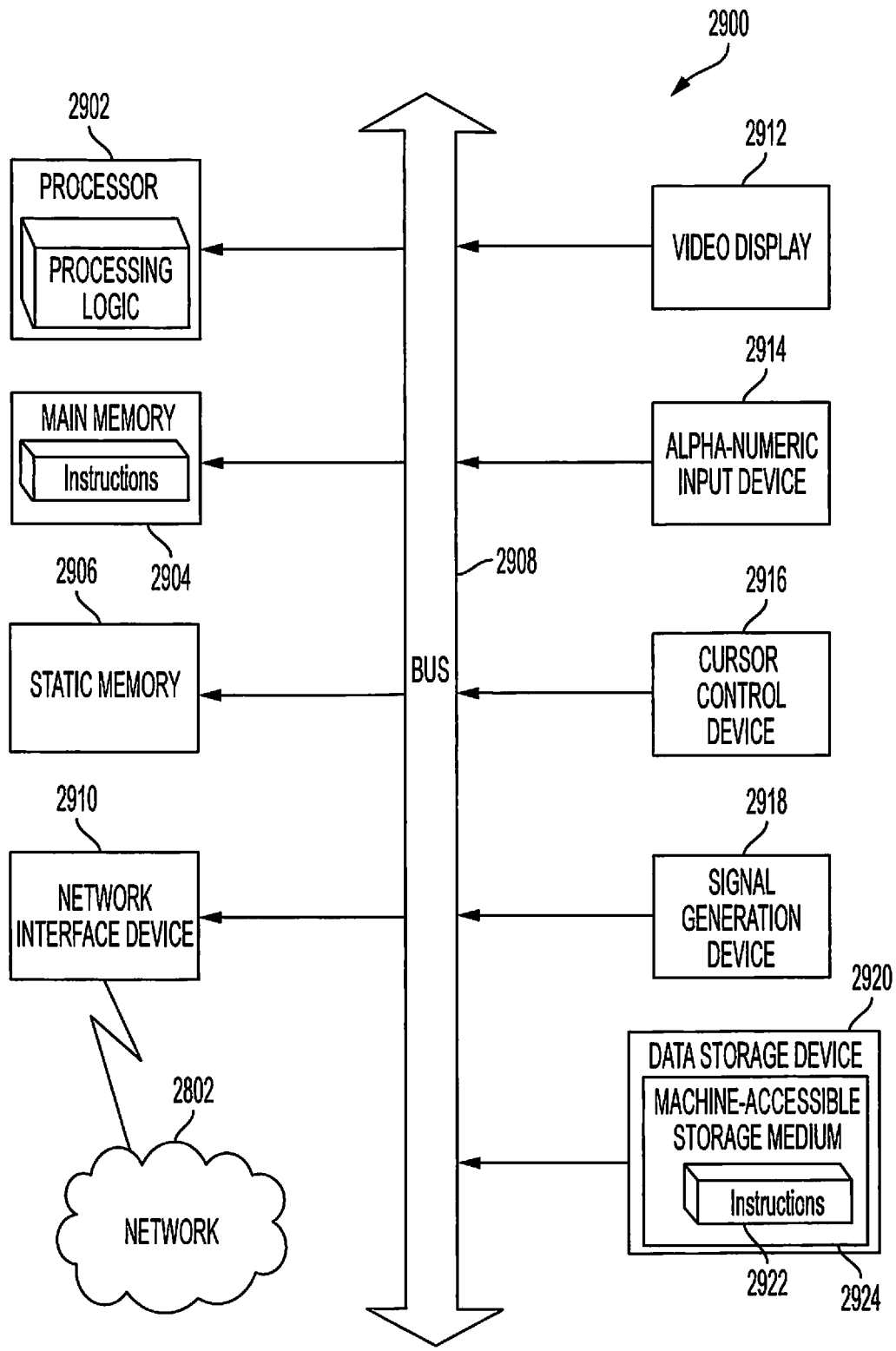
FIG. 29 is a block diagram of a holding pattern computer used within the holding pattern determination system according to various embodiments described below.

FIG. 29 illustrates a diagrammatic representation of a holding pattern computer 2900 that can be used within the Holding Pattern Determination System 2800, for example, as a client computer (e.g., one or more remote computing devices 2806 shown in FIG. 28), or as a server computer (e.g., Holding Pattern Solution Server 2804 shown in FIG. 28). In particular embodiments, the holding pattern computer 2900 may be suitable for use as a computer within the context of the Holding Pattern Determination System 2800 that is configured to receive data input, generate reports, etc.

In particular embodiments, the holding pattern computer 2900 may be connected (e.g., networked) to other computers in a LAN, an intranet, an extranet, and/or the Internet. As noted above, the computer may operate in the capacity of a server or a client computer in a client-server network environment, or as a peer computer in a peer-to-peer (or distributed) network environment. The computer may be a personal computer (PC), a tablet PC, a set-top box (STB), a Personal Digital Assistant (PDA), a cellular telephone, a web appliance, a server, a network router, a switch or bridge, a GPS device, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer includes a processing device 2902, a main memory 2904 (e.g., read-only memory (ROM), flash memory, dynamic random access memory (DRAM) such as synchronous DRAM (SDRAM) or Rambus DRAM (RDRAM), etc.), static memory 2906 (e.g., flash memory, static random access memory (SRAM), etc.), and a data storage device 2920, which communicate with each other via a bus.

The processing device 2902 represents one or more general-purpose processing devices such as a microprocessor, a central processing unit, or the like. More particularly, the processing device 2902 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 2902 may also be one or more special-purpose processing devices such as an application specific integrated circuit (ASIC), a field programmable gate array (FPGA), a digital signal processor (DSP), network processor, or the like. The processing device 2902 may be configured to execute processing logic for performing various operations and steps discussed herein.

The holding pattern computer 2900 may further include a network interface device 2910. The holding pattern computer 2900 also may include a video display unit 2912 (e.g., a liquid crystal display (LCD) or a cathode ray tube (CRT)), an alphanumeric input device 2914 (e.g., a keyboard), a cursor control device 2916 (e.g., a mouse), and a signal generation device 2918 (e.g., a speaker).

The data storage device 2920 may include a non-transitory computer-accessible storage medium 2922 (also known as a non-transitory computer-readable storage medium or a non-transitory computer-readable medium) on which is stored one or more sets of instructions 2924 (e.g., software instructions) embodying any one or more of the methodologies or functions described herein. The software instructions may also reside, completely or at least partially, within main memory 2904 and/or within processing device 2902 during execution thereof by computer-main memory 2904 and processing device 2902 also constituting computer-accessible storage media. The software instructions may further be transmitted or received over a network 2802 via network interface device 2910.

While the computer-accessible storage medium is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the holding pattern computer 2900 and that cause the holding pattern computer 2900 to perform any one or more of the methodologies of the present invention. The term "computer-accessible storage medium" should accordingly be understood to include, but not be limited to, solid-state memories, optical and magnetic media, etc.

CONCLUSION

Many modifications and other embodiments of the disclosure will come to mind to one skilled in the art to which this disclosure pertains having the benefit of the teachings presented in the foregoing descriptions and the associated drawings. For example, as will be understood by one skilled in the relevant field in light of this disclosure, the embodiments may take form in a variety of different mechanical and operational configurations. Therefore, it is to be understood that the disclosure is not to be limited to the specific embodiments disclosed herein, and that the modifications and other embodiments are intended to be included within the scope of the appended exemplary concepts. Although specific terms are employed herein, they are used in a generic and descriptive sense only and not for the purposes of limitation.

What is claimed is:

1. A computer-implemented method for providing a holding pattern solution, the method comprising:
   determining, by a processor of a holding pattern computer, a windspeed ratio;
   determining, by the processor, a direction of relative wind;
   utilizing, by the processor, at least the windspeed ratio and the direction of relative wind to calculate an analytic solution to the holding pattern solution, comprising:
      an inbound wind correction angle,
      an outbound heading,
      an outbound time that begins at the outbound heading independent from an abeam point, and
      a total time to complete a holding pattern circuit; and
   providing, by the processor, the holding pattern solution to a user for flying the holding pattern solution, the holding pattern solution further comprising:
      an entry procedure comprising a plurality of turn instructions, an inbound course, an inbound and an outbound heading, and an outbound leg duration;
      an entry pattern graphic visually depicting an entry pattern to intercept the inbound leg of the hold pattern;
      a holding procedure comprising a plurality of turn instructions, an inbound course, an inbound and an outbound heading, and an outbound leg duration; and
      a holding pattern graphic visually depicting a first representation of a holding pattern with zero wind, and a second representation of a holding pattern with one or more wind characteristics applied.

2. The computer-implemented method of claim 1, further comprising:
   receiving, by the processor, a user selection of a measure button;
   in response to receiving the user selection of the measure button, displaying, by the processor, a dimensional holding pattern graphic having one or more dimensions of at least one of the first representation of the holding pattern with zero wind and the second representation of the holding pattern with one or more wind characteristics applied.

3. The computer-implemented method of claim 1, further comprising:
   receiving, by the processor, radial, course, or bearing information corresponding to an inbound leg of the holding pattern to a fix;
   receiving, by the processor, a length of the inbound leg;
   receiving, by the processor, a heading of the aircraft;
   receiving, by the processor, an aircraft rate of turn;
   receiving, by the processor, a true airspeed of the aircraft;
   receiving, by the processor, a direction and a speed of wind;
   utilizing, by the processor, the speed of the wind and the true airspeed to determine the windspeed ratio; and
   utilizing, by the processor, at least the radial, course, or bearing information corresponding to the inbound leg, the length of the inbound leg, and the heading of the aircraft to determine the holding pattern solution.

4. The computer-implemented method of claim 1, further comprising:
receiving, by the processor, an aircraft rate of turn;
receiving, by the processor, an inbound time to the fix comprising a one-minute or a one-minute and thirty second inbound time to the fix; and
utilizing, by the processor, at least the aircraft rate of turn and the inbound time to the fix to determine the holding pattern solution.

5. The computer-implemented method of claim 1, wherein the holding pattern graphic comprises one or more dimensions of at least one of the first representation of the holding pattern with zero wind and the second representation of the holding pattern with one or more wind characteristics applied.

6. The computer-implemented method of claim 1, wherein a shape of the second representation of the holding pattern with the one or more wind characteristics applied is derived from an analytic solution independent of an M-factor having a value of 3.

7. The computer-implemented method of claim 1, wherein when the windspeed ratio is greater than ⅓, the plurality of turn instructions of the entry procedure provide a turn from a fix that is less than 90 degrees.

8. A holding pattern determination system for providing a holding pattern solution, the system comprising:
a holding pattern computer having a display and at least one processor, wherein the processor is operative to execute one or more sets of computer-readable instructions operative to:
determine a windspeed ratio;
determine a direction of relative wind;
utilize at least the windspeed ratio and the direction of relative wind to calculate an analytic solution to the holding pattern solution, comprising:
an inbound wind correction angle,
an outbound heading,
an outbound time that begins at the outbound heading independent from an abeam point, and
a total time to complete a holding pattern circuit; and
provide the holding pattern solution to a user for flying the holding pattern solution, the holding pattern solution further comprising:
an entry procedure comprising a plurality of turn instructions, an inbound course, an inbound and an outbound heading, and an outbound leg duration;
an entry pattern graphic visually depicting an entry pattern to intercept the inbound leg of the hold pattern;
a holding procedure comprising a plurality of turn instructions, an inbound course, an inbound and an outbound heading, and an outbound leg duration; and
a holding pattern graphic visually depicting a first representation of a holding pattern with zero wind, and a second representation of a holding pattern with one or more wind characteristics applied.

9. The holding pattern determination system of claim 8, wherein the one or more sets of computer-readable instructions are further operative to:
receive radial, course, or bearing information corresponding to an inbound leg of the holding pattern to a fix;
receive a length of the inbound leg;
receive a heading of the aircraft;
receive an aircraft rate of turn;
receive a true airspeed of the aircraft;
receive a direction and a speed of wind;
utilize the speed of the wind and the true airspeed to determine the windspeed ratio; and
utilize at least the radial, course, or bearing information corresponding to the inbound leg, the length of the inbound leg, and the heading of the aircraft to determine the holding pattern solution.

10. The holding pattern determination system of claim 8, wherein the one or more sets of computer-readable instructions are further operative to:
receive an aircraft rate of turn;
receive an inbound time to the fix comprising a one-minute or a one-minute and thirty second inbound time to the fix; and
utilize at least the aircraft rate of turn and the inbound time to the fix to determine the holding pattern solution.

11. The holding pattern determination system of claim 8, wherein the holding pattern graphic comprises one or more dimensions of at least one of the first representation of the holding pattern with zero wind and the second representation of the holding pattern with one or more wind characteristics applied.

12. The holding pattern determination system of claim 8, wherein a shape of the second representation of the holding pattern with the one or more wind characteristics applied is derived from an analytic solution independent of an M-factor having a value of 3.

13. The holding pattern determination system of claim 8, wherein when the windspeed ratio is greater than ⅓, the plurality of turn instructions of the entry procedure provide a turn from a fix that is less than 90 degrees.

14. The holding pattern determination system of claim 8, wherein when the windspeed ratio is greater than ⅓, the plurality of turn instructions of the entry procedure comprise a recommendation to increase aircraft true airspeed to a value that provides a windspeed ratio equal to or less than ⅓.

15. A non-transitory computer-readable medium storing computer-executable instructions for:
determining a windspeed ratio;
determining a direction of relative wind;
utilizing at least the windspeed ratio and the direction of relative wind to calculate an analytic solution to the holding pattern solution, comprising:
an inbound wind correction angle,
an outbound heading,
an outbound time that begins at the outbound heading independent from an abeam point, and
a total time to complete a holding pattern circuit; and
providing the holding pattern solution to a user for flying the holding pattern solution, the holding pattern solution further comprising:
an entry procedure comprising a plurality of turn instructions, an inbound course, an inbound and an outbound heading, and an outbound leg duration;
an entry pattern graphic visually depicting an entry pattern to intercept the inbound leg of the hold pattern;
a holding procedure comprising a plurality of turn instructions, an inbound course, an inbound and an outbound heading, and an outbound leg duration; and
a holding pattern graphic visually depicting a first representation of a holding pattern with zero wind, and a second representation of a holding pattern with one or more wind characteristics applied.

16. The non-transitory computer-readable medium of claim 15, wherein the computer-readable medium further stores computer-executable instructions for:
- receiving a user selection of a measure button;
- in response to receiving the user selection of the measure button, displaying a dimensional holding pattern graphic having one or more dimensions of at least one of the first representation of the holding pattern with zero wind and the second representation of the holding pattern with one or more wind characteristics applied.

17. The non-transitory computer-readable medium of claim 15, wherein the computer-readable medium further stores computer-executable instructions for:
- receiving radial, course, or bearing information corresponding to an inbound leg of the holding pattern to a fix;
- receiving a length of the inbound leg;
- receiving a heading of the aircraft;
- receiving an aircraft rate of turn;
- receiving a true airspeed of the aircraft;
- receiving a direction and a speed of wind;
- utilizing the speed of the wind and the true airspeed to determine the windspeed ratio; and
- utilizing at least the radial, course, or bearing information corresponding to the inbound leg, the length of the inbound leg, and the heading of the aircraft to determine the holding pattern solution.

18. The non-transitory computer-readable medium of claim 15, wherein the outbound time is measured from a point in time at which the aircraft has completed its turn to the outbound heading.

19. The non-transitory computer-readable medium of claim 15, wherein the computer-readable medium further stores computer-executable instructions for:
- receiving an aircraft rate of turn;
- receiving an inbound time to the fix comprising a one-minute or a one-minute and thirty second inbound time to the fix; and
- utilizing at least the aircraft rate of turn and the inbound time to the fix to determine the holding pattern solution.

20. The non-transitory computer-readable medium of claim 15, wherein the holding pattern graphic comprises one or more dimensions of at least one of the first representation of the holding pattern with zero wind and the second representation of the holding pattern with one or more wind characteristics applied.

* * * * *

UNITED STATES PATENT AND TRADEMARK OFFICE
CERTIFICATE OF CORRECTION

PATENT NO. : 10,692,386 B2
APPLICATION NO. : 16/585853
DATED : June 23, 2020
INVENTOR(S) : William DeWeese et al.

It is certified that error appears in the above-identified patent and that said Letters Patent is hereby corrected as shown below:

In the Specification

In Column 9, Line 19, "Y=0" should read --y=0--.

In Column 14, Line 26, "f=1" should read --$\beta$=1--.

In Column 14, Line 65, "The value of f" should read --The value of $\beta$--.

In Column 15, Line 41, Equation 35, the second formula should read as follows:
--$\cos(-\sigma) = \cos \sigma$--.

In Column 16, Line 44, "a, where a" should read --$\alpha$, where $\alpha$--.

In Column 18, Line 36, the formula should read as follows:
--$\theta_H = 180$--.

In Column 30, Line 27, Equation 86, the last formula should read as follows:
--$\dfrac{\partial \bar{y}}{\partial \theta_H} = t_{out} \cos \theta_H$--.

In Column 31, Line 59, Equation 91, the formula should read as follows:
--$\dfrac{d\bar{y}}{d\bar{x}} = \dfrac{[\sin \theta_H - \bar{V}_w \sin \alpha]}{[\cos \theta_H - \bar{V}_w \cos \alpha]}$--.

In Column 42, Line 4, "30 per second" should read --3° per second--.

Signed and Sealed this
Twenty-second Day of December, 2020

Andrei Iancu
*Director of the United States Patent and Trademark Office*